US011885481B2

(12) United States Patent
Wang et al.

(10) Patent No.: US 11,885,481 B2
(45) Date of Patent: Jan. 30, 2024

(54) LED LIGHTING DEVICE

(71) Applicant: JIAXING SUPER LIGHTING ELECTRIC APPLIANCE CO., LTD, Jiaxing (CN)

(72) Inventors: Mingbin Wang, Jiaxing (CN); Zhichao Zhang, Jiaxing (CN); Tao Jiang, Jiaxing (CN); Chen-kun Chen, Jiaxing (CN); Dongmei Zhang, Jiaxing (CN)

(73) Assignee: JIAXING SUPER LIGHTING ELECTRIC APPLIANCE CO., LTD, Zhejiang (CN)

( * ) Notice: Subject to any disclaimer, the term of this patent is extended or adjusted under 35 U.S.C. 154(b) by 0 days.

(21) Appl. No.: 18/023,002

(22) PCT Filed: Aug. 27, 2021

(86) PCT No.: PCT/CN2021/115036

§ 371 (c)(1),
(2) Date: Feb. 24, 2023

(87) PCT Pub. No.: WO2022/048501

PCT Pub. Date: Mar. 10, 2022

(65) Prior Publication Data

US 2023/0304651 A1 Sep. 28, 2023

(30) Foreign Application Priority Data

Sep. 2, 2020 (CN) ........................ 202010907587.X
Sep. 4, 2020 (CN) ........................ 202010919457.8
(Continued)

(51) Int. Cl.
*F21V 23/00* (2015.01)
*F21V 7/09* (2006.01)
(Continued)

(52) U.S. Cl.
CPC .............. *F21V 23/004* (2013.01); *F21S 8/04* (2013.01); *F21V 7/09* (2013.01); *F21V 13/04* (2013.01);
(Continued)

(58) Field of Classification Search
CPC .... F21S 8/04; F21V 7/09; F21V 13/04; F21V 23/023
See application file for complete search history.

(56) References Cited

U.S. PATENT DOCUMENTS 11,686,440 B2 * 6/2023 MacPherson ............. F21K 9/60 362/555
11,746,989 B1 * 9/2023 Ai ........................... F21V 13/04 362/244
(Continued)

FOREIGN PATENT DOCUMENTS

CN 108397720 A 8/2018
CN 208253229 U 12/2018
(Continued)

OTHER PUBLICATIONS

English translation of JP-2011154946-A Muranaka, published Aug. 2011 (Year: 2011).*
(Continued)

*Primary Examiner* — Evan P Dzierzynski
(74) *Attorney, Agent, or Firm* — Simon Kuang Lu

(57) ABSTRACT

The present invention provides an LED illumination device, including: a light source carrier including a base, an accommodating space formed on the base; a light emitting unit including a light emitter and a lamp board fixed to the light source carrier; and an optical member covering or at least partially covering the light emitting unit. The light emitting unit and the optical member are both disposed in the accommodating space. The optical member includes a first
(Continued)

light distribution unit and a second light distribution unit. At least 70% of a luminous flux generated by the light emitter in operation is directly emitted from the LED illumination device through the second light distribution unit.

20 Claims, 51 Drawing Sheets

(30) Foreign Application Priority Data

| | | |
|---|---|---|
| Sep. 15, 2020 | (CN) | 202010965610.0 |
| Sep. 30, 2020 | (CN) | 202011054633.2 |
| Oct. 22, 2020 | (CN) | 202011136498.6 |
| Nov. 2, 2020 | (CN) | 202011202551.8 |
| Dec. 4, 2020 | (CN) | 202011403825.X |
| Dec. 10, 2020 | (CN) | 202011435260.3 |
| Jan. 8, 2021 | (CN) | 202110021012.2 |
| Jan. 25, 2021 | (CN) | 202110097468.7 |
| Apr. 9, 2021 | (CN) | 202110382561.2 |

(51) Int. Cl.

| | |
|---|---|
| ***F21V 13/04*** | (2006.01) |
| ***F21V 23/02*** | (2006.01) |
| ***F21S 8/04*** | (2006.01) |
| *F21Y 115/10* | (2016.01) |

(52) U.S. Cl.
CPC ......... *F21V 23/023* (2013.01); *F21Y 2115/10* (2016.08)

(56) References Cited

U.S. PATENT DOCUMENTS

| | | | | |
|---|---|---|---|---|
| 2003/0133307 A1* | 7/2003 | Sugihara | B60Q 3/85 | 362/520 |
| 2023/0282786 A1* | 9/2023 | Favale, Jr. | H01L 33/58 | 257/98 |

FOREIGN PATENT DOCUMENTS

| | | | | |
|---|---|---|---|---|
| CN | 208365358 U | * | 1/2019 | |
| CN | 208365358 U | | 1/2019 | |
| CN | 209622505 U | | 11/2019 | |
| CN | 210319609 U | | 4/2020 | |
| JP | 2011154946 A | * | 8/2011 | |
| JP | 2012230762 A | | 11/2012 | |

OTHER PUBLICATIONS

English translation of CN-208365358-U Deng, published Jan. 2019 (Year: 2019).*

* cited by examiner

LED LIGHTING DEVICE

TECHNICAL FIELD

The present disclosure belongs to the technical field of LED illumination apparatuses, and specifically relates to an LED illumination device.

BACKGROUND

LED illumination is widely used due to its advantages such as energy conservation and long service life. LED lamps commonly used in the prior art include panel lights and grille lights.

In the prior art, a panel light generally includes a light bar, a bottom frame, a power source, a light guide plate and a diffusion plate, the light bar is disposed at a side part of the bottom frame to provide lateral light output, and light emitted by the light bar exits from the diffusion plate after passing through the light guide plate. Panel lights in the prior art have the following shortcomings: a power source of a panel light is disposed at a back surface of a bottom frame, resulting in increase of an additional height space and unbeneficial for height control of the panel light; light emitted by a light bar has large light loss after passing through a light guide plate and a diffusion plate, resulting in low light output efficiency of the panel light, however if the diffusion plate is removed, a problem about uneven light output will be caused; and a cost of the light guide plate is relatively high, which is unbeneficial for cost control of the panel light, and glare control of the panel light is unsatisfactory.

In the prior art, a grille light includes a bottom frame, a light source (the light source may be a light bar, a fluorescent tube, or an LED tube), and grilles, the light source is fixed to the bottom frame, and the grilles are disposed at a light output side of the light source. Grille lights in the prior art have the following shortcomings: the power source is disposed at the back surface of the bottom frame, resulting in increase of an additional height space and unbeneficial for height control of the grille light; the arrangement of grilles is unbeneficial for height control of the grille light, resulting in increase of the cost of packaging and transportation; and the cost of the grilles is relatively high, which is unbeneficial for cost control of the whole light.

In conclusion, in view of the deficiencies and shortcomings of the LED illumination devices in the prior art, how to design LED illumination devices to realize uniform light output is a technical problem to be solved urgently by persons skilled in the art.

SUMMARY

Lots of embodiments related to present invention are described here. However, the words in present invention are merely used for description of some embodiments (no matter whether they have been mentioned in the claims) disclosed in this specification rather than complete description of all possible embodiments. The features or aspects described in some embodiments of present invention may be combined in different ways to form an LED illumination device or a part of the LED illumination device.

An embodiment of present invention provides a novel LED illumination device and features in various aspects to solve the aforementioned problems.

An embodiment of present invention provides an LED illumination device including:

a light source carrier, the light source carrier including a base, an accommodating space being formed on the base;

a light emitting unit, the light emitting unit including a light emitter and a lamp panel, the lamp panel being fixed to the light source carrier; and an optical member, the optical member covering or at least partially covering the light emitting unit.

The light emitting unit and the optical member are both disposed in the accommodating space; and in addition, in a height direction of the base, the light emitting unit and the optical member are both within a range defined by the accommodating space.

One light emitting unit is provided with only one optical member; and an area of a front surface, covered by the optical members, of the base is not greater than 10% of a total area of the front surface of the base.

The optical member includes a first light distribution unit and a second light distribution unit, at least 70%, 80%, or 90% of luminous flux generated by the light emitter in operation is directly emitted from the LED illumination device through the second light distribution unit, a part of the luminous flux generated by the light emitter in operation is emitted from the first light distribution unit, and at least a part of the light emitted from the first light distribution unit is emitted to a surface of the base.

In an embodiment of present invention, the first light distribution unit is configured in a strip shape and provided with an accommodating groove along a longitudinal direction, and at least a part in a height direction of the light emitting unit is located inside the accommodating groove.

In an embodiment of present invention, the second light distribution unit is disposed on a surface of the first light distribution unit, the second light distribution unit and the accommodating groove are respectively located on two opposite sides of the first light distribution unit in a height direction of the optical member, and the light emitter and the second light distribution unit are arranged in one-to-one correspondence.

In an example of the present disclosure, the second light distribution unit includes a first light output part and a second light output part, the first light output part includes a plane, the second light output part includes a conical surface, and the second light output part is disposed around the first light output part.

In an embodiment of present invention, when the light emitter is turned on, an illuminance ratio of a surface of the first light output part to a surface of the second light output part is greater than 0.3, 0.4, 0.5, 0.6, 0.7, 0.8 or 0.9, and less than 2, 1.9, 1.8, 1.7, 1.6 or 1.5.

In an embodiment of present invention, a ratio of a surface area of the second light output part to a surface area of the first light output part is greater than 0.7 and less than 1.8.

In an embodiment of present invention, the second light output part has a contour line, the contour line revolves 360 degrees along a central axis of the second light distribution part to form an outer contour of the second light output part, and an absolute value of a slope of the contour line of the outer contour of the conical surface of the second light output part ranges from 0.3 to 0.8.

In an embodiment of present invention, the second light output part has a contour line, the contour line revolves 360 degrees along a central axis of the second light distribution part to form an outer contour of the second light output part, and an absolute value of a slope of the contour line of the outer contour of the conical surface of the second light output part ranges from 0.25 to 0.6.

In an embodiment of the present invention, when the light emitting unit is turned on, a ratio of an illuminance of light emitted from the LED illumination device within a range of a first area to an average illuminance within a range of a second area is greater than 0.3, 0.4, 0.5, 0.6, 0.7, 0.8 or 0.9, and less than 2, and the first area and the second area are located on a same plane; the first area and the second area are located in a third area; and a light beam angle corresponding to the third area is smaller than a light emission angle of the LED illumination device.

In an embodiment of present invention, when the light emitting unit is turned on, the ratio of the illuminance of the light emitted from the LED illumination device within the range of the first area to the average illuminance within the range of the second area is greater than 0.5 and less than 1.5, and the first area and the second area are located on a same plane; the first area and the second area are located in the third area; and the light beam angle corresponding to the third area is smaller than the light emission angle of the LED illumination device.

In an embodiment of present invention, the first area and the second area are any area in the third area.

In an embodiment of present invention, the first area and the second area are concentrically disposed.

In an embodiment of present invention, the LED illumination device further includes a power source, the power source is disposed on the base, and the power source is within a range defined by the base in a height direction of the LED illumination device.

In an embodiment of present invention, the power source includes a power box, an electronic components, a power board, and an electric isolation tube, the electronic components is disposed on the power board, the power box is fixed to the base, the electronic components and the power board are completely or at least partially disposed in the electric isolation tube, and the electric isolation tube is disposed in the power box.

In an embodiment of present invention, the power box has an opening, the electric isolation tube is installed in the power box through the opening, and a side, with the opening, of the power box corresponds to an end surface of the base so as to seal the power box.

In an embodiment of present invention, the electronic components are disposed for isolation between the power board and the end surface of a back surface of the base, so that a space is maintained between the power panel and the end surface of the back surface of the base.

In an embodiment of present invention, the base includes two mounting walls, two lamp panels are provided, and the two lamp panels are fixed to the two groups of mounting walls, respectively.

In an embodiment of present invention, two ends of the power box in a longitudinal direction exceed the two mounting walls, respectively.

In an embodiment of present invention, the power box includes a first cavity and a second cavity, the electric isolation tube is disposed in the first cavity, a wiring board is disposed in the second cavity, and the second cavity of the power box completely surpasses at least one of the mounting walls in a longitudinal direction of the power box.

In an embodiment of present invention, a height of the power box is 80%, 90%, or 95% or more of a total height of the LED illumination device.

Compared with the prior art, the present invention includes any one or any combination of the following effects: structural simplicity and design rationality are achieved; only one optical member is provided, which can reduce light loss caused by arranging the optical members and improve light output rate of the LED illumination device; the optical members are fully accommodated in the accommodating space so as not to increase an additional height space of the LED illumination device, facilitating control on the overall height; at least a part of the light emitted by the first light distribution unit is emitted to the surface of the base, such that a better optical performance is presented; due to the arrangement of the first light distribution unit and the second light distribution unit, illuminance uniformity of the surface of the optical member can be improved, and light output uniformity of the LED illumination device can be improved; a bent structure with a high structural strength is provided at the mounting wall, and the second cavity is arranged corresponding to the mounting wall, so that deformation of the power box at the second cavity caused by deformation of the base at this position can be prevented, thereby improving the structural strength and reliability.

DETAILED DESCRIPTION

Figure 1A:
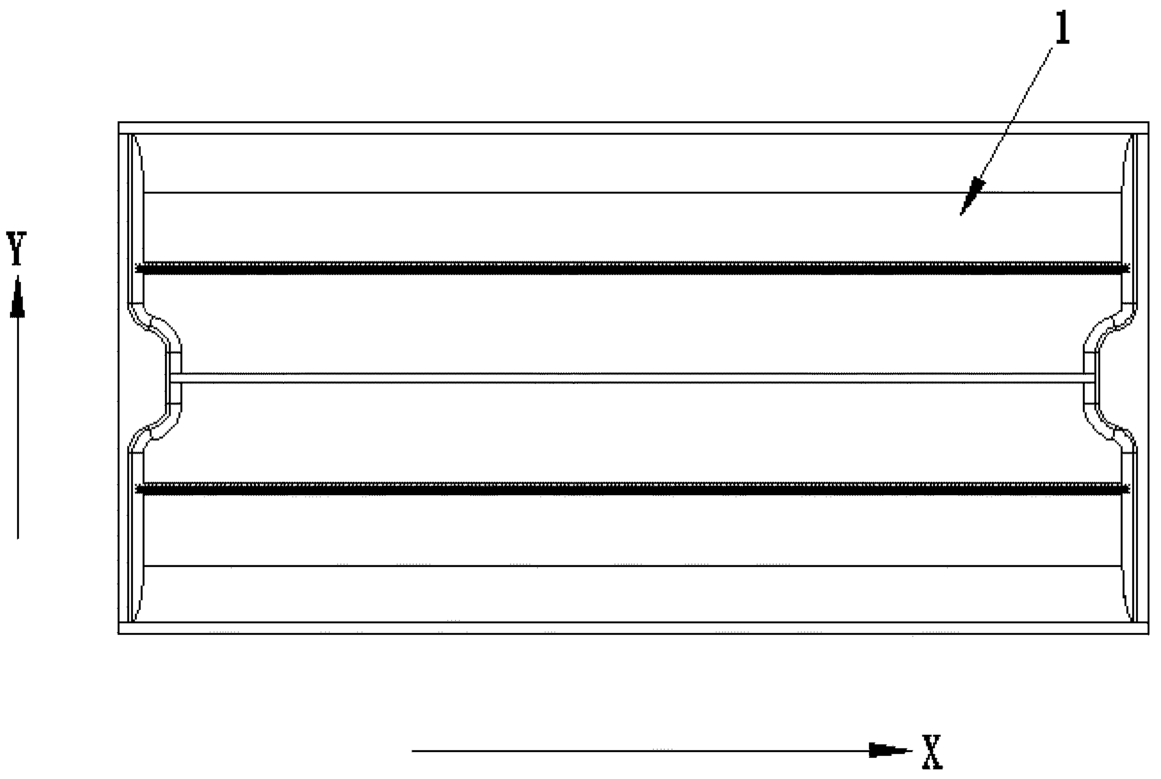
FIG. 1A is a schematic front view of the LED illumination device according to a first embodiment of present invention.

The embodiments of the present disclosure are described more completely here with reference to the accompanying drawings below, and the embodiments of the present disclosure are shown in these accompanying drawings. However, present invention may be implemented in various forms, and should not be construed as being limited to the embodiments illustrated herein. On the contrary, providing these embodiment enables this disclosure to be thorough and complete, and will fully convey the scope of present invention to persons skilled in the art. Same reference numerals indicate same elements in the figures.

It will be understood that although the terms first, second, or the like may be used herein to describe various elements, but these elements should not be limited by these terms. These terms are merely used to distinguish one element from another element. For example, a first element may be referred to as a second element, and similarly, a second element may be referred to as a first element, without departing from the scope of present invention. As used herein, the term “and/or” includes any and all combinations of one or more of the associated listed items.

It will be understood that when an element such as a layer, region, or substrate is referred to as “located” “on” another element or extending “over” another element, the element may be directly located on or directly extend over the other element, or an intermediate element may also be present. On the contrary, when an element is referred to as “directly located” “on” or “directly extending” “over” another element, there is no intermediate element. It will be also understood that when an element is referred to as “connected” or “coupled” to another element, the element may be directly connected or coupled to the other element, or an intermediate element may also be present. On the contrary, when an element is referred to as “directly connected” or “directly coupled” to another element, there is no intermediate element.

Relative terms such as “below”, “above”, “upper”, “lower”, “horizontal”, or “perpendicular” may be used herein to describe the relationship of one element, layer, or region with another element, layer, or region as illustrated in the drawings. It will be understood that these terms are intended to include different orientations of devices other than those described in the drawings. In the present disclosure, the “perpendicular”, “horizontal” or “parallel” is defined as including a case ±10% on the basis of a standard definition. For example, perpendicular generally means forming an included angle of 90 degrees with respect to a reference line. However, in the present disclosure, perpendicular refers to a case in which the included angle is from 80 degrees to 100 degrees.

The terms used herein are merely for the purpose of describing specific embodiment, and are not intended to limit present invention. As used herein, unless otherwise clearly stated in the context, singular forms as described by “a”, “an”, and “the” are intended to also include plural forms. It will also be understood that, when used herein, the terms “comprise”, “comprising” and/or “include” or “including” indicate the presence of a described feature, integer, step, operation, element, and/or component, but do not exclude the presence or addition of one or more other features, integers, steps, operations, elements, components, and/or combinations thereof.

Unless otherwise defined, all terms (including technical and scientific terms) used herein have the same meanings as commonly understood by persons of ordinary skills in the art to which the present disclosure pertains. It will also be understood that the terms used herein should be construed as having meanings consistent with their meanings in the context of this specification and related arts, and are not to be construed in an idealized or over-formal sense unless expressly defined herein.

Unless otherwise expressly stated, comparative quantitative terms (such as “less than” and “greater than”) are intended to cover equivalent concepts. As an example, “less than” not only means “less than” in the strictest mathematical sense, but also means “less than or equal to”.

As shown in FIG. 1A to FIG. 1F, a first embodiment of present invention provides an LED illumination device. The LED illumination device includes a light source carrier 1, a light emitting unit 2, an optical member 3, and a power source 4. The light emitting unit 2 is fixed to the light source carrier 1, and the optical member 3 covers or at least partially covers the light emitting unit 2, so that when the light emitting unit 2 is turned on, light emitted by the light emitting unit is at least partially or completely emitted from the LED illumination device through the optical member 3. The light emitting unit 2 in this embodiment is non-detachably (irreplaceably) fixed to the light source carrier (therefore the device may be referred to as an integrated illumination device).

The light source carrier 1 in this embodiment includes a base 11 and end covers 12 that are disposed at two ends of the base 11. The base 11 defines a mounting surface 111, and the light emitting unit 2 is fixed to the mounting surface 111. Further, the light emitting unit 2 includes a substrate 21 and a light emitter 22, the light emitter 22 is fixed to the substrate 21, and the light emitter 22 may be an LED light bead. The substrate 21 is attached to the mounting surface 111. For example, the substrate 21 is adhered to the mounting surface 11 by using an adhesive, or the mounting surface 111 is provided with a mounting structure, so that the substrate 21 is attached to the mounting surface 111 by means of clamping, buckling, threaded connection, magnetic suction, and the like. In this embodiment, the base 11 is made of a metal material, while the light emitting unit 2 and the base 11 form a heat conduction path after the light emitting unit 2 being fixed to the mounting surface 111. In this way, heat produced when the light emitting unit 2 is turned on can be conducted to the base 11 and dissipated through the base 11. In this embodiment, the mounting surface 111 is configured with a reflection function. Specifically, the mounting surface 111 may be provided with a light reflection layer (such as a while paint) so as to achieve a reflection function. In other embodiment, the end covers may not be provided. In other words, the light source carrier 1 is integrally formed by the base 11. In this case, a reinforcing member may be provided on the base 11 (for example, reinforcing structures such as a reinforcing rib is directly formed on the base 11, or a reinforcing member is additionally provided on the base 11), so as to enhance structural strength of the base 11. In this embodiment, because no end covers are provided, the power source 4 will be disposed on the base 11, for example, on a back surface or a front surface of the base 11.

In this embodiment, the end cover 12 is fixed to the base 11 by a fixing structure. Specifically, the end cover 12 may be fixed to the base 11 by means of clamping, buckling, or bolting.

In this embodiment, the end cover 12 includes a wall part 121, and the wall part 121 defines a first accommodating space 1211. The power source 4 is disposed in the first accommodating space 1211. Compared with a manner in which the power source is disposed on the back surface (another side, opposite to the light emitting unit 2, of the base 11) of the base 11, the manner in which the power source is disposed in the end cover 12 (that is, disposed in the first accommodating space 1211) can reduce an overall height of the LED illumination device. In this embodiment, the height of the LED illumination device is smaller than 30 mm. Further, the end covers 12 in this embodiment are both within a space (that is, an upper end and a lower end of the base 11 in a height direction of the LED illumination device) defined by the base 11 in the height direction of the LED illumination device. In this embodiment, the wall part 121 at least partially protrudes toward an inner side (an inner side in a first direction X) of the LED illumination device, so as to form a first accommodating space 1211 in the LED illumination device. In this embodiment, the end cover 12 is formed by an integrated structure.

In this embodiment, the wall part 121 further defines a second accommodating space 1212, and the second accommodating space 1212 is in communication with the first accommodating space 1211. The second accommodating space 1212 extends along a second direction Y. In this embodiment, the light emitting unit 2 and the power source 4 are connected by an electric connection unit. One end of the electric connection unit is connected to the light emitting unit 2, and the other end is connected to the power source 4. In addition, the electric connection unit is at least partially located in the second accommodating space 1211, so as to realize hidden wiring. In this embodiment, the electric connection unit is a wire, or a flexible connection board (for example, an FPC board). In this embodiment, a width of the first accommodating space 1211 in the first direction X is larger than a width of the second accommodating space 1212 in the first direction X. Therefore, the light emitting unit 2 has more space in the first direction X for arrangement (for example, a quantity of the light emitters 22 or spaces between light emitters 22 may be increased).

In this embodiment, two light emitting units 2 are provided. Two sides of the first accommodating space 1211 of the base 11 are provided with second accommodating spaces 1212 respectively, for wiring of the two light emitting units 2.

In this embodiment, an end part of the substrate 21 of the light emitting unit 2 enters into the second accommodating space 1212, and the electric connection unit is completely located in the second accommodating space 1212 and/or the first accommodating space 1211. In this embodiment, at least one light emitter 22 is located in the second accommodating space 1212. When the light emitter 22 located in the second accommodating space 1212 is turned on, light emitted by the light emitter is at least partially emitted out via the end cover 12, thereby avoiding formation of a dark field at the end cover 12.

In this embodiment, a wiring terminal may further be provided, and the wiring terminal is disposed in one of the end covers 12. The wiring terminal and the power source 4 may be disposed in the first accommodating space 1211 of the same end cover 12, or may be disposed in the first accommodating spaces 1211 of different end covers 12 respectively. In this embodiment, the power source 4 is disposed in a first accommodating space 1211 of one of the end covers 12, while the wiring terminal is disposed in a first accommodating space 1211 of the other end cover 12. In this embodiment, the wiring terminal is configured to be connected to the light emitting unit 2 or an external power source.

In this embodiment, the wiring terminal is connected to the power source by a wire. The wire may be disposed along the mounting surface 111, and two ends of the wire enter into the first accommodating spaces 1211 of the end covers 12 on the two sides, respectively. Further, the LED illumination device in this embodiment further includes a wire passing unit 5. The wire passing unit 5 includes a wire passing hole 51. The wire passing hole 51 is configured to extend along the first direction X, and the wire runs through the wire passing hole 51 of the wire passing unit 5.

In this embodiment, two ends of the wire passing unit 5 may enter into the first accommodating spaces 1211 of the two end covers 12, such that the wire cannot be exposed outside. In this embodiment, the wire passing unit 5 has a bottom 52, and the bottom 52 is attached to the mounting surface 111. The wire passing unit 5 may be fixed to the mounting surface 111 through the bottom 52 of the wire passing unit, or two ends of the wire passing unit 5 are fixed through the end covers 12, such that the wire passing unit is approximately attached to the mounting surface 111. In this embodiment, arrangement of the wire passing unit 5 may also enhance strength of the base 11 so as to limit distortion of the base. In other embodiment, the wire passing unit 5 may alternatively be disposed on another side, opposite to the light emitting unit 2, of the base 11. In other embodiment, when the wire is arranged along the back surface of the base 11 (arranged along the other side, opposite to the light emitting unit 2, of the base 11), the aforementioned wire passing unit may be omitted. However, when the wire is arranged along the back surface of the base 11, an overall height of the LED illumination device may be additionally increased.

In this embodiment, the optical member 3 is attached to the mounting surface 111. Further, the optical member 3 in this embodiment may be directly fixed to the mounting surface 111. In one embodiment, the optical member 3 is directly adhered to the mounting surface 111. In one embodiment, the optical member 3 is fixed to the mounting surface 111 by a fixing structure, such as a bolt and a buckle. In one embodiment, two ends of the optical member 3 are tightly pressed on the mounting surface 111 by the two end covers 12.

In this embodiment, the optical member 3 is configured to control a light output angle and light output uniformity of the LED illumination device. For example, when the light emitting unit 2 is turned on and the emitted light is emitted from the LED illumination device through the optical member 3, a light emission angle of the LED illumination device is controlled to be 80 to 130 degrees. Further, when the light emitting unit 2 is turned on and the emitted light is emitted from the LED illumination device through the optical member 3, the light emission angle of the LED illumination device is controlled to be 90 to 120 degrees. Furthermore, when the light emitting unit 2 is turned on and the emitted light is emitted from the LED illumination device through the optical member 3, the light emission angle of the LED illumination device is controlled to be 90 to 100 degrees.

Figure 1B:
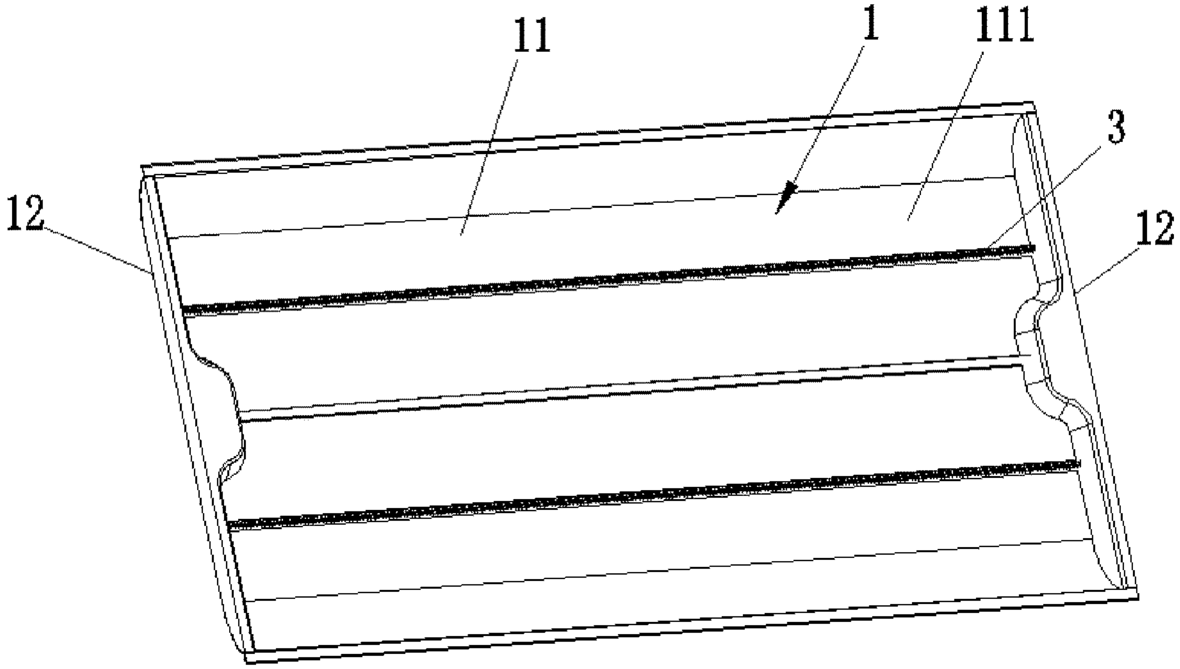
FIG. 1B is a stereoscopic schematic diagram of the LED illumination device according to the first embodiment of present invention.
Figure 1C:
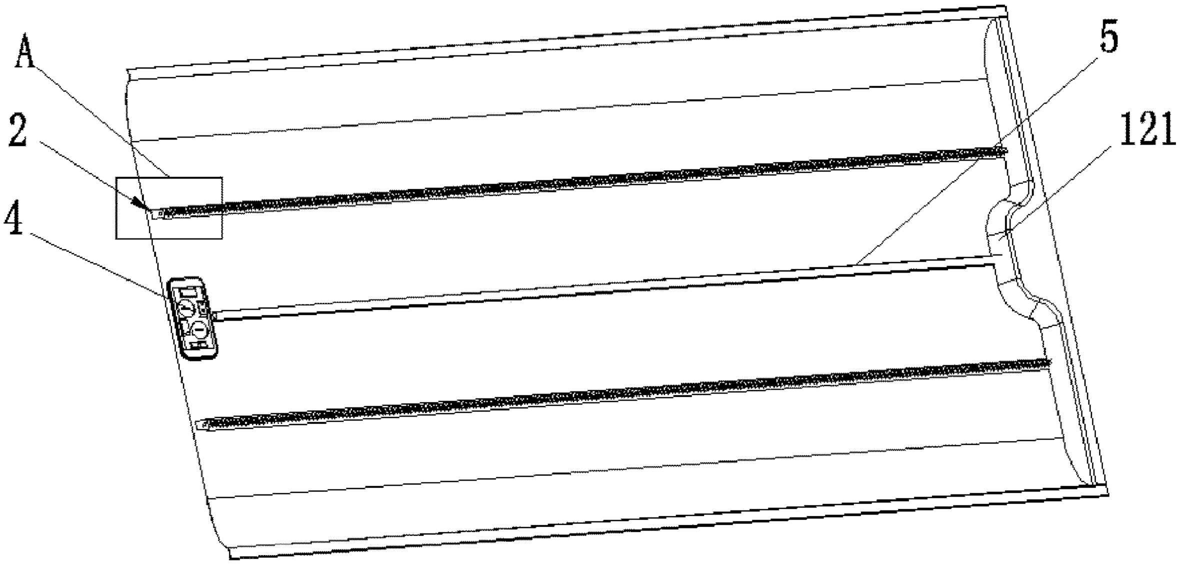
FIG. 1C is a stereoscopic schematic diagram of the LED illumination device according to the first embodiment of present invention with an end cover of one side removed.
Figure 1D:
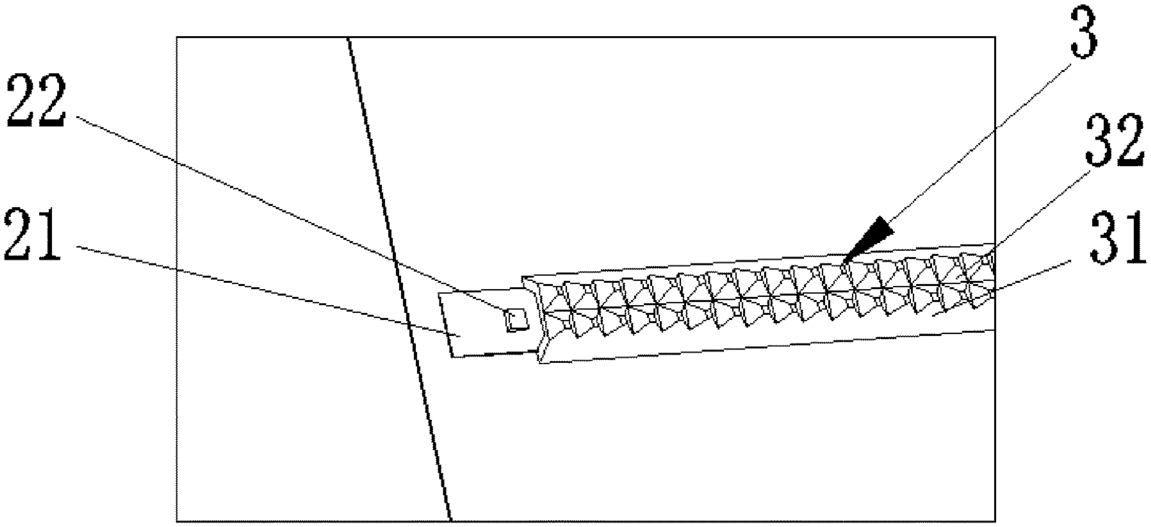
FIG. 1D is an enlarged view of a location A in FIG. 3.
Figure 1E:
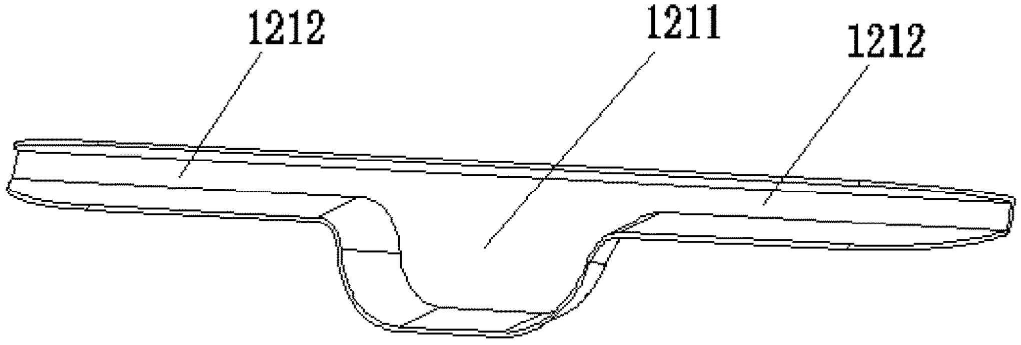
FIG. 1E is a stereoscopic schematic diagram of an end cover according to the first embodiment of present invention.
Figure 1F:
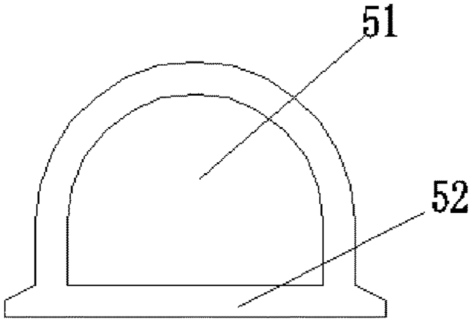
FIG. 1F is a schematic front view of a wire passing unit of the end cover according to the first embodiment of present invention.
Figure 1G:
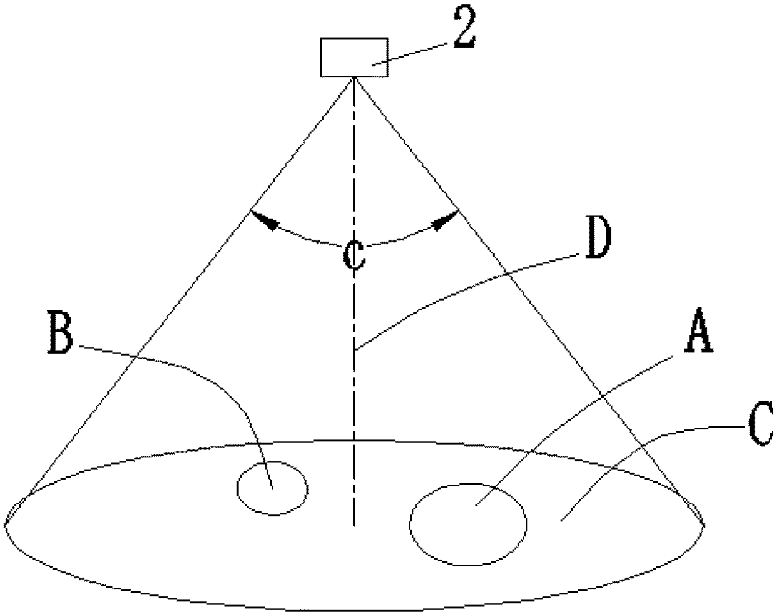
FIG. 1G is a schematic diagram I showing light output of the LED illumination device according to the first embodiment of present invention.

Referring to FIG. 1B, FIG. 1C and FIG. 1G, in this embodiment, in order to control the light output uniformity of the LED illumination device, a ratio of an illuminance of the light emitted when the light emitting unit 2 is turned on within a range of first area A to an average illuminance within a range of second area B is greater than 0.3, 0.4, 0.5, 0.6, 0.7, 0.8 or 0.9, and less than 2. In some embodiments, the ratio of the illuminance within the range of first area A to the average illuminance within the range of second area B is greater than 0.5 and less than 1.5. In some embodiment, the ratio of the illuminance within the range of first area A to the average illuminance within the range of second area B is greater than 0.7 and less than 1.3. The first area A and the second area B are located on a same plane. In addition, the first area A and the second area B are both located in third area C (the third area C, the first area A and the second area B are located on a same plane), while a light beam angle c corresponding to the third area C is 90 degrees, 80 degrees, 60 degrees, or 50 degrees. In this embodiment, the light beam angle c may be smaller than the light emission angle of the LED illumination device. In this embodiment, the light output uniformity is measured based on an illuminance difference within a range of 50 degrees of the light beam angle. Therefore, a light beam angle corresponding to the third area C is 50 degrees. In addition, the first area A and the second area B may be any area in the third area C. It should be noted that the light beam angle mentioned here does not mean an included angle formed by boundary lines of lighting area. In this embodiment, a location of a center or circle center of the third area C corresponds to the LED illumination device. That is, when the LED illumination device is projected to the third area C along an optical axis D, projection of the LED illumination device is located or approximately located on the center or circle center of the third area C. In this embodiment, the plane where the first area A and the second area B are located is perpendicular to or approximately perpendicular to the optical axis D.

Figure 1H:
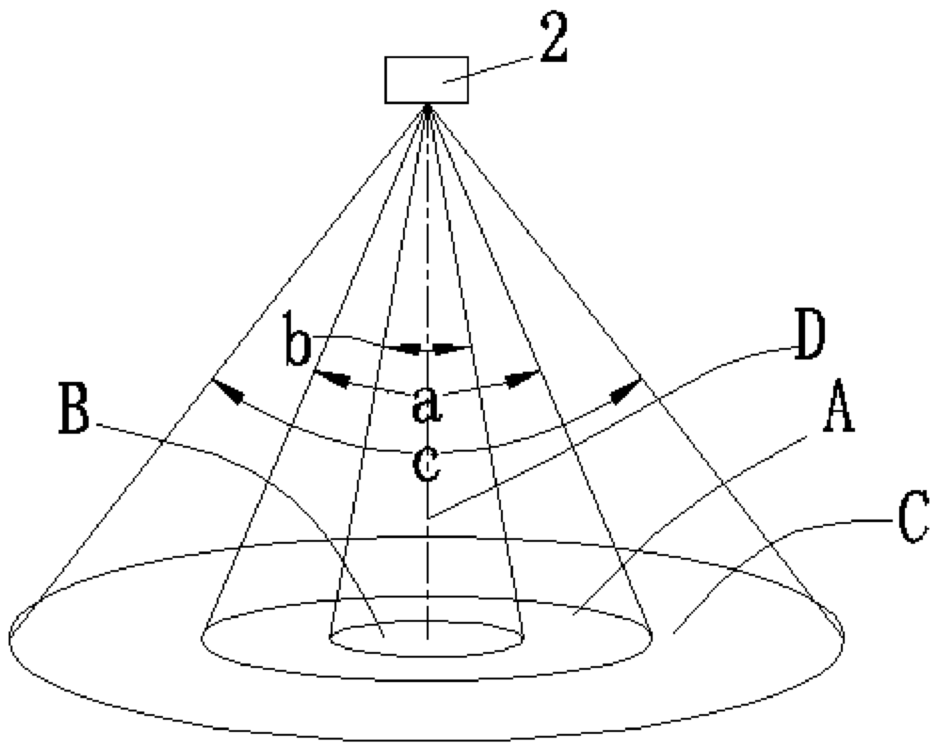
FIG. 1H is a schematic diagram II showing light output of the LED illumination device according to the first embodiment of present invention.
Figure 2A:
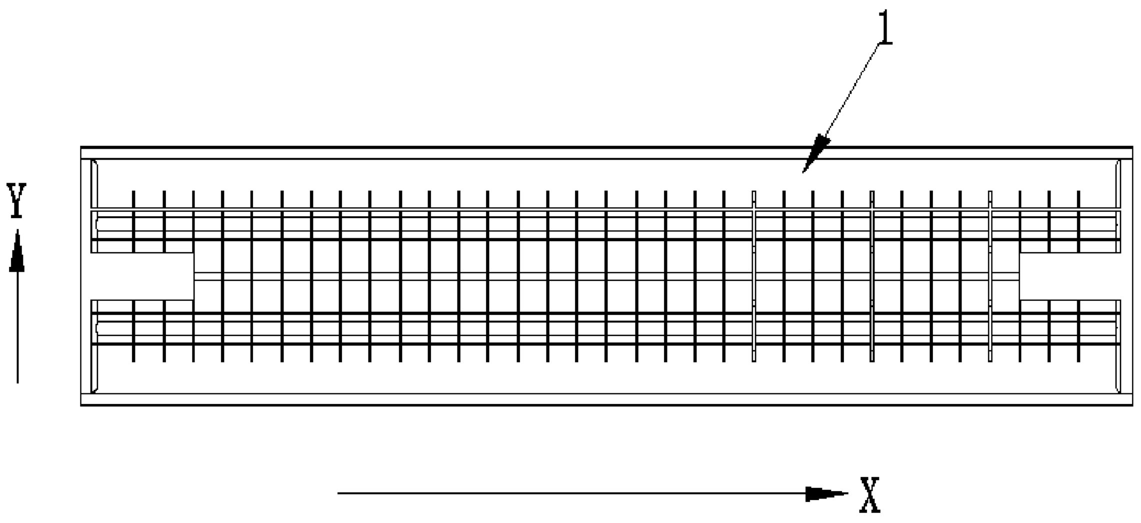
FIG. 2A is a schematic front view of an LED illumination device according to a second embodiment of present invention.
Figure 2B:
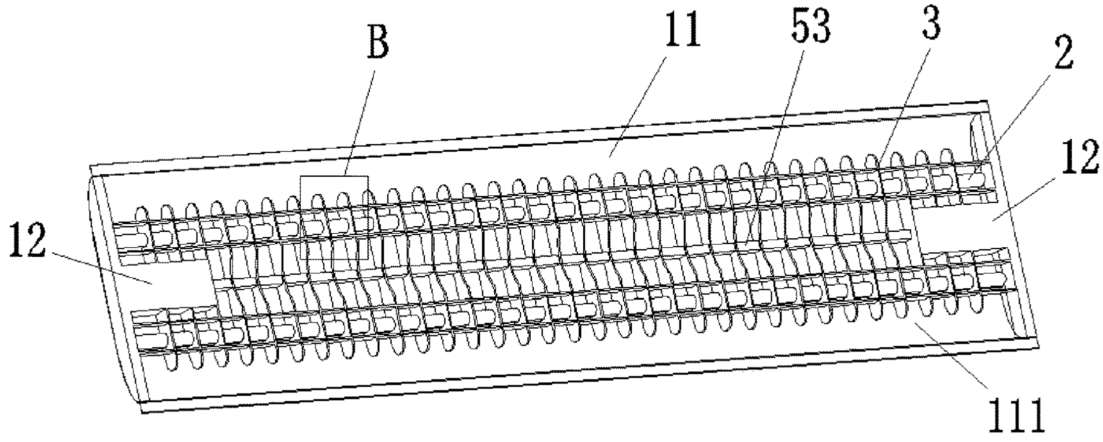
FIG. 2B is a stereoscopic schematic diagram of the LED illumination device according to the second embodiment of present invention.
Figure 2C:
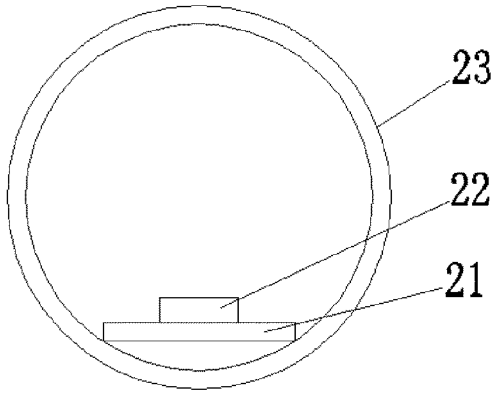
FIG. 2C is a schematic side view of a light emitting unit according to the second embodiment of present invention.
Figure 2D:
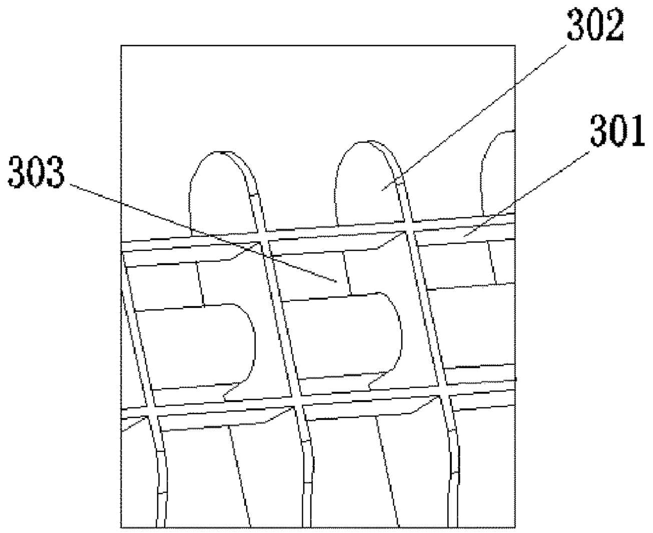
FIG. 2D is an enlarged view of a location B in FIG. 2B.
Figure 2E:
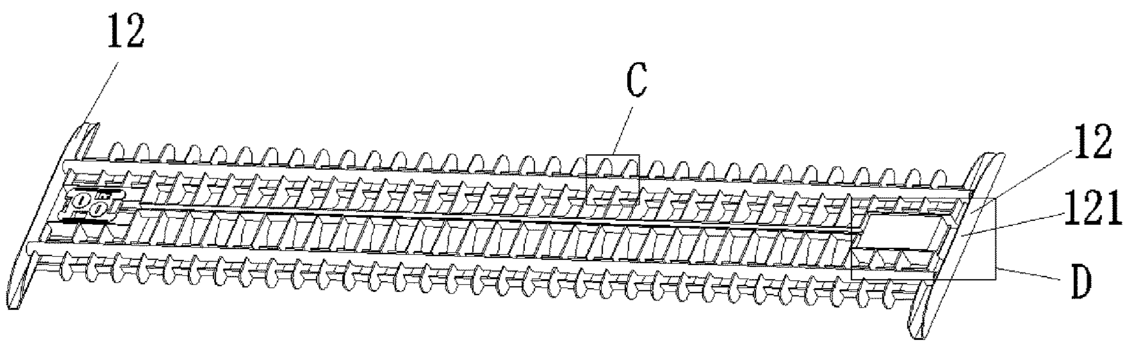
FIG. 2E is a stereoscopic schematic diagram of the LED illumination device according to the second embodiment of present invention with a base removed.
Figure 2F:
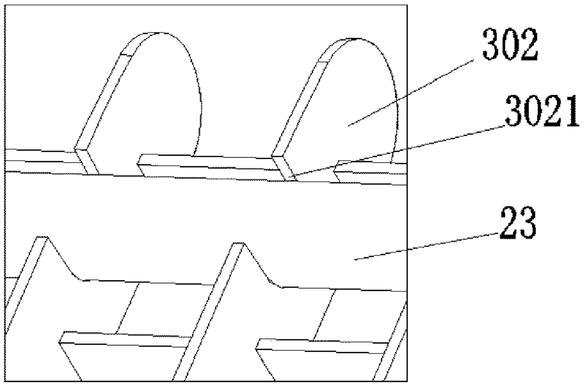
FIG. 2F is an enlarged view of a location C in FIG. 2E.
Figure 2G:
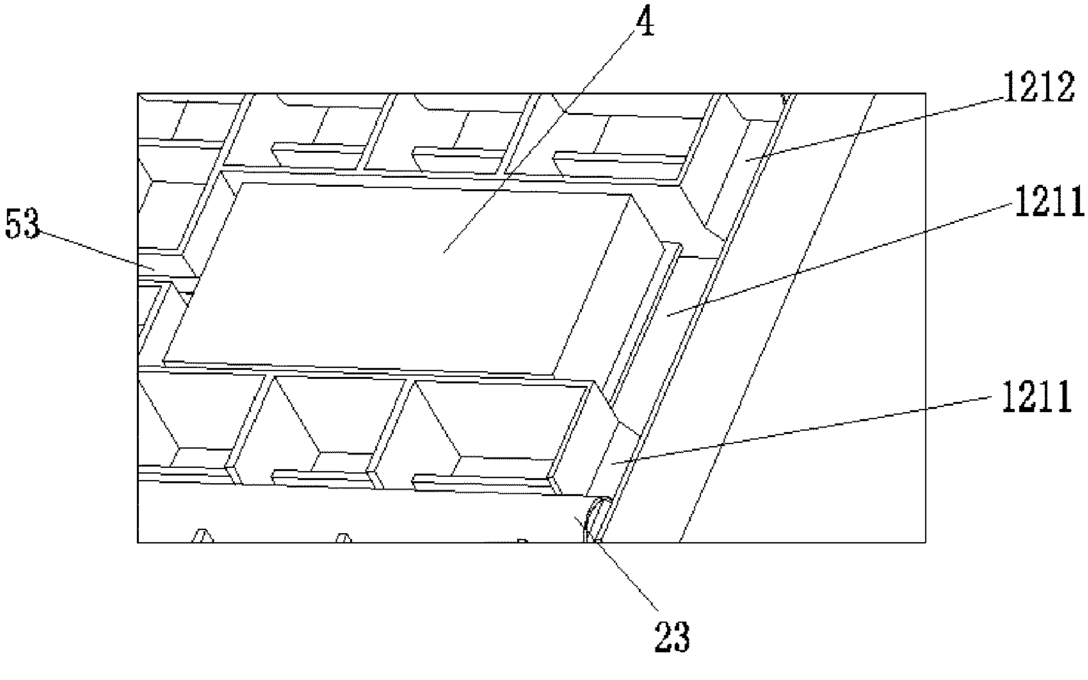
FIG. 2G is an enlarged view of a location D in FIG. 2E.

Referring to FIG. 1B, FIG. 1C and FIG. 1H, in an embodiment, in order to control the light output uniformity of the LED illumination device, a ratio of an illuminance of the light emitted when the light emitting unit 2 is turned on within a range of first area A to an average illuminance within a range of second area B is greater than 0.3, 0.4, 0.5, 0.6, 0.7, 0.8 or 0.9, and less than 2. In some embodiments, the ratio of the illuminance within the range of first area A to the average illuminance within the range of second area B is greater than 0.5 and less than 1.5. In some embodiment, the ratio of the illuminance within the range of first area A to the average illuminance within the range of second area B is greater than 0.7 and less than 1.3. The first area A and the second area B are located on a same plane, and are concentrically or approximately concentrically disposed (assuming that all the areas are circular or approximately circular, with their centers or circle centers being located at same positions). In addition, the first area A and the second area B are both located in a third area C (the third area C, the first area A and the second area B are located on a same plane), while a light beam angle c corresponding to the third area C is 90 degrees, 80 degrees, 60 degrees, or 50 degrees. In this embodiment, the light beam angle may be smaller than the light emission angle of the LED illumination device. In this embodiment, the light output uniformity is measured based on an illuminance difference within a range of 50 degrees of the light beam angle. Therefore, a light beam angle c corresponding to the third area C is 50 degrees. In addition, the first area A, the second area B and the third area C are concentrically or approximately concentrically disposed. Moreover, a light beam angle a corresponding to the first area A and a light beam angle b corresponding to the second area B are both smaller than the light beam angle c corresponding to the third area C. It should be noted that the light beam angles mentioned here do not mean included angles formed by boundary lines of lighting area. In this embodiment, a location of a center or circle center of the third area C corresponds to the LED illumination device. That is, when the LED illumination device is projected to the third area C along an optical axis D, projection of the LED illumination device is located or approximately located in the center or circle center of the third area C. In this embodiment, the plane where the first area A and the second area B are located is perpendicular to or approximately perpendicular to the optical axis D.

In this embodiment, the optical member 3 includes a first light distribution unit 31. The first light distribution unit 31 is configured to control a light emission angle (a light emission angle in a first direction X and/or a second direction Y) emitted from the optical member 3 to be smaller than 100 degrees when the light emitter 22 in operation, so as to control glare rating of the light. Further, the first light distribution unit 31 is configured to control the light emission angle (a light emission angle in a first direction X and/or a second direction Y) emitted from the optical member 3 to be within a range from 90 degrees to 95 degrees when the light emitter 22 in operation. In this embodiment, the first light distribution unit 31 is configured to include a plurality of light distribution parts. The light distribution parts may be configured with one or more of reflection, refraction and transmission functions, so that the light output angle of the LED illumination device is smaller than an original (when no optical member is provided) light output angle of the light emitter 22.

In this embodiment, the optical member 3 includes a groove 33, and the light emitting unit 2 is accommodated in the groove 33. In this embodiment, the light emitting unit 2 (the substrate 21) is longer than the optical member 3. One end or two ends of the substrate 21 are exposed out of the optical member 3 in a longitudinal direction of the substrate, so as to facilitate electric connection.

In an embodiment, the optical member 3 may further include a second light distribution unit 31. The second light distribution unit 31 is configured to emit at least a part of light generated by the light emitter 22 in operation to the mounting surface 111 through the optical member 3, such that a better optical performance can be achieved on the mounting surface 111.

In an embodiment, the optical member 3 may be an integrated structure that covers the light emitting unit 2. In an embodiment, the optical member 3 is in a multi-section form. That is, one light emitting unit 2 is correspondingly provided with a plurality of optical members 3.

Referring to FIG. 2A to FIG. 2G, a second embodiment of present invention provides an LED illumination device. A basic structure of the LED illumination device is the same as that in the aforementioned embodiment. In another embodiment, the light emitting unit 2 in this embodiment further includes a lamp tube 23. That is, the light emitting unit 2 includes a substrate 21, a light emitter and the lamp tube 23. The light emitter 22 may be an LED lamp bead, the light emitter 22 is fixed to the substrate 21, and the substrate is disposed on an inner circumference of the lamp tube 23. The lamp tube 23 may be attached to the mounting surface 111, or maintains a space from the mounting surface 111.

In addition, the optical member 3 in this embodiment includes a first light distribution unit 301 and a second light distribution unit 302. The first light distribution unit 301 is configured as a sheet-like structure and extends along a first direction X, while the second light distribution unit 302 is configured as a sheet-like structure and extends along a second direction Y. Two sides of the light emitting unit 2 in the second direction Y are provided with second light distribution units 302, respectively. A plurality of first light distribution units 301 are disposed in the first direction X. In this embodiment, a surface of the first light distribution unit 301 and a surface of the second light distribution unit 302 both have a light reflection function.

In this embodiment, the plurality of first light distribution units 301 and a plurality of second light distribution units 302 form a plurality of light distribution cavities 303. The plurality of light distribution cavities 303 are arranged along the first direction X. Each of the light distribution cavity 303 includes a reflection wall (formed by a side wall of a corresponding first light distribution unit 301 and a side wall of a corresponding second light distribution unit 302). At least a part of the light emitting unit 2 in a width direction is located in the light distribution cavity 303. The arrangement of the reflection wall can limit a light output angle of the light emitting unit 2 so as to achieve a function of controlling glare.

In this embodiment, a space is formed between the first light distribution unit 301 and the mounting surface 111. Light generated by the light emitting unit 2 in operation is at least partially transmitted the space, such that there is no obvious dark field on the base 11, thereby improving an illumination effect. In this embodiment, the second light distribution unit 302 is attached to the mounting surface 111. For example, a distance from the second light distribution unit 302 to the mounting surface 111 is smaller than 5 mm, it may mean that the second light distribution unit 302 is attached to the mounting surface 111.

In this embodiment, the second light distribution unit 302 is provided with a groove part 3021, and the lamp tube 23 of the light emitting unit 2 is clamped in the groove part 3021. In other words, the first light distribution unit 301 supports the light emitting unit 2 so as to realize installation of the light emitting unit 2, a simpler structure is achieved, and the light emitting unit 2 needs not to be fixed to the mounting surface 111. During installation, the lamp tube 23 is first clamped in the groove part 3021, and then the optical member 3, together with the end covers 12, is directly fixed to the base 11.

In this embodiment, the light source carrier 1 includes a base 11 and end covers 12 that are disposed at two ends of the base 11. The base 11 defines a mounting surface 111, and the light emitting unit 2 corresponds to the mounting surface 111 (the light emitting unit 2 may not be directly fixed to the mounting surface 111).

In this embodiment, the end cover 12 is fixed to the base 11 by a fixing structure. Specifically, the end cover 12 may be fixed to the base 11 by means of clamping, buckling, or bolting.

In this embodiment, the end cover 12 may include a wall part 121, the wall part 121 defines a first accommodating space 1211 and a second accommodating space 1212, and the basic structure of the end cover is approximately the same as that in the aforementioned examples, which is not described herein again.

In this embodiment, an end part of the light emitting unit 2 disposed in the second accommodating space 1212 (the lamp tube 23 enters into the second accommodating space 1212), and the electric connection unit is completely located in the second accommodating space 1212 and/or the first accommodating space 1211. In this embodiment, at least one light emitter 22 is located in the second accommodating space 1212. When the light emitter 22 located in the second accommodating space 1212 is turned on, light emitted by the light emitter is at least partially emitted out through the end cover 12, thereby avoiding forming a dark field at the end cover 12.

In this embodiment, a wiring terminal may further be provided. In this embodiment, the power source 4 is disposed in the first accommodating space 1211 of one of the end covers 12, while the wiring terminal is disposed in the first accommodating space 1211 of the other end cover 12. In this embodiment, the wiring terminal is configured to be connected to the light emitting unit 2 or connected to an external power source.

In this embodiment, the wiring terminal is connected to the power source by a wire. The wire may be disposed along the mounting surface 111, and two ends of the wire disposed in the first accommodating spaces 1211 of the end covers 12 on the two sides, respectively. Further, the LED illumination device in this embodiment further includes a wire passing unit 5. Differing from that in the aforementioned embodiment, the wire passing unit 5 in this embodiment is directly formed on the optical member 3, and the wire passing unit 5 is provided with a groove part 53 for accommodating the wire. Alternatively, the wire passing unit 5 only has a shielding function and covers an outer side of the wire so that the wire cannot be seen from outside.

In this embodiment, the end cover 12, the optical member 3, and the wire passing unit 5 are formed in integrated structure. The end cover, the optical member, and the wire passing unit are formed by integrated injection molding, realizing more convenient processing. In addition, it is simpler and more convenient to install them after they are integrated.

As shown in FIG. 3A to FIG. 3E, a third embodiment of the present invention provides an LED illumination device. A basic structure in this embodiment may be the same as that in the aforementioned embodiment. The LED illumination device in this embodiment includes a light source carrier 1, a light emitting unit 2, an optical member 3, and a power source 4. The light emitting unit 2 is fixed to the light source carrier 1, and the optical member 3 covers or at least a portion of the optical member 3 covers the light emitting unit 2, so that when the light emitting unit 2 is turned on, light emitted by the light emitting unit is emitted from the LED illumination device partially or totally through the optical member 3. The light emitting unit 2 in this embodiment is non-detachably (irreplaceably) fixed to the light source carrier (therefore the device may be referred to as an integrated illumination device).

Referring to FIG. 3A to FIG. 3D, the light source carrier 1 in this embodiment includes a base 101 (may not include the end cover). The base 101 defines a mounting surface 1011, and the light emitting unit 2 is directly or indirectly fixed to the mounting surface 1011. Further, the light emitting unit 2 includes a lamp board 201 and light emitters 202, the light emitters 202 are fixed to the lamp board 201, and the light emitter 202 may be an LED lamp bead. In this embodiment, the lamp board 201 is attached to the mounting surface 1011. For example, the lamp board 201 is adhered to the mounting surface 1011 by using an adhesive, or the mounting surface 1011 is provided with a mounting structure, so that the lamp board 201 is attached to the mounting surface 1011 by means of clamping, budding, threaded connection, magnetic suction, and the like. In this embodiment, the light emitting unit 2 forms a heat conduction path with the base 101 after the lamp board 201 is fixed to the mounting surface 1011. In this way, heat produced when the light emitting unit 2 is turned on can be conducted to the base 101 and dissipated through the base 101.

In this embodiment, the base 101 is provided with an accommodating space 1012; the light emitting unit 2 and the optical member 3 are both disposed in the accommodating space 1012; and in addition, in a height direction of the base 101, the light emitting unit 2 and the optical member 3 are both within a space defined by the accommodating space 1012.

In this embodiment, the accommodating space 1012 is formed by a first wall part 10121 and a second wall part 10122. In addition, the first wall part 10121 and the second wall part 10122 are both a constituent part of the base 101. The first wall part 10121 is disposed around the second wall part 10122, and the first wall part 10121 protrudes from a lower end wall 10123 of the base 101. The second wall part 10122 may be parallel to or approximately parallel to the lower end wall 10123 of the base 101. The arrangement of the first wall part 10121 and the second wall part 10122 can enhance structural strength of the base 101.

In this embodiment, the power source 4 is disposed on another side of the base 101 and opposite to the light emitting unit 2. Specifically, in a height (or thickness) direction of the LED illumination device, the power source 4 is limited within a height (or thickness) range defined by the second wall part 10122 and the lower end wall 10123. In other words, the power source 4 does not increase an additional height (or thickness) of the LED illumination device, so as to control the height (or thickness) of the LED illumination device, thereby facilitating control on a packaging dimension and reducing a transportation cost.

In an embodiment, two accommodating spaces 1012 are provided; the two accommodating spaces 1012 are connected by a connecting wall 10124; and each of accommodating spaces 1012 is provided with a light emitting unit 2 and an optical member 3. The power source 4 is disposed between the first wall parts 10121 of the two accommodating spaces 1012. Specifically, the power source 4 is fixed to the connecting wall 10124 between the two accommodating spaces 1012. In addition, the power source 4 installed on the connecting wall 10124 can enhance structural strength of the connecting wall 10124. As shown in FIG. 3E, in another embodiment, one accommodating space 1012 is provided. In this case, the power source 4 is disposed at one end of the LED illumination device in a longitudinal direction.

In this embodiment, the lamp board 201 is a flexible circuit board or a flexible substrate. The first wall part 10121 is provided with a hole 10125, and the lamp board 201 is electrically connected to the power source 4 after the lamp board passing through the hole 10125. In an embodiment, the lamp board 201 may be directly connected to the power source 4 by soldering. In an embodiment, the lamp panel 201 and the power source 4 may be soldered after being positioned by a positioning unit.

In this embodiment, the optical member 3 is attached to the mounting surface 1011. Further, the optical member 3 in this embodiment may be directly fixed to the mounting surface 1011. In an embodiment, the optical member 3 is directly adhered to the mounting surface 1011. In an embodiment, the optical member 3 is fixed to the mounting surface 1011 by a fixing structure, such as a bolt and a buckle.

In this embodiment, the optical member 3 is configured to control a light output angle and light output uniformity of the LED illumination device. For example, when the light emitting unit 2 is turned on and the emitted light is emitted from the LED illumination device through the optical member 3, a light emission angle of the LED illumination device is controlled to be 80 to 130 degrees. Further, when the light emitting unit 2 is turned on and the emitted light is emitted from the LED illumination device through the optical member 3, the light emission angle of the LED illumination device is controlled to be 90 to 120 degrees. Furthermore, when the light emitting unit 2 is turned on and the emitted light is emitted from the LED illumination device through the optical member 3, the light emission angle of the LED illumination device is controlled to be 90 to 100 degrees.

Figure 3A:
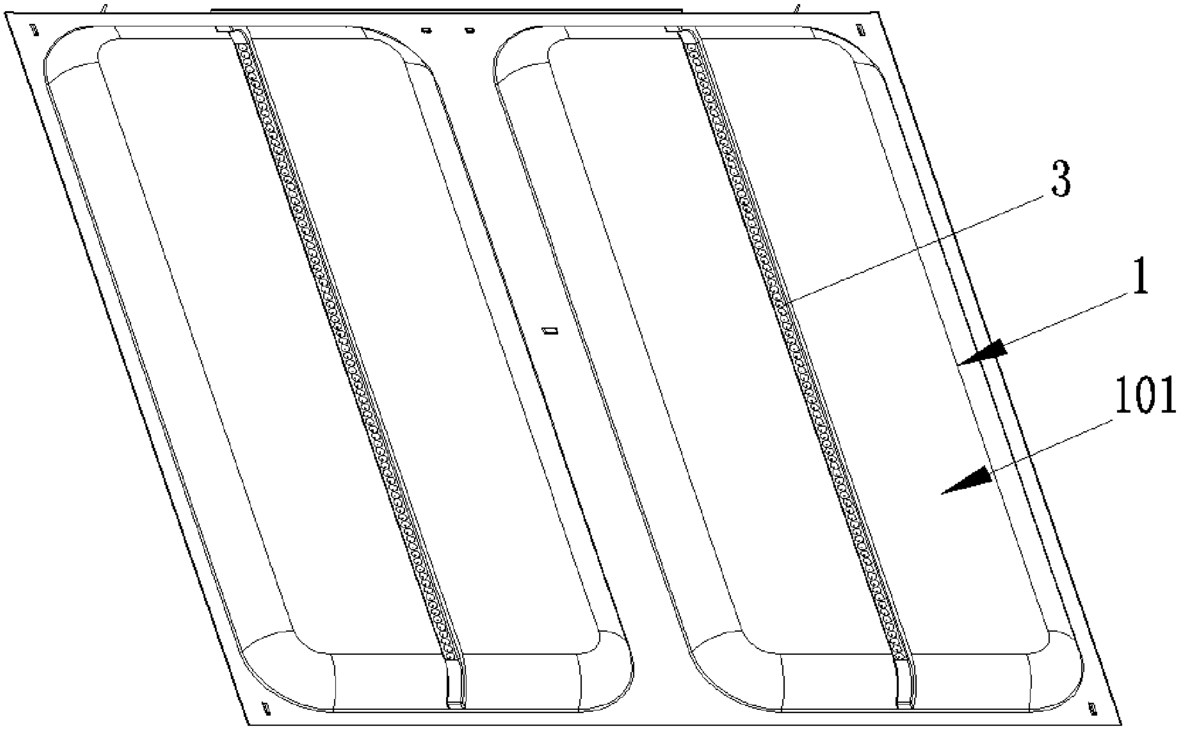
FIG. 3A is a stereoscopic schematic diagram I of an LED illumination device according to a third embodiment of present invention.
Figure 3B:
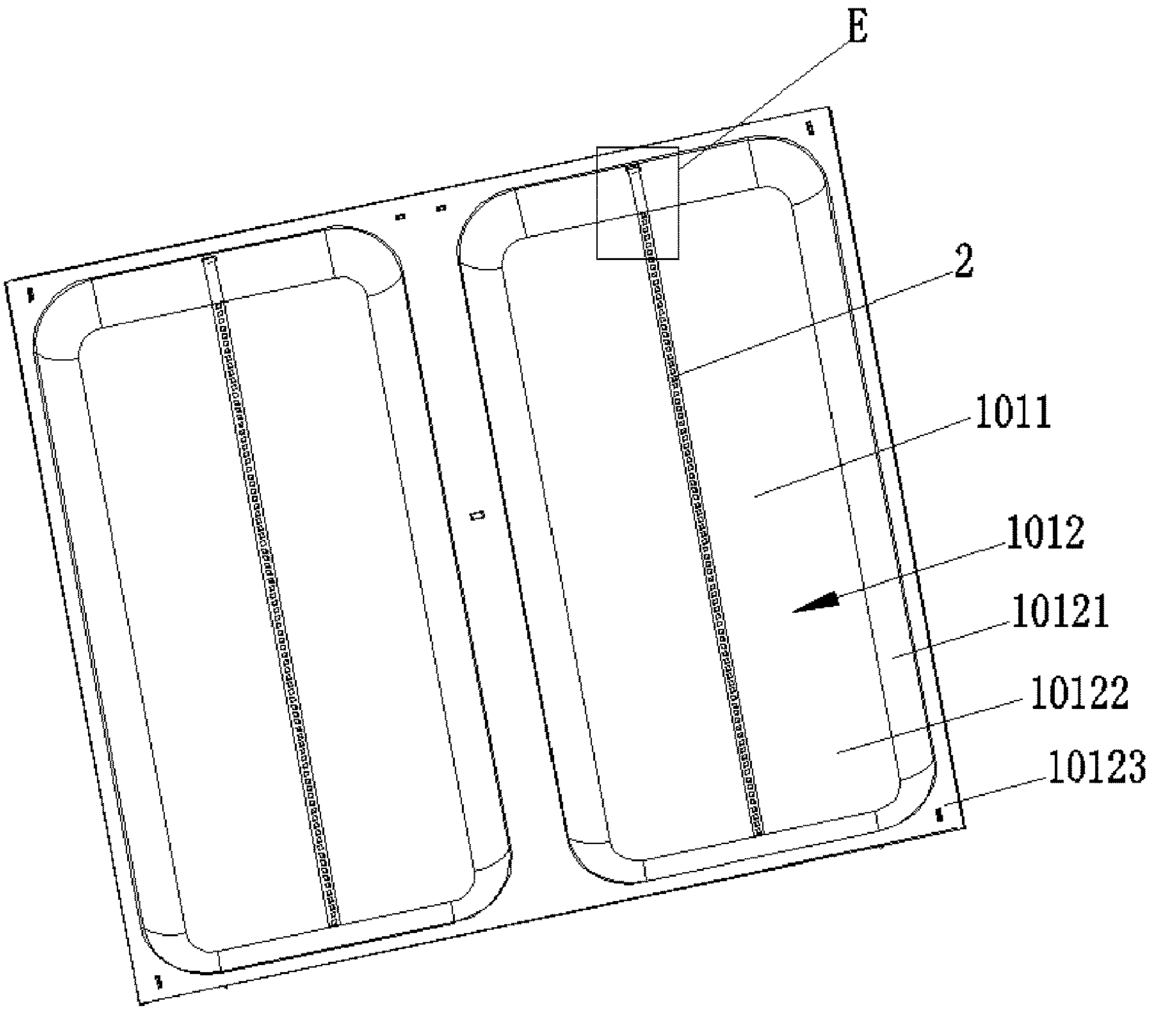
FIG. 3B is a stereoscopic schematic diagram of FIG. 3A with an optical member removed.
Figure 3C:
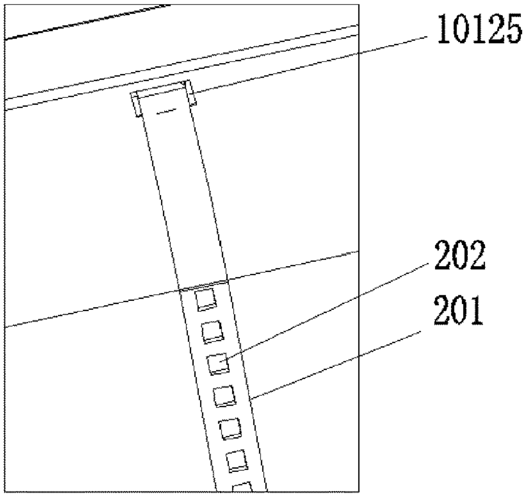
FIG. 3C is an enlarged view of a location E in FIG. 3B.
Figure 3D:
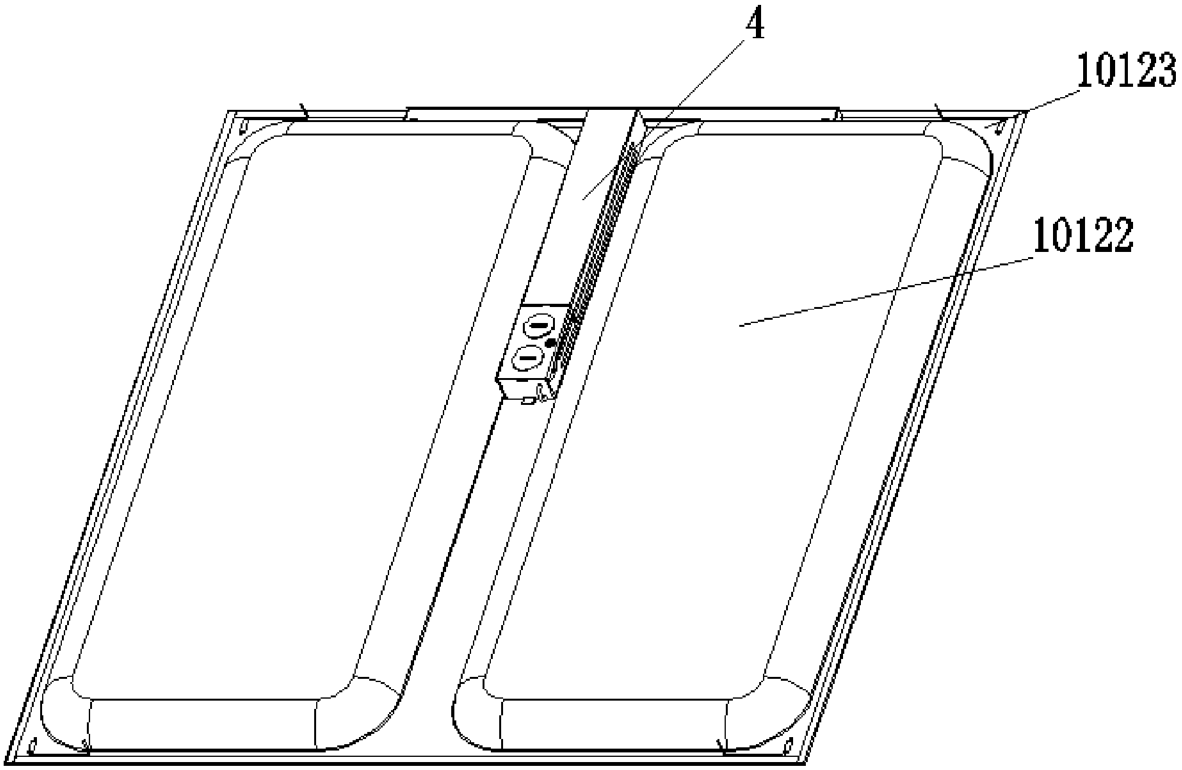
FIG. 3D is a stereoscopic schematic diagram II of the LED illumination device according to the third embodiment of present invention.
Figure 3E:
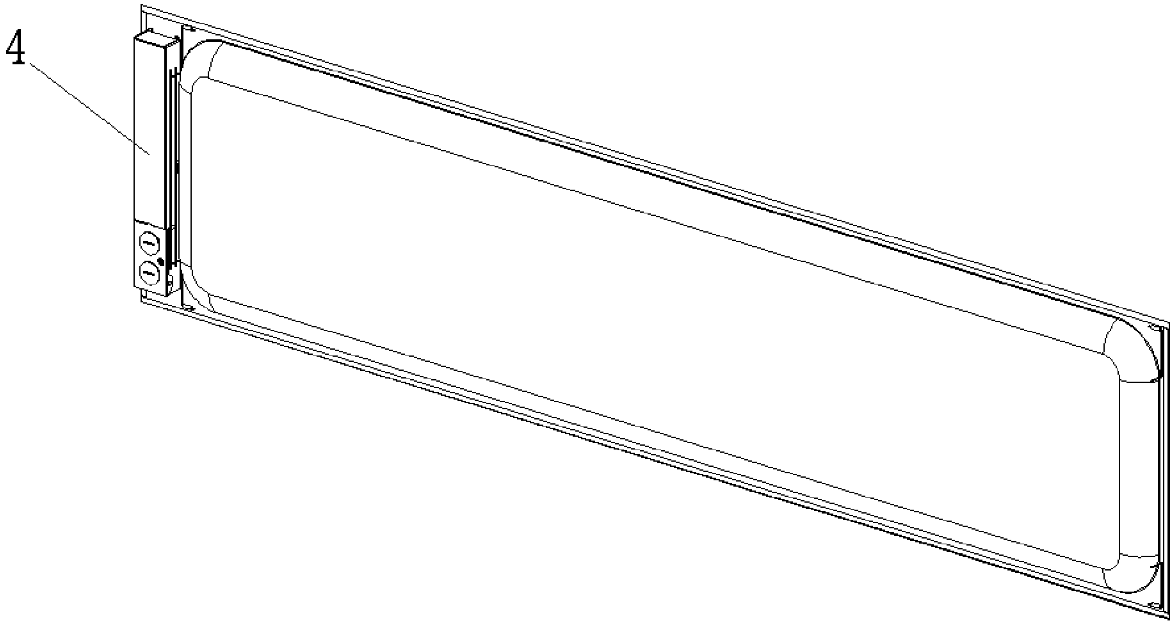
FIG. 3E is a stereoscopic schematic diagram of the LED illumination device according to the third embodiment of present invention.

Referring to FIG. 3A, FIG. 3B, and FIG. 1G, in this embodiment, in order to control the light output uniformity of the LED illumination device, a ratio of an illuminance of the light emitted when the light emitting unit 2 is turned on within a range of first area A to an average illuminance within a range of second area B is greater than 0.3, 0.4, 0.5, 0.6, 0.7, 0.8 or 0.9, and less than 2. In some embodiments, the ratio of the illuminance within the range of first area A to the average illuminance within the range of second area B is greater than 0.5 and less than 1.5. In some embodiments, the ratio of the illuminance within the range of first area A to the average illuminance within the range of second area B is greater than 0.7 and less than 1.3. The first area A and the second area B are located on a same plane. In addition, the first area A and the second area B are both located on a third area C (the third area C, the first area A and the second area B are located on a same plane), while a light beam angle c corresponding to the third area C is 90 degrees, 80 degrees, 60 degrees, or 50 degrees. In this embodiment, the light beam angle c may be smaller than the light emission angle of the LED illumination device. In this embodiment, the light output uniformity is measured based on an illuminance difference within a range of 50 degrees of the light beam angle. Therefore, a light beam angle corresponding to the third area C is 50 degrees. In addition, the first area A and the second area B may be any area in the third area C. It should be noted that the light beam angle a mentioned here does not mean an included angle formed by boundary lines of a lighting area. In this embodiment, a location of a center or circle center of the third area C corresponds to the LED illumination device. That is, when the LED illumination device is projected to the third area C along an optical axis D, projection of the LED illumination device is located or approximately located in the center or circle center of the third area C. In this embodiment, the plane where the first area A and the second area B are located is perpendicular to or approximately perpendicular to the optical axis D.

Referring to FIG. 3A, FIG. 3B, and FIG. 1H, in an embodiment, in order to control the light output uniformity of the LED illumination device, a ratio of an illuminance of the light emitted when the light emitting unit 2 is turned on within a range of first area A to an average illuminance within a range of second area B is greater than 0.3, 0.4, 0.5, 0.6, 0.7, 0.8 or 0.9, and less than 2. In some embodiments, the ratio of the illuminance within the range of first area A to the average illuminance within the range of second area B is greater than 0.5 and less than 1.5. In some embodiments, the ratio of the illuminance within the range of first area A to the average illuminance within the range of second area B is greater than 0.7 and less than 1.3. The first area A and the second area B are located on a same plane, and are concentrically or approximately concentrically disposed (assuming that all the areas are circular or approximately circular, with their centers or circle centers being located at same positions). In addition, the first area A and the second area B are both located on a third area C (the third area C, the first area A and the second area B are located on a same plane), while a light beam angle c corresponding to the third area C is 90 degrees, 80 degrees, 60 degrees, or 50 degrees. In this embodiment, the light beam angle may be smaller than the light emission angle of the LED illumination device. In this embodiment, the light output uniformity is measured based on an illuminance difference within a range of 50 degrees of the light beam angle. Therefore, a light beam angle c corresponding to the third area C is 50 degrees. In addition, the first area A, the second area B and the third area C are concentrically or approximately concentrically disposed. Moreover, a light beam angle a corresponding to the first area A and a light beam angle b corresponding to the second area B are both smaller than the light beam angle c corresponding to the third area C. It should be noted that the light beam angles mentioned here do not mean included angles formed by boundary lines of lighting areas. In this embodiment, a location of a center or circle center of the third area C corresponds to the LED illumination device. That is, when the LED illumination device is projected to the third area C along an optical axis D, projection of the LED illumination device is located or approximately located in the center or circle center of the third area C. In this embodiment, the plane where the first area A and the second area B are located is perpendicular to or approximately perpendicular to the optical axis D.

In an embodiment, the optical member 3 may be an integrated structure that covers the light emitting unit 2. In an embodiment, the optical member 3 is in a multi-section form. That is, one light emitting unit 2 is correspondingly provided with a plurality of optical members 3.

Figure 4A:
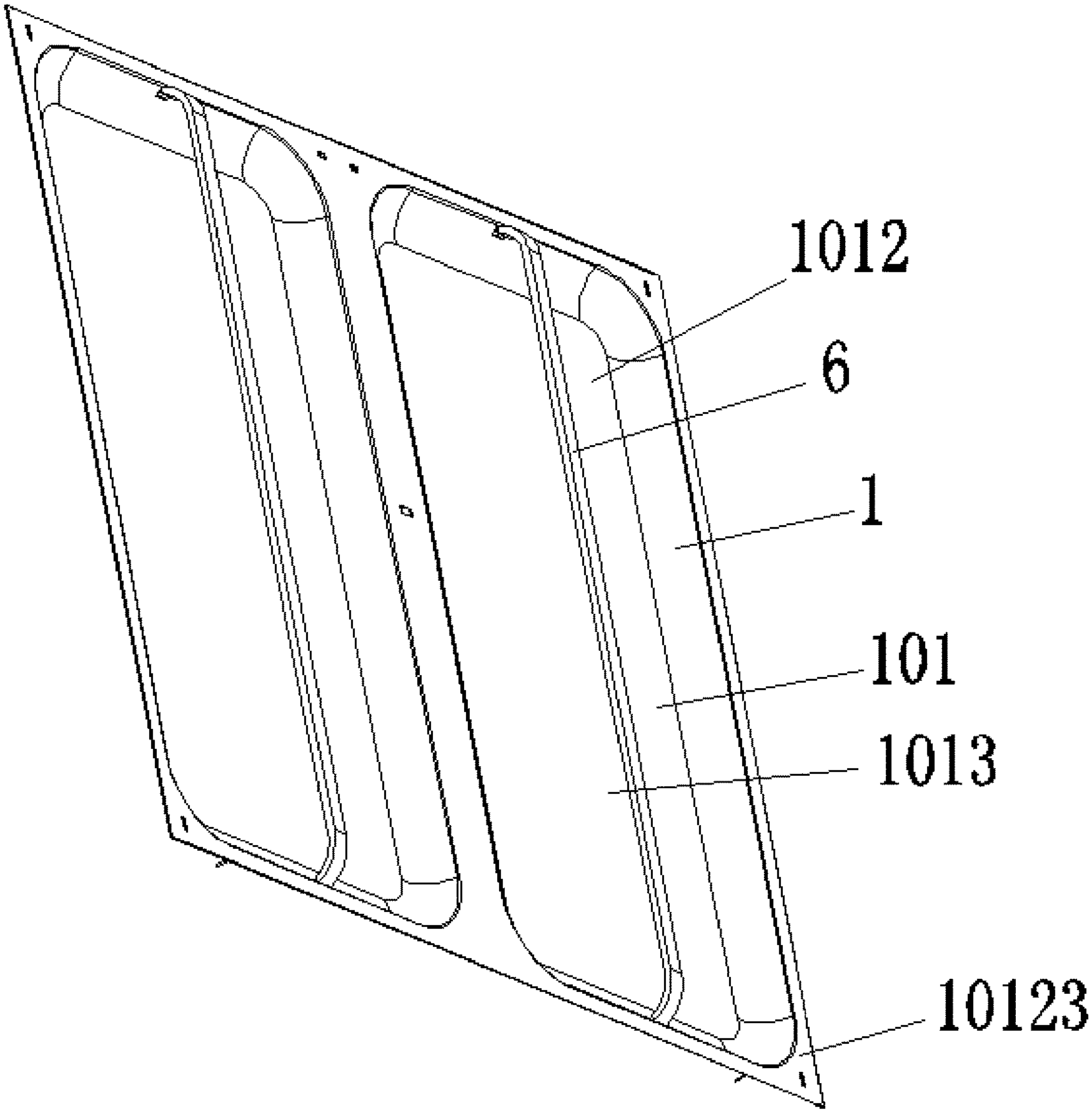
FIG. 4A is a stereoscopic schematic diagram of an LED illumination device according to a fourth embodiment of present invention.
Figure 4B:
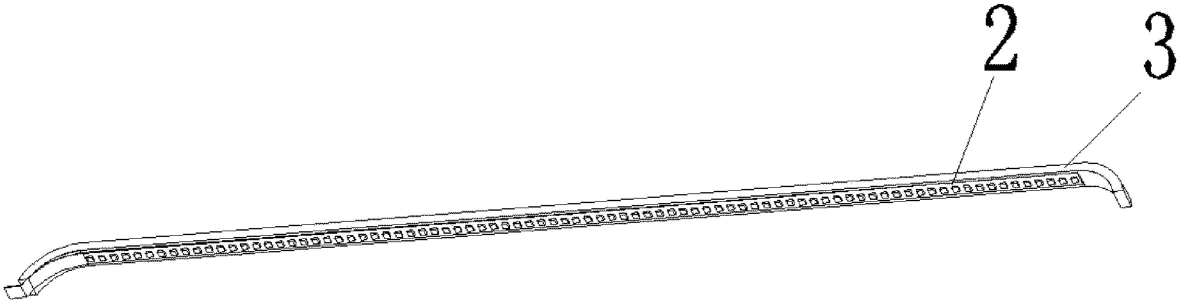
FIG. 4B is a schematic diagram showing fitting of a light emitting unit and a mounting unit.

As shown in FIG. 4A to FIG. 4B, a fourth embodiment of present invention provides an LED illumination device. A basic structure in this embodiment is the same as that in the aforementioned embodiments. The difference is an installation way of the light emitting unit 2. Specifically, the LED illumination device in this embodiment includes a light source carrier 1, a light emitting unit 2, an optical member, and a mounting unit 6, and the light emitting unit 2 is fixed to the mounting unit 6. The light source carrier 1 includes a base 101, and the light emitting unit 2 is disposed by facing the base 101. In this embodiment, at least 80% of light generated by the light emitting unit 2 in operation is emitted from the LED illumination device after being reflected by the base 101.

Further, the base 101 is provided with an optical surface 1013 to reflect the light generated by the light emitting unit 2. In this embodiment, light is emitted by reflecting from the base 101, realizing more uniform light output and better facilitating control on a glare rating.

In this embodiment, the mounting unit 6 has a first state and a second state. When the mounting unit is in the first state, the light emitting unit 2 is disposed facing the base 101. In this case, the light emitting unit 2 and the mounting unit 6 exceed a range defined by the base 101 in a height (or thickness) direction of the LED illumination device, that is, the light emitting unit 2 and the mounting unit 6 exceed a lower end wall 10123 of the base 101. When the mounting unit is in the second state, the light emitting unit 2 and the mounting unit 6 are accommodated in an accommodating space 1012 of the base 101, and the light emitting unit 2 and the mounting unit 6 are both within the range defined by the base 101 in the height (or thickness) direction of the LED illumination device, that is, the light emitting unit 2 and the mounting unit 6 do not exceed the lower end wall 10123 of the base 101, thereby reducing a packaging dimension.

In an embodiment, the mounting unit 6 is rotatably connected to the base 101. In addition, the mounting unit 6 switches between the first state and the second state during rotation.

In an embodiment, the mounting unit 6 is slidably connected to the base 101 along a height (thickness) direction of the base 101, so as to switch between the first state and the second state based on different locations of the mounting unit with respect to the base 101.

In the above embodiment, when the mounting unit is in the first state and/or the second state, a locking unit may be provided for positioning, so that the mounting unit can be maintained in the first type or the second type.

In this embodiment, similarly, an optical member may be further provided, so as to enable an LED lamp in this embodiment to have a better light output performance.

Figure 5A:
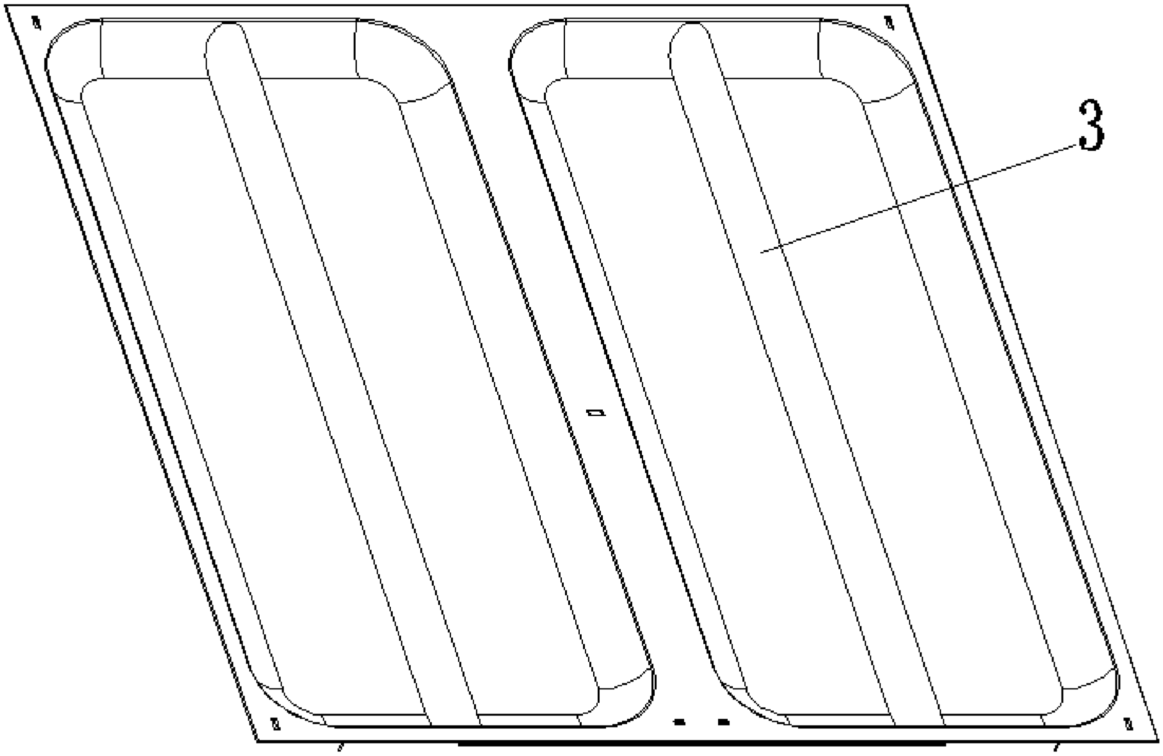
FIG. 5A is a stereoscopic schematic diagram of an LED illumination device according to a fifth embodiment of present invention.
Figure 5B:
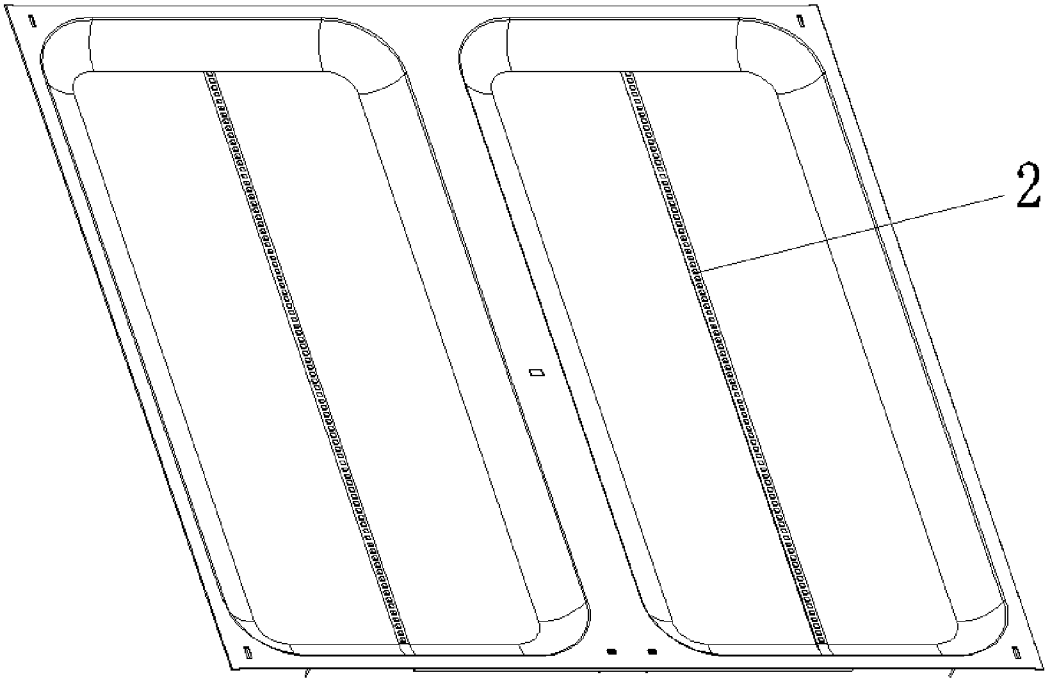
FIG. 5B is a stereoscopic schematic diagram of FIG. 5A with an optical member removed.

As shown in FIG. 5A to FIG. 5B, a fifth embodiment of present invention provides an LED illumination device. A basic structure in this embodiment is the same as that in the aforementioned embodiment. The difference is that the optical member 3 in this embodiment is an optical cover. The optical cover is coated with a diffusion layer, or the optical cover has a diffusion function due to its material properties, thereby reducing glare and achieving more uniform light output.

Figure 6A:
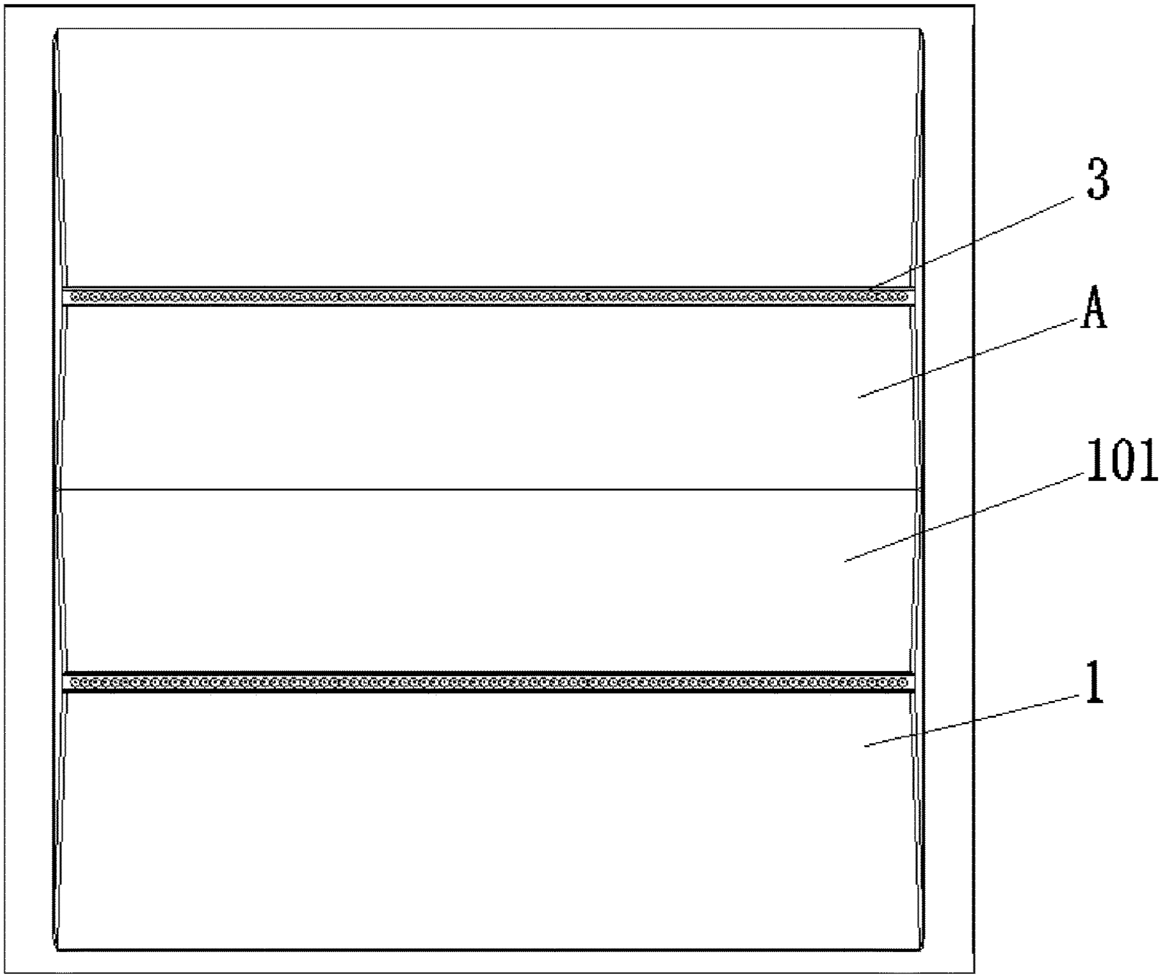
FIG. 6A is a schematic front view of an LED illumination device according to a sixth embodiment of present invention.
Figure 6B:
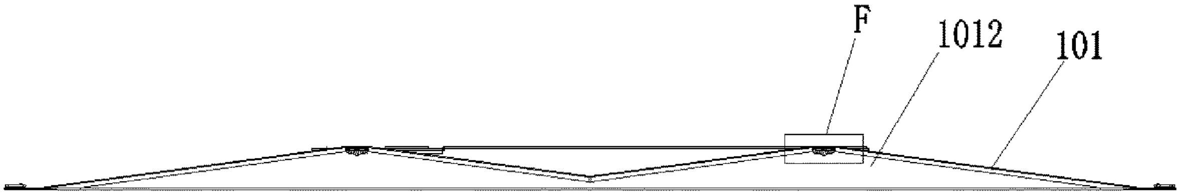
FIG. 6B is a schematic cross-sectional view of the LED illumination device according to the sixth embodiment of present invention.
Figure 6C:
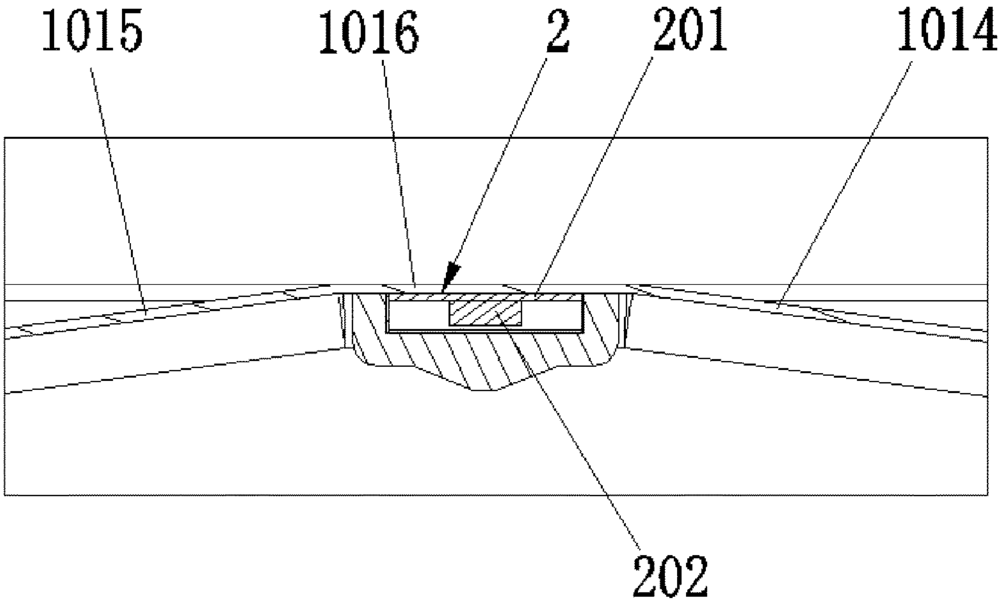
FIG. 6C is an enlarged view of a location F in FIG. 6B.
Figure 6D:
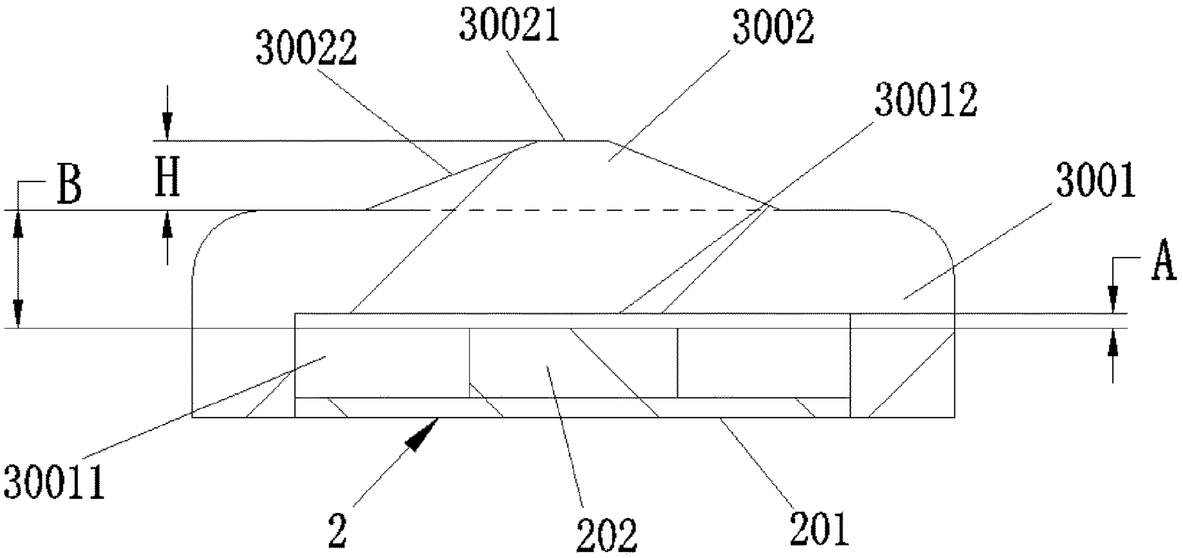
FIG. 6D is a schematic diagram I showing fitting of a light emitting unit and an optical member.
Figure 6E:
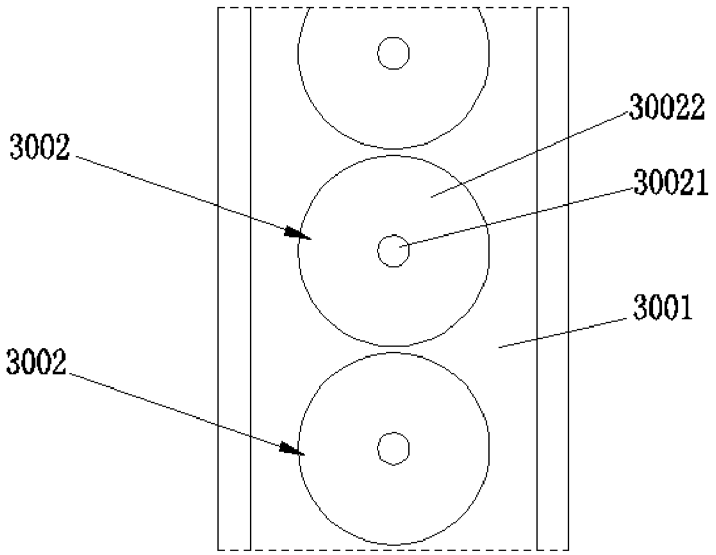
FIG. 6E is a partial schematic diagram of an optical member.
Figure 6F:
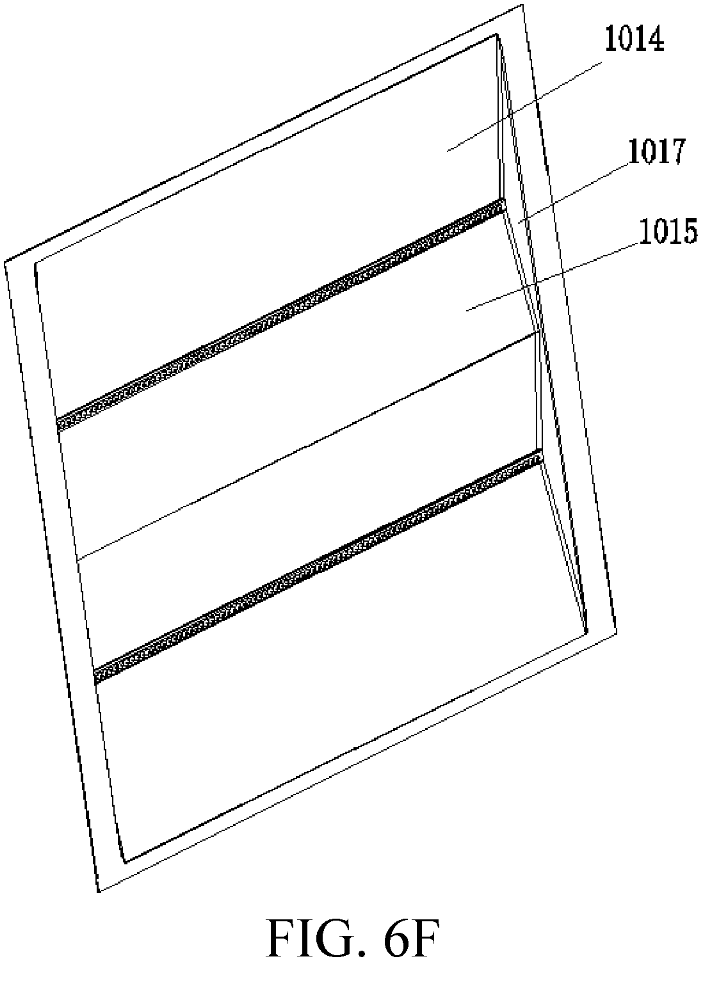
FIG. 6F is a stereoscopic schematic diagram I of the LED illumination device according to the sixth embodiment.
Figure 6G:
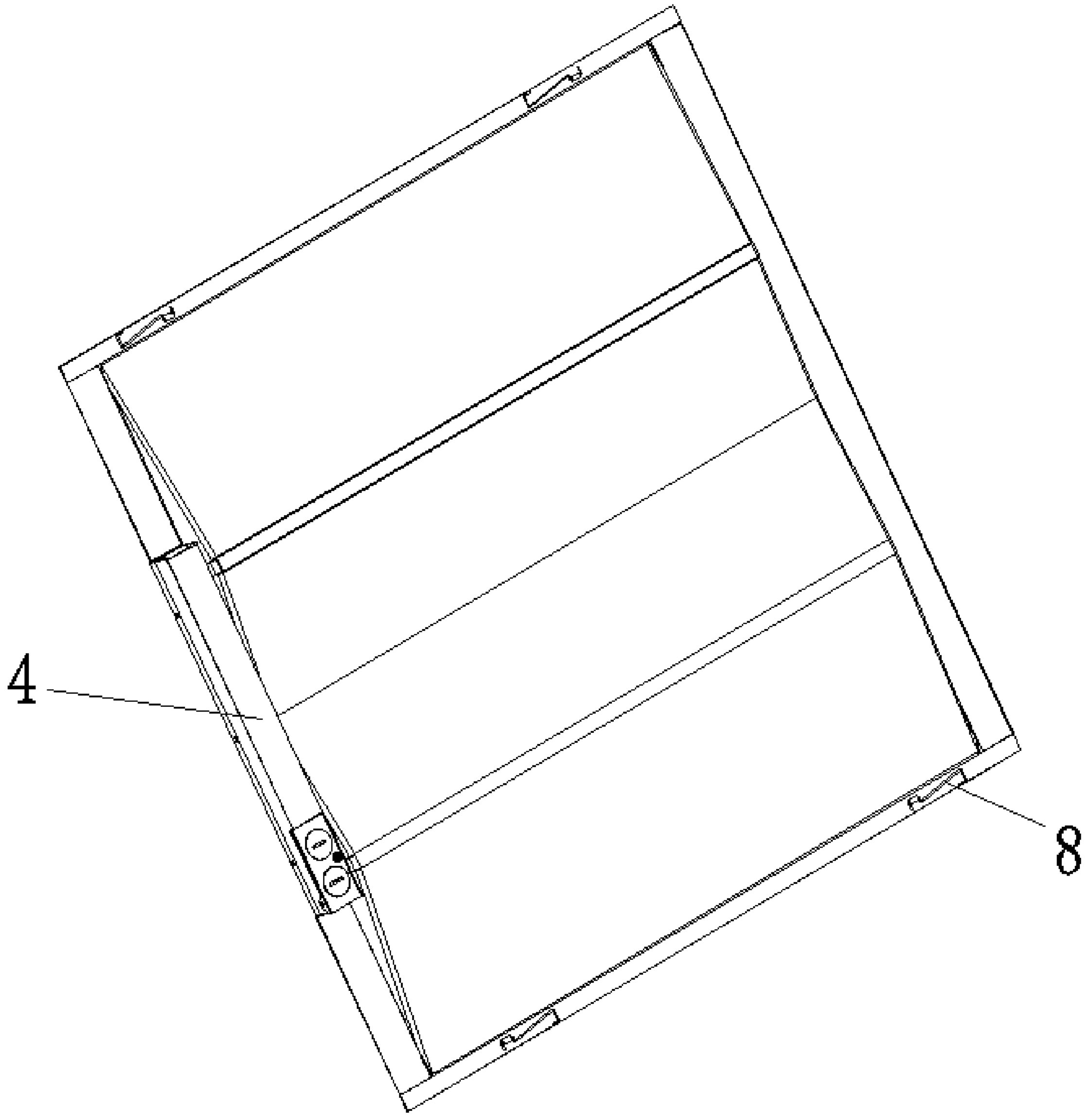
FIG. 6G is a stereoscopic schematic diagram II of the LED illumination device according to the sixth embodiment.
Figure 6H:
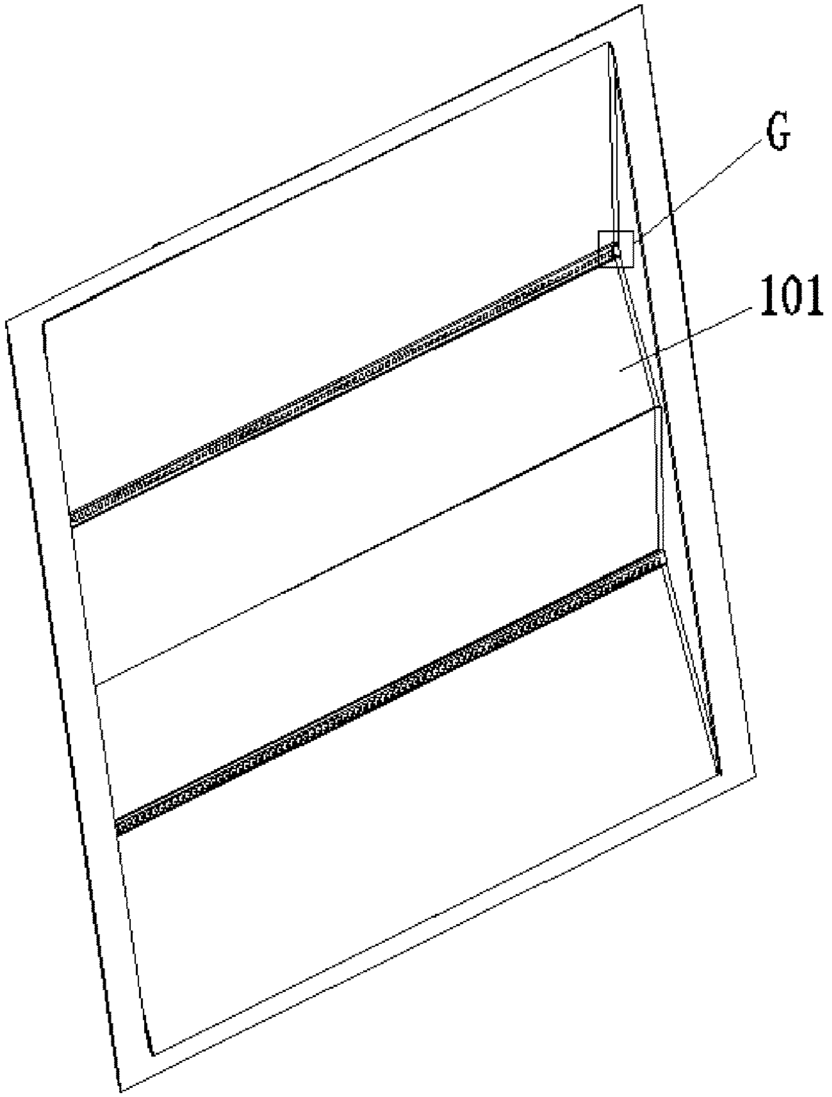
FIG. 6H is a schematic diagram of FIG. 6F with an optical member removed.
Figure 6I:
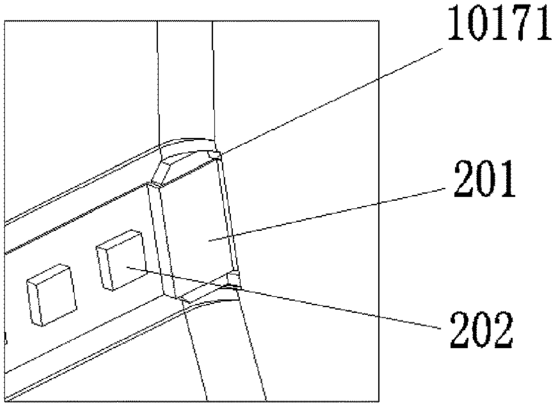
FIG. 6I is an enlarged view of a location G in FIG. 6H.
Figure 6J:
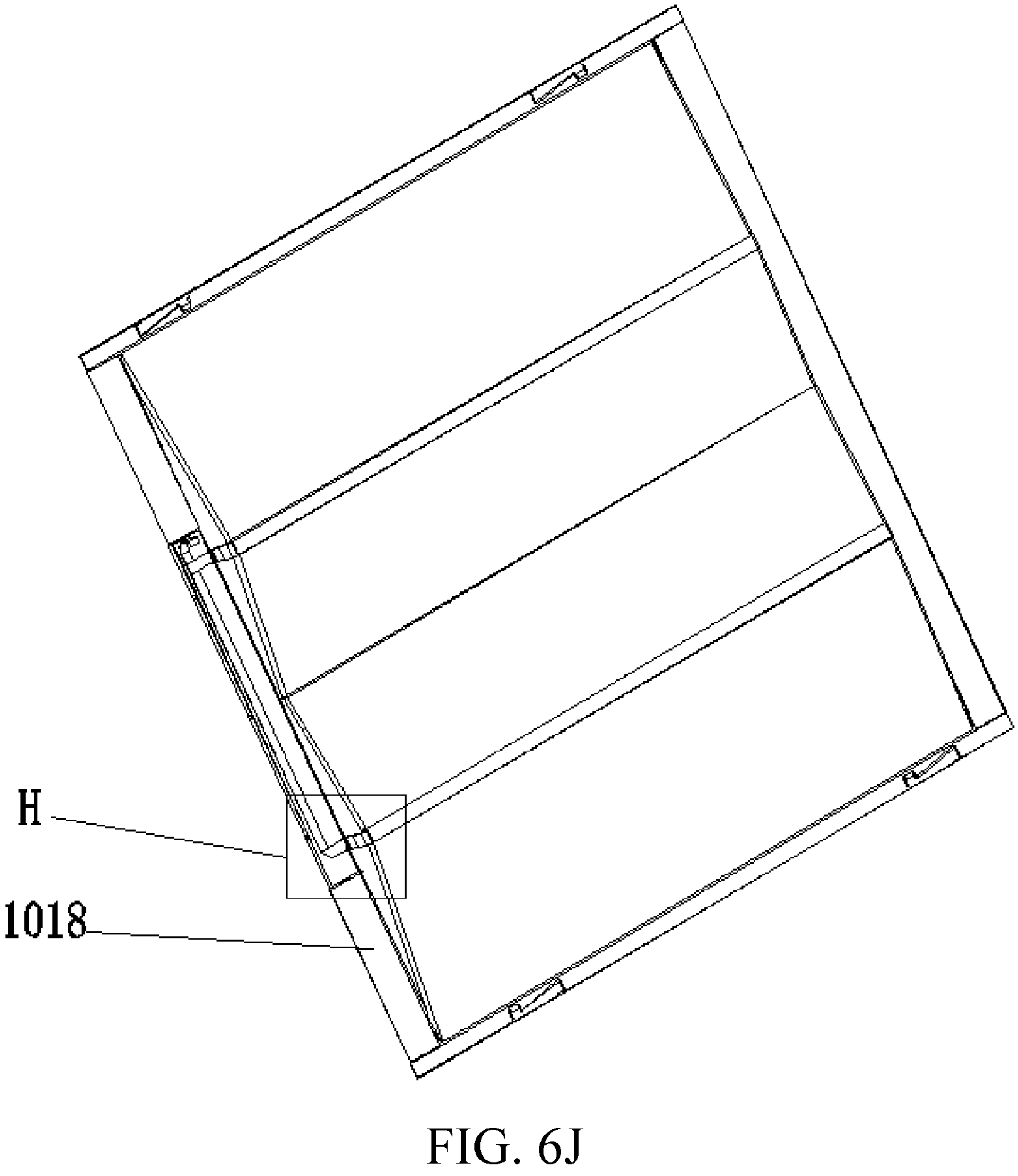
FIG. 6J is a stereoscopic schematic diagram of the LED illumination device according to the sixth embodiment with a power source removed.
Figure 6K:
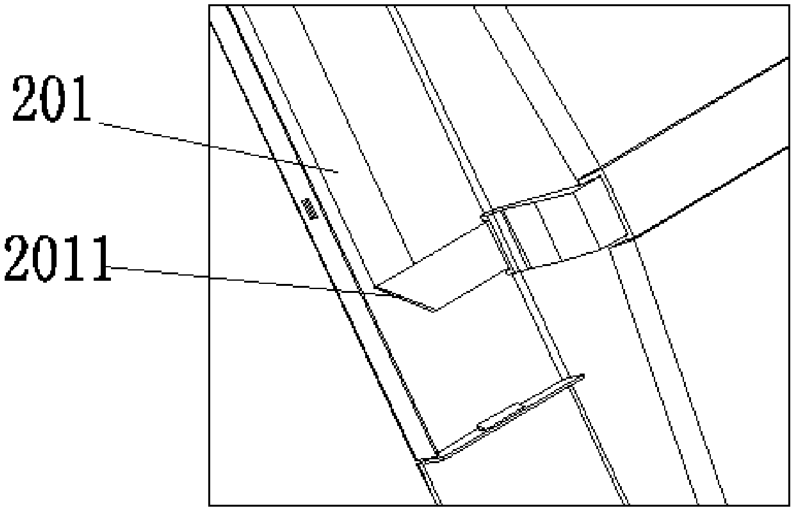
FIG. 6K is an enlarged schematic diagram of a location H in FIG. 6J.
Figure 6L:
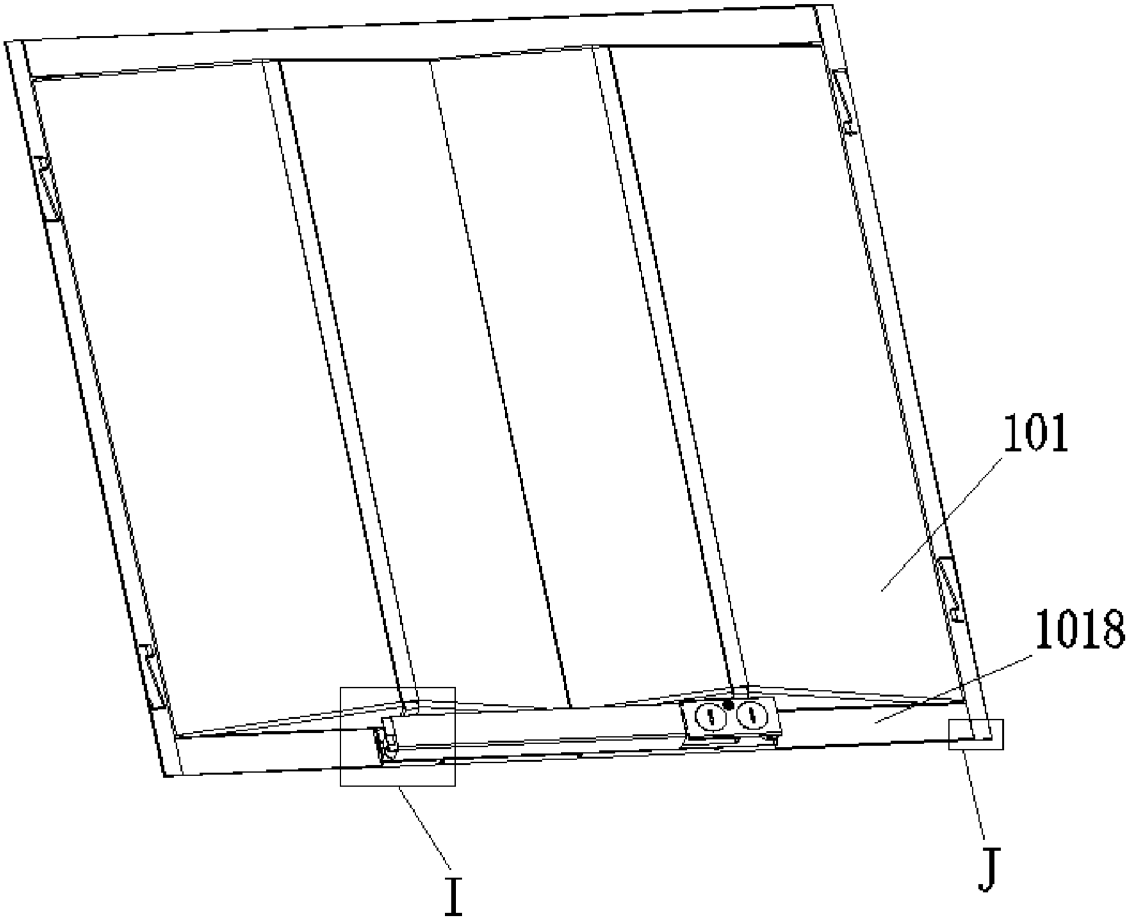
FIG. 6L is a stereoscopic schematic diagram of a power box in a stereoscopic schematic diagram of the LED illumination device according to the sixth embodiment with the power source removed.
Figure 6M:
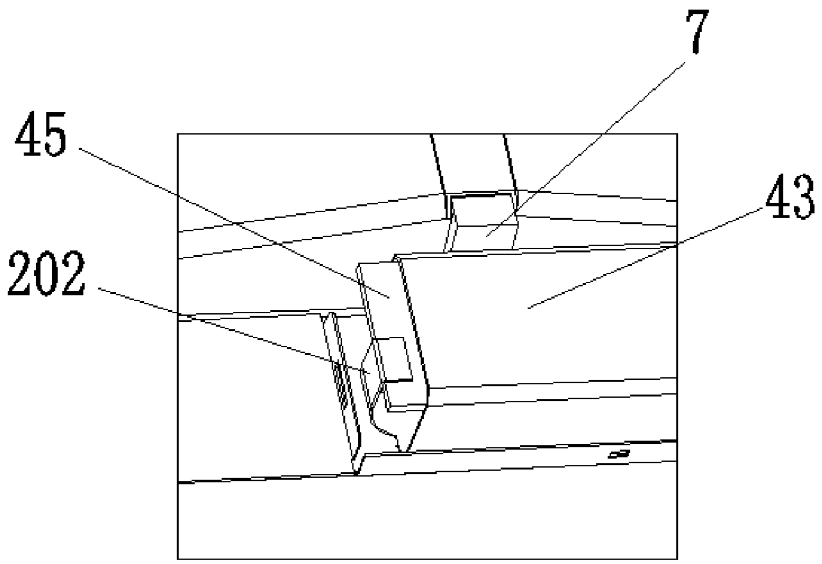
FIG. 6M is an enlarged view of a location I in FIG. 6L.
Figure 6N:
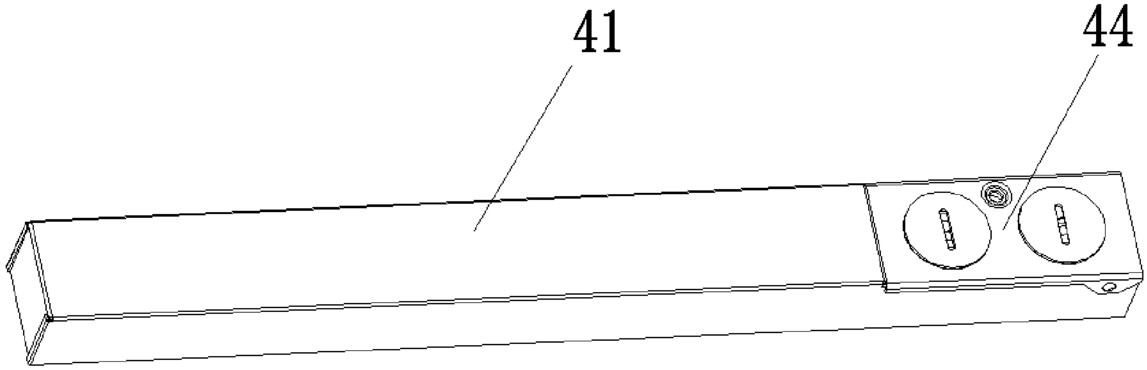
FIG. 6N is a stereoscopic schematic diagram of a power source according to the sixth embodiment.
Figure 6O:
FIG. 6O is a schematic diagram of FIG. 6N with a wiring board removed.
Figure 6P:
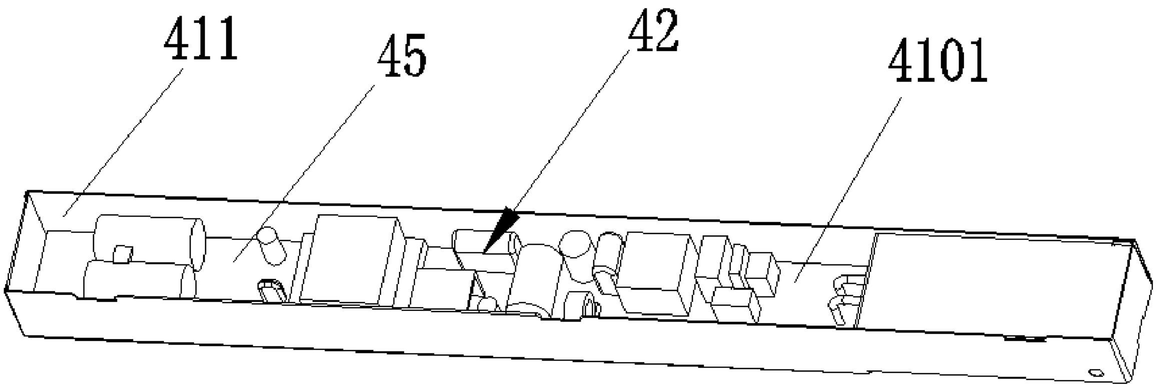
FIG. 6P is a stereoscopic schematic diagram of the power source according to the sixth embodiment with an isolation tube removed.
Figure 6R:
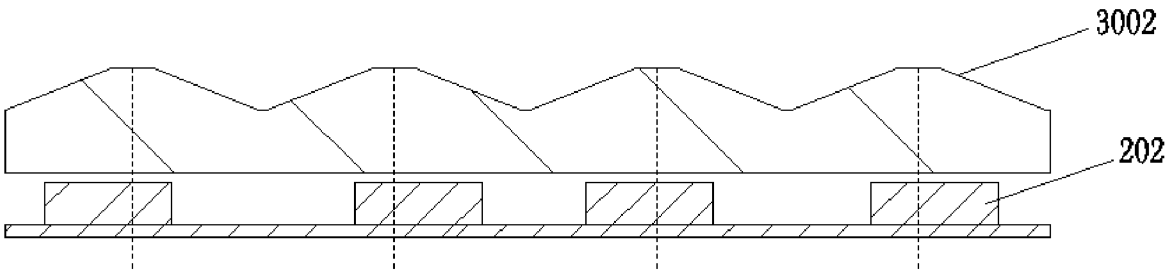
FIG. 6R is an enlarged view of a location J in FIG. 6L.

As shown in FIG. 6A to FIG. 6P, a sixth embodiment of present invention provides an LED illumination device. A basic structure of the LED illumination device in this example is the same as that in aforementioned third embodiment. In this embodiment, the LED illumination device includes a light source carrier 1, a light emitting unit 2, an optical member 3, and a power source 4. The light emitting unit 2 is fixed to the light source carrier 1, and the optical member 3 covers or at least a portion covers the light emitting unit 2, so that when the light emitting unit 2 is turned on, light emitted by the light emitting unit is at least partially or completely emitted from the LED illumination device through the optical member 3. In an embodiment, when the light emitting unit 2 is turned on, at least 80% of luminous flux emitted by the light emitting unit is directly emitted (without being reflected by the base 101 or the like) from the LED illumination device through the optical member 3. In an embodiment, when the light emitting unit 2 is turned on, at least 90% of luminous flux emitted by the light emitting unit is directly emitted (without being reflected by the base 101 or the like) from the LED illumination device through the optical member 3. The light emitting unit 2 in this embodiment is non-detachably (irreplaceably) fixed to the light source carrier (therefore the device may be referred to as an integrated illumination device).

Referring to FIG. 6A to FIG. 6F, the light source carrier 1 in this embodiment includes a base 101 (may not include the above detachable end cover). The base 101 defines a mounting surface, and the light emitting unit 2 is directly or indirectly fixed to the mounting surface. Further, the light emitting unit 2 includes a lamp board 201 and light emitters 202, the light emitters 202 are fixed to the lamp board 201, and the light emitters 202 may be an LED lamp beads. In this embodiment, the lamp board 201 is attached to the mounting surface. For example, the lamp board 201 is adhered to the mounting surface by using an adhesive, or the mounting surface is provided with a mounting structure, so that the lamp board 201 is attached to the mounting surface by means of clamping, buckling, threaded connection, magnetic suction, and the like. In this embodiment, the light emitting unit 2 forms a heat conduction path with the base 101 after the lamp board 201 is fixed to the mounting surface. In this way, heat produced when the light emitting unit 2 is turned on can be conducted to the base 101 and dissipated by the base 101.

In this embodiment, the base 101 is provided with an accommodating space 1012; the light emitting unit 2 and the optical member 3 are both disposed in the accommodating space 1012; and in addition, in a height direction of the base 101, the light emitting unit 2 and the optical member 3 are both within a range defined by the accommodating space 1012 (a range defined by the accommodating space 1012 in a height direction of the LED illumination device). In this embodiment, two accommodating spaces 1012 may be provided, and thus two light emitting units 2 and optical members 3 are provided correspondingly.

In this embodiment, the base 101 includes a first wall 1014, a second wall 1015, and a mounting wall 1016. The lamp board 201 of the light emitting unit 2 is at least partially or completely fixed to the mounting wall 1016. In an embodiment, a part of the lamp board 201 in a width direction is attached to the mounting wall 1016 (to make sure that the lamp board 201 provided with the light emitter 202 is attached to the mounting wall 1016), while two sides of the lamp board 201 in the width direction are attached to the first wall 1014 and the second wall 1015. In this embodiment, the first wall 1014 and the second wall 1015 may both be a plane. When the LED illumination device is installed horizontally, each of the first wall 1014 and the second wall 1015 forms an included angle with a horizontal plane. In this embodiment, the arrangement of the mounting wall 1016 may facilitate installation of the light emitting unit 2, so that the light emitter 202 may provide downward light emission after the lamp panel 201 is installed on the mounting wall 1016. The mounting wall 1016 may be provided with a plane for installing the lamp board 201. In this embodiment, the attachment may be approximate attachment. That is, 30% or more of area of the back surface of the lamp board 201 is attached to the mounting wall 1016. In this embodiment, the attachment may mean that the lamp board 201 is attached to the mounting wall 1016 by using another medium (such as an adhesive).

In this embodiment, the base 101 further includes end walls 1017, and the end walls 1017 are disposed at end parts of the first wall 1014 and the second wall 1015 and are connected to both of the first wall 1014 and the second wall 1015. The first wall 1014, the second wall 1015, the mounting wall 1016, and the end wall 1017 define a structure of the accommodating space 1012 and a space of the accommodating space 1012. The arrangement of the end wall 1017, the first wall 1014 and the second wall 1015 can guarantee structural strength of the base 101. The arrangement of the end wall 1017 can guarantee the structural strength of the LED illumination device while the end cover is omitted.

Figure 6S:
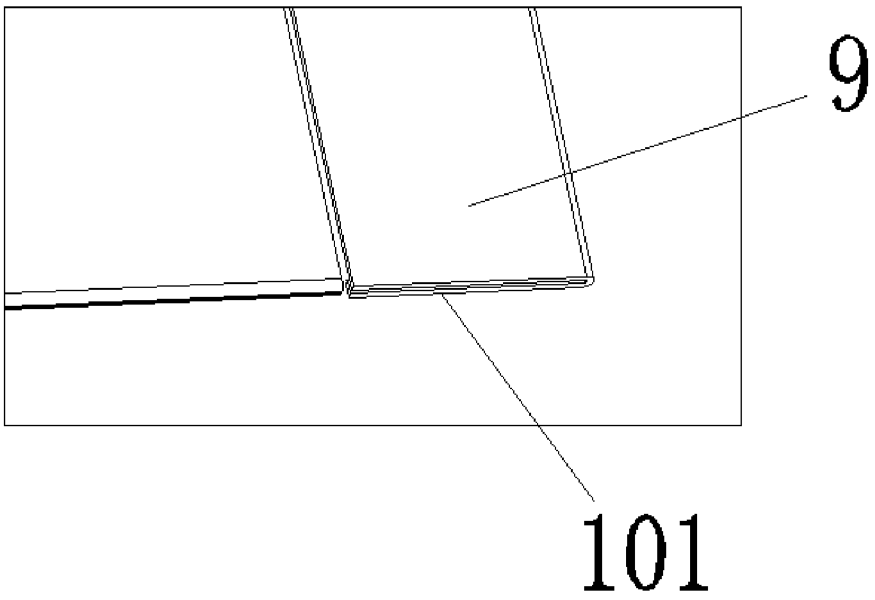
FIG. 6S is a partial schematic diagram showing fitting of an optical member and a base.

In this embodiment, the LED illumination device includes only one optical member 3 (one light emitting unit 2 is provided with only one optical member 3; and when a plurality of light emitting units 2 are provided, each of light emitting units 2 is correspondingly provided with only one optical member 3). In this embodiment, only one optical member 3 is provided, and therefore light loss caused by arranging the optical member can be reduced. When the LED illumination device in this embodiment includes only one optical member 3, a light output rate (a light output rate refers to a ratio of a promised luminous flux emitted by the LED illumination device to a luminous flux generated by the light emitting unit 2) of the LED illumination device may be as high as 90%, 92%, or 95% or more. In this embodiment, the optical member 3 is completely accommodated in the accommodating space 1012, so as not to increase additional height of the LED illumination device. In other words, the optical member 3 does not exceed a space defined by the base 101 in the height direction of the LED illumination device. In this embodiment, the light emitting unit 2 and the optical member 3 at least partially overlap with each other in the height direction of the LED illumination device, so as to reduce a height after the light emitting unit 2 and the optical member 3 are combined together, and also reduce a distance between the light emitting unit 2 and the optical member 3, thereby reducing light loss within the distance. Further, the light emitting unit 2 does not exceed a range defined by the optical member 3 in the height direction of the LED illumination device. As shown in FIG. 6S, the base 101 may be provided with a fixing unit 1019, and the optical member 3 is fixed to and positioned on the base 101 by the fixing unit 1019. In this embodiment, the fixing unit 1019 includes an arm part 10191, the arm part 10191 is integrally formed on the base 101, and the arm part 10191 fixes the optical member 3 by means of pressing or buckling. During assembling, the arm part 10191 is bent, so as to fix the optical member 3. Further, in order to realize positioning of the optical member 3 in a length direction, the optical member 3 is provided with positioning gaps 304, and the arm parts 10191 are clamped into the positioning gaps 304, so as to realize fixation and positioning of the optical member 3. In this embodiment, the optical member 3 is provided with a plurality of positioning gaps 304, so that the plurality of positioning gaps fit with the plurality of arm parts 10191, thereby preventing deflection of the optical member 3.

In this embodiment, the optical member 3, approximately, only covers the lamp board 201 without additionally covering an area of the base 101. For example, an area, covered by the optical member 3, of the front surface of the base 101 is not more than 10% of a total area of the base 101 in front of view. In this embodiment, the area of the base 101 in front of view refers to a projection area perpendicular to a direction of the lamp board 201. Specifically, the area of the base 101 in front of view is a product of a length and a width of the base 101. The area, covered by the optical member 3, of the base 101 in front of view refers to projection area of the optical member 3 on the base 101 in front of view, and actually, the area is a product of a length and a width of the optical member. In this embodiment, the optical member 3 covers the lamp board 201 and does not cover too much area of the base 101, and a ratio of the width of the optical member 3 to the width of the lamp board 201 is set to be 1.1 to 2. Further, the ratio of the width of the optical member 3 to the width of the lamp board 201 is set to be 1.1 to 1.5.

Referring to FIG. 6C and FIG. 6D, in this embodiment, the optical member 3 includes a first light distribution unit 3001 and a second light distribution unit 3002. In this embodiment, the first light distribution unit 3001 is configured in a strip shape and provided with an accommodating groove 30011 along a length direction of the light distribution unit 3001, and at least a part in a height direction of the light emitting unit 2 is located in the accommodating groove 30011. The second light distribution unit 3002 is disposed on a surface of the first light distribution unit 3001, and the second light distribution unit 3002 and the accommodating groove 30011 are respectively located on two opposite sides of the first light distribution unit 3001 in a height direction of the optical member 3. The light emitter 202 of the light emitting unit 2 and the second light distribution unit 3002 are arranged correspondingly. Specifically, the light emitter 202 and the second light distribution unit 3002 are arranged in one-to-one correspondence.

Further, the light emitter 202 of the light emitting unit 2 is completely accommodated in the accommodating groove 30011. In this embodiment, a distance from a surface of the light emitter 202 to a bottom surface of the accommodating groove 30011 (the accommodating groove 30011 corresponds to the surface of the light emitter 202) is A (A is equal to or greater than 0), a distance from the surface of the light emitter 202 to the second light distribution unit 3002 is B, and a relationship of A and B satisfies the following condition: a ratio of A to B is greater than 0.05 and less than 0.25. Further, the relationship of A and B satisfies the following condition: the ratio of A to B is greater than 0.1 and less than 0.2. When A and B satisfy the above relationship, light emitted by the light emitter 202 can be controlled to mostly or completely correspond to the second light distribution unit 3002. In other words, without considering reflection of light generated by an interface, the light generated by the light emitter 202 will be completely projected to the second light distribution unit 3002, and is subjected to optical treatment by the second light distribution unit 3002.

In this embodiment, the lamp board 201 is disposed in the accommodating groove 30011, and two sides of the lamp board 201 correspond to an inner side wall of the accommodating groove 30011. A side part of the lamp board 201 may contact with the inner side wall of the accommodating groove 30011. In other words, the inner side wall of the accommodating groove 30011 limits a position of the lamp board 201 so as to determine a position of the light emitter 202 on the lamp board 201, such that the light emitter 202 is aligned to the optical member 3 (the second light distribution unit 3002).

In an embodiment, a surface of the light emitter 202 may directly contact with a bottom surface (not shown in any figure) of the accommodating groove 30011. In this way, light generated by the light emitter 202 may directly enter into the first light distribution unit 3001 without passing through air gap between the light emitter 202 and the first light distribution unit 3001. Therefore, reducing the light passing through interfaces (interface between two materials with different indexes of refraction), thereby reducing light loss. In addition, the surface of the light emitter 202 directly contacts with the bottom surface of the accommodating groove 30011, so that heat produced by the light emitter 202 can be conducted to the first light distribution unit 3001, facilitating heat dissipation of the light emitter 202. In an embodiment, the surface of the light emitter 202 contacts with the bottom surface (not shown in any figure) of the accommodating groove 30011 through an optical medium. In other words, the surface of the light emitter 202 directly contacts with the bottom surface of the accommodating groove 30011 through an optical medium, so as to prevent air gap between the surface of the light emitter 202 and the bottom surface of the accommodating groove 30011, thereby achieving better matching of refraction index. In other embodiment, the surface of the light emitter 202 is provided with an optical medium to achieve a better light output efficiency, and the optical medium has no contact with the bottom surface of the accommodating groove 30011.

In this embodiment, at least 70% of a luminous flux generated by the light emitter 202 is directly emitted from the LED illumination device through the second light distribution unit 3002. The remaining luminous flux is emitted from the first light distribution unit 3001. Further, at least 80% of the luminous flux generated by the light emitter 202 is directly emitted from the LED illumination device through the second light distribution unit 3002. Furthermore, at least 90% of the luminous flux generated by the light emitter 202 is directly emitted from the LED illumination device through the second light distribution unit 3002. At least a part of the light emitted from the first light distribution unit 3001 is emitted to the surface of the base 101, so that a better optical efficiency is achieved at the base 101.

In this embodiment, the bottom surface of the accommodating groove 30011 is provided with a light input part 30012. At least a part of light generated by the light emitter 202 (for example, at least 80% of the luminous flux generated by the light emitter 202, or at least 90% of the luminous flux generated by the light emitter 202) enters the optical member 3 via the light input part 30012 and enters the second light distribution unit 3002. In an embodiment, without considering reflection at the light input part 30012, the luminous flux generated by the light emitter 202 completely enters the light input part 30012. In other words, a light output range of the light emitter 202 totally corresponds to the inside of the light input part 30012, thereby improving a light output efficiency (light output efficiency and light output shape). In this embodiment, the second light distribution unit 3002 includes a first light output part 30021 and a second light output part 30022. An illuminance ratio of a surface of the first light output part 30021 to a surface of the second light output part 30022 is greater than 0.3, 0.4, 0.5, 0.6, 0.7, 0.8 or 0.9, and less than 2, 1.9, 1.8, 1.7, 1.6 or 1.5, thereby achieving more uniform light output in a light output range of the LED illumination device. In this embodiment, the first light output part 30021 includes a plane or an approximate plane. The second light output part 30022 includes a conical surface or an approximately conical surface. The second light output part 30022 is disposed around the first light output part 30021.

In this embodiment, a ratio of a surface area of the second light output part 30022 to a surface area of the first light output part 30021 is greater than 20. Further, the ratio of the surface area of the second light output part 30022 to the surface area of the first light output part 30021 is greater than 30. In this way, a better light output efficiency (a light output angle and light shape) can be achieved. In this embodiment, a height H of the second light output part 30022 is less than 2 mm and greater than 0.5 mm. Further, the height H of the second light output part 30022 is less than 1.5 mm and greater than 0.8 mm, so as to control light distribution during lighting.

As shown in FIG. 6S, the ratio of the surface area of the second light output part 30022 to the surface area of the first light output part 30021 may be set to be greater than 0.7 and less than 1.8. Further, the ratio of the surface area of the second light output part 30022 to the surface area of the first light output part 30021 may be set to be greater than 0.8 and less than 1.5. In this way, a better light output efficiency (a light output angle and light shape) can be achieved. In this case, the LED illumination device can achieve better light output uniformity in a light output region. In addition, correspondingly, the height H of the second light output part 30022 is less than 0.8 mm and greater than 0.2 mm. Further, the height H of the second light output part 30022 is less than 0.7 mm and greater than 0.3 mm, so as to control light distribution during light output.

As shown in FIG. 6D, the second light output part 30022 in this embodiment has a contour line, and the contour line revolves 360 degrees along a central axis of the second light distribution part 3002 to form an outer contour of the second light output part 30022. In this embodiment, an absolute value of a slope of the contour line of the outer contour of the conical surface of the second light output part 30022 ranges from 0.3 to 0.8. Further, the absolute value of the slope of the outer contour of the conical surface of the second light output part 30022 ranges from 0.35 to 0.5. The second light output part 30022 has a function of adjusting the light shape. When the absolute value of the slope of the contour line of the outer contour of the conical surface of the second light output part 30022 is within the above interval, a better light output performance (a light output angle and light output shape) can be achieved. In this embodiment, the slope of the contour line of the outer contour of the conical surface of the second light output part 30022 is calculated based on an arrangement shown in FIG. 6D. That is, the optical member 3 is located above the light emitting unit 2.

As shown in FIG. 6D, the second light output part 30022 in an example has a contour line, and the contour line revolves 360 degrees along a central axis of the second light distribution part 3002 to form an outer contour of the second light output part 30022. In this embodiment, an absolute value of a slope of the contour line of the outer contour of the conical surface of the second light output part 30022 ranges from 0.25 to 0.6. Further, the absolute value of the slope of the outer contour of the conical surface of the second light output part 30022 ranges from 0.3 to 0.6. Furthermore, the absolute value of the slope of the outer contour of the conical surface of the second light output part 30022 ranges from 0.4 to 0.5. The second light output part 30022 has a function of adjusting the light shape. When the absolute value of the slope of the contour line of the outer contour of the conical surface of the second light output part 30022 is within the above interval, a better light output performance (a light output angle and light output shape) can be achieved. In this embodiment, the slope of the contour line of the outer contour of the conical surface of the second light output part 30022 is calculated based on an arrangement shown in FIG. 6D. That is, the optical member 3 is located above the light emitting unit 2.

According to the LED illumination device in this embodiment, in a light output path, at least 80%, 85%, or 90% of a luminous flux generated by the light emitter 202 in operation is directly emitted from the LED illumination device through the second light distribution unit 3002 (this part of light is not reflected by the base 101 after passing through the second light distribution unit 3002, thereby reducing possible light loss during reflection), so that light output efficiency can be improved. In this embodiment, a part (less than 20%, 15%, or 10% of a total luminous flux) of the light generated by the light emitter 202 is emitted to the base 101 through the first light distribution unit 3001, and is directly emitted from the LED illumination device by reflecting from the base 101, without lighting by using a light transmitting plate or a diffusion plate and the like in the prior art. Generally, for the light emitted from the LED illumination device in this embodiment, the light emitted by reflecting from the base 101 is less than the light emitted from the second light distribution unit 3002. By reducing the reflecting light, light loss can be reduced and light output efficiency is improved. In this embodiment, light outputted by reflecting from the base 101 may be controlled to be 10% or less of a total luminous flux of the outputted light, while 90% or more of the outputted light is directly outputted without reflection, thereby reducing light loss caused by reflection.

In other embodiment, the second light distribution unit 3002 may be a spherical structure or a polygonal prism structure.

Referring to FIG. 6A, FIG. 6B, and FIG. 1G, in this embodiment, in order to control the light output uniformity of the LED illumination device, a ratio of an illuminance of the light emitted when the light emitting unit 2 is turned on within a range of first area A to an average illuminance within a range of second area B is greater than 0.3, 0.4, 0.5, 0.6, 0.7, 0.8 or 0.9, and less than 2. In some embodiments, the ratio of the illuminance within the range of first area A to the average illuminance within the range of second area B is greater than 0.5 and less than 1.5. In some embodiments, the ratio of the illuminance within the range of first area A to the average illuminance within the range of second area B is greater than 0.7 and less than 1.3. The first area A and the second area B are located on a same plane. In addition, the first area A and the second area B are both located on a third area C (the third area C, the first area A and the second area B are located on a same plane), while a light beam angle c corresponding to the third area C is 90 degrees, 80 degrees, 60 degrees, or 50 degrees. In this embodiment, the light beam angle c may be smaller than the light emission angle of the LED illumination device. In this embodiment, the light output uniformity is measured based on an illuminance difference within a range of 50 degrees of the light beam angle. Therefore, a light beam angle corresponding to the third area C is 50 degrees. In addition, the first area A and the second area B may be any area in the third area C. It should be noted that the light beam angle mentioned here does not mean an included angle formed by boundary lines of a lighting area. In this example, a location of a center or circle center of the third area C corresponds to the LED illumination device. That is, when the LED illumination device is projected to the third area C along an optical axis D, projection of the LED illumination device is located or approximately located in the center or circle center of the third area C. In this embodiment, the plane where the first area A and the second area B are located is perpendicular to or approximately perpendicular to the optical axis D.

Referring to FIG. 6A, FIG. 6B, and FIG. 1H, in an embodiment, in order to control the light output uniformity of the LED illumination device, a ratio of an illuminance of the light emitted when the light emitting unit 2 is turned on within a range of a first area A to an average illuminance within a range of a second area B is greater than 0.3, 0.4, 0.5, 0.6, 0.7, 0.8 or 0.9, and less than 2. In some embodiments, the ratio of the illuminance within the range of a first area A to the average illuminance within the range of a second area B is greater than 0.5 and less than 1.5. In some embodiments, the ratio of the illuminance within the range of a first area A to the average illuminance within the range of a second area B is greater than 0.7 and less than 1.3. The first area A and the second area B are located on a same plane, and are concentrically or approximately concentrically disposed (assuming that all the areas are circular or approximately circular, with their centers or circle centers being located at same positions). In addition, the first area A and the second area B are both located on a third area C (the third area C, the first area A and the second area B are located on a same plane), while a light beam angle c corresponding to the third area C is 90 degrees, 80 degrees, 60 degrees, or 50 degrees. In this embodiment, the light beam angle may be smaller than the light emission angle of the LED illumination device. In this embodiment, the light output uniformity is measured based on an illuminance difference within a range of 50 degrees of the light beam angle. Therefore, a light beam angle c corresponding to the third area C is 50 degrees. In addition, the first area A, the second area B and the third area C are concentrically or approximately concentrically disposed. Moreover, a light beam angle a corresponding to the first area A and a light beam angle b corresponding to the second area B are both smaller than the light beam angle c corresponding to the third area C. It should be noted that the light beam angles mentioned here do not mean included angles formed by boundary lines of lighting areas. In this embodiment, a location of a center or circle center of the third area C corresponds to the LED illumination device. That is, when the LED illumination device is projected to the third area C along an optical axis D, projection of the LED illumination device is located or approximately located in the center or circle center of the third area C. In this embodiment, the plane where the first area A and the second area B are located is perpendicular to or approximately perpendicular to the optical axis D.

In this embodiment, a total height of the LED illumination device is controlled to be 30 mm or less. Further, the total height of the LED illumination device is controlled to be 25 mm or less. In other words, when the height of the light emitting unit 2 in the LED illumination device is controlled to be 30 mm or less, or 25 mm or less, the above light output performance can be achieved in the space that can be used as dimming.

In an embodiment, the optical member 3 may be an integrated structure that covers the light emitting unit 2. In an embodiment, the optical member 3 is in a multi-section form. That is, one light emitting unit 2 is correspondingly provided with a plurality of optical members 3.

Referring to FIG. 6Q, in an embodiment, at least some of the light emitters 202 deflect to one side (one side in the longitudinal direction of the optical member 3) of the corresponding second light distribution unit 3002 with respect to this second light distribution unit 3002. At least some of the light emitters 202 deflect to the other side (the other side in the longitudinal direction of the optical member 3) of the corresponding second light distribution unit 3002 with respect to this second light distribution unit 3002. In this way, influences of deflection of the light emitter 202 and the second light distribution unit 3002 can be reduced. In this embodiment, deflection of any light emitter 202 with respect to the corresponding second light distribution unit 3002 is less than 1 mm (a distance from a center of the light emitter 202 to a central axis of the second light distribution unit 3002 in the longitudinal direction of the optical member 3).

In this embodiment, a positioning structure may be provided for reducing deflection of the light emitters 202 and the second light distribution unit 3002. In an embodiment, the first light distribution unit 3001 is provided with a plurality of fixing grooves (not shown in any figure), the fixing grooves are used to fix the light emitters 202 and position of the light emitter 202, such that the light emitters 202 and the second light distribution unit 3002 can be precise alignment. In other embodiment, the lamp board 201 and the optical member 3 may be positioned (not shown in any figure). For example, a positioning column is disposed on the optical member 3, while a positioning hole is provided in the lamp board 201.

In an embodiment, the optical member 3 and the light emitting unit 2 may be fixed as one piece first and then together installed on the base 101 (not shown in any figure). In an embodiment, after the optical member 3 fix with the light emitter 202, and then together installed on the lamp board 201. In this case, the lamp board 201 may be fixed to the base 101 first, or may be fixed with the optical member 3 and the light emitter 202 and then fixed to the base 101 (not shown in any figure).

Referring to FIG. 6A to FIG. 6C and FIG. 6F to FIG. 6K, the base 101 in this embodiment is provided with a through hole 10171. Further, the through hole 10171 may be formed on the end wall 1017, and the through hole 10171 is located in an extension direction of a length direction of the mounting wall 1016. In this embodiment, the lamp board 201 may be a flexible circuit board or a bendable circuit board. In addition, the lamp board 201 passes through the through hole 10171 and reaches the back surface (the other surface, opposite to the light emitting unit 2, of the base 101) of the base 101. In this embodiment, the lamp board 201 extends along the back surface of the base 101 and is attached to an end surface 1018 of one side of the back surface of the base 101 (a back surface of a first end of the base 101 in the length direction of the light emitting unit 2), and the power source 4 is disposed on the end surface 1018 and is electrically connected to the lamp board 201. In this embodiment, the power source 4 does not exceed a range defined by the base 101 in a height direction of the LED illumination device, so that the power source will not additionally increase the height of the LED illumination device. In addition, the power source 4 is unlikely to be damaged due to collision of the power source 4 during packaging and transportation.

According to the LED illumination device in this embodiment, due to specific arrangement (arrangement of height, location, structure, and the like) of the optical member 3 and arrangement (arrangement of height, location, structure, and the like) of the power source 4, a total height of the LED illumination device is controlled to be 30 mm or less. Further, the total height of the LED illumination device is controlled to be 25 mm or less.

Referring to FIG. 6G and FIG. 6J to FIG. 6P, the power source 4 in this embodiment includes a power box 41, an electronic component 42, and a power board 45, the electronic components 42 is disposed on the power board 45, and the power box 41 is fixed to the base 101. In this embodiment, the power source 4 further includes an electric isolation tube 43. The electronic component 42 and the power board 45 are completely or at least partially disposed in the electric isolation tube 43, while the electric isolation tube 43 is disposed in the power box 41. The electric isolation tube 43 is made of an insulating material and achieves an electric isolation effect to reduce a risk of electric shock. In this embodiment, the power box 41 includes an opening 411, and the electric isolation tube 43 is installed in the power box 41 via the opening 411. One side, with the opening 411, of the power box 41 corresponds to the end surface 1018 of the base 101 so as to seal the power box 41, thereby facilitating installation and reducing a material cost. In this embodiment, the electronic component 42 is disposed between the power panel 45 and the end surface 1018 of the back surface of the base 101, so that a space is maintained between the power panel 45 and the end surface 1018 of the back surface of the base 101.

In this embodiment, the power box 41 includes a first cavity 4101 and a second cavity 4102, and the electric isolation tube 43 and the electronic components 42 are disposed in the first cavity 4101. The electric isolation tube 43 disposed in the first cavity 4101 can enhance strength of the power box 41. The second cavity 4102 is provided with a wiring board 44, and the wiring board 44 seals the second cavity 4102. In this embodiment, the power source 4 is electrically connected to the wiring board 44 through a wire. Specifically, one end of the wire is electrically connected to the power board 45 of the power source 4 in the first cavity 4101, and the other end of the wire is electrically connected to the wiring board 44 in the second cavity 4102.

In this embodiment, the electric isolation tube 43 presses the lamp board 201, so that the lamp board 201 is attached to the end surface 1018 of the back surface of the base 101 so as to prevent loosening of the lamp board 201. In addition, the electronic components 42 is isolated from the lamp board 201 by the electric isolation tube 43, thereby preventing electric shock. In this embodiment, the power box 41 can at least partially presses the lamp board 201. One end of the lamp board 201 is directly soldered to the power board 45. In other embodiment, the lamp board 201 and the power board 45 are connected by soldering after being positioned by a positioning unit. The positioning unit may be a positioning column. The positioning column can penetrate through both the power board 45 and the lamp board 201 so as to position the power board 45 and the lamp board 201, thereby facilitating installation and guaranteeing accuracy of electric connection.

Referring to FIG. 6K and FIG. 6M, in this embodiment, the lamp board 201 is a flexible circuit board or a bendable lamp board, and is provided with a bending part 2011. The lamp board 201 is folded at the bending part 2011, so that a part of a front surface (a surface with a light emitter 202) of the lamp panel 201 behind the bending part 2011 is disposed facing away from the end surface 1018 of the back surface of the base 101, thereby facilitating connection between this part of the lamp board 201 and the power board 45.

Referring to FIG. 6I, FIG. 6K, and FIG. 6M, the LED illumination device in this embodiment further includes a shielding part 7. The lamp board 201 passes through the through hole 10171 and has a first part and a second part on the back surface of the base 101. The second part is attached to the end surface 1018 of the back surface of the base 101, and the first part is configured to connect the second part and a part of the lamp board 201 located at the front surface of the base 101. The shielding part 7 covers the first part of the lamp board 201, so that the first part is not exposed, thereby preventing electric shock caused by touching the first part of the lamp board 201.

Figure 6T:
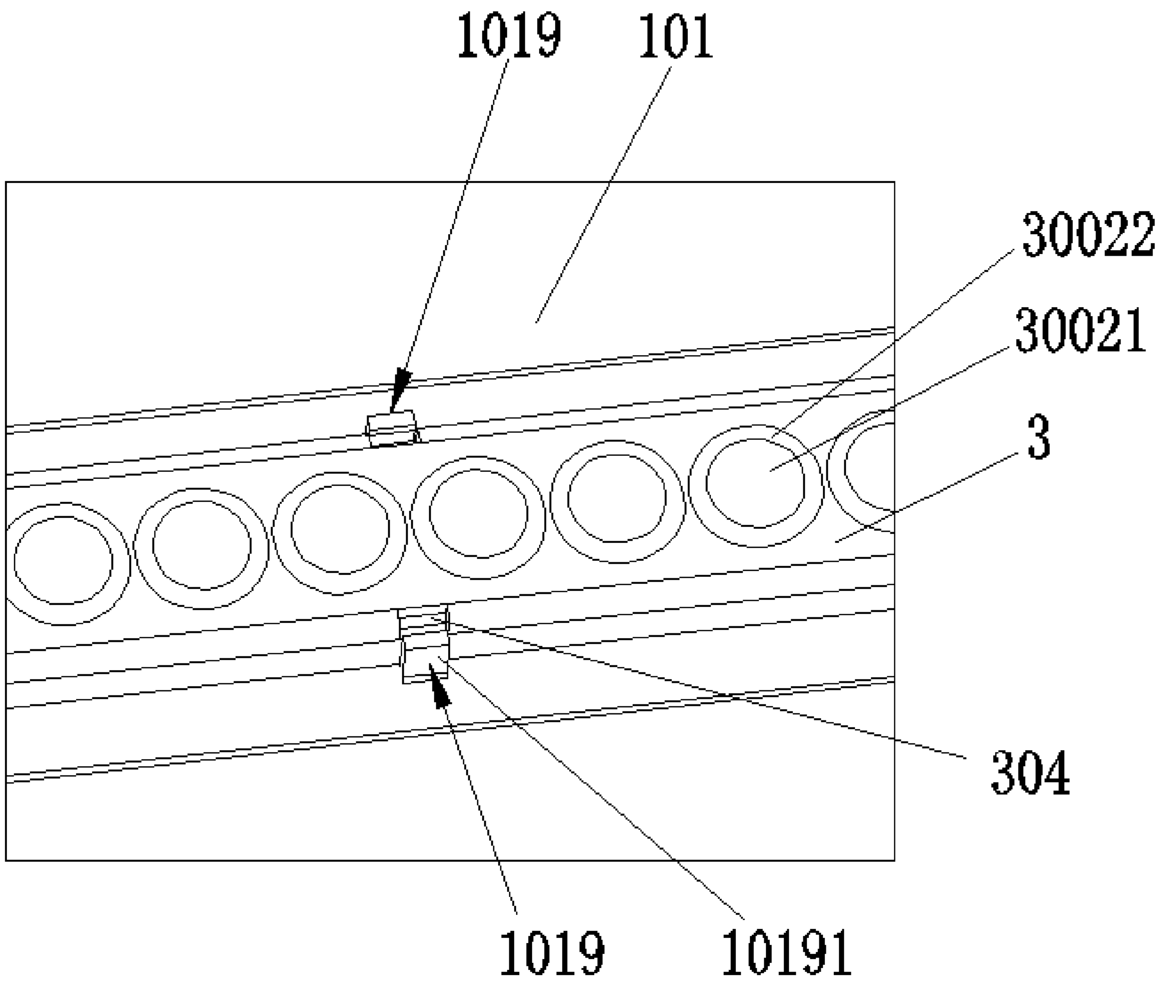
FIG. 6T is a partial schematic diagram showing fitting of a lamp panel and a wire.
Figure 6U:
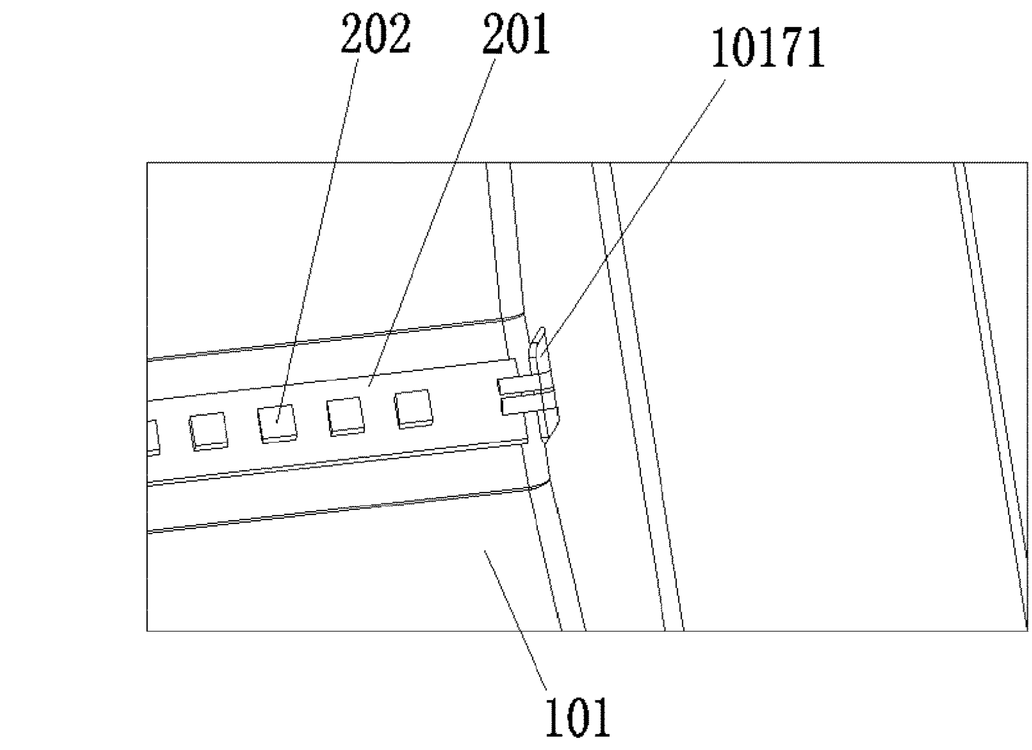
FIG. 6U is a stereoscopic schematic diagram of an LED illumination device with a power source removed when a rigid lamp panel is used.

Referring to FIG. 6T and FIG. 6U, the lamp board 201 in this embodiment may also be a rigid lamp board, for example, an aluminum substrate or an FR4 board. In this case, two ends of the lamp board 201 cannot extend to the back surface of the base 101 to be directly connected to the power source 4 (not shown in any figure), and the lamp board 201 is connected to the power source 4 through a wire. In this case, the shielding part 7 shields the exposed part of the wire, so that this part of the wire is not exposed.

In this embodiment, the light emitters 202 includes a first light emitter and a second light emitter (not shown in any figure). The first light emitter and the second light emitter have different color temperatures, luminous fluxes, or color rendering indexes after being turned on. In this way, foundation can be provided for dimming of the LED illumination device. In this embodiment, the light emitting unit 2 includes two rows of light emitters 202 (not shown in any figure), one row of light emitters are the first light emitters, and the other row of light emitters are the second light emitters. The corresponding optical member 3 includes two rows of second light distribution units 3002 (not shown in any figure) corresponding to the first light emitters and the second light emitters.

Figure 6V:
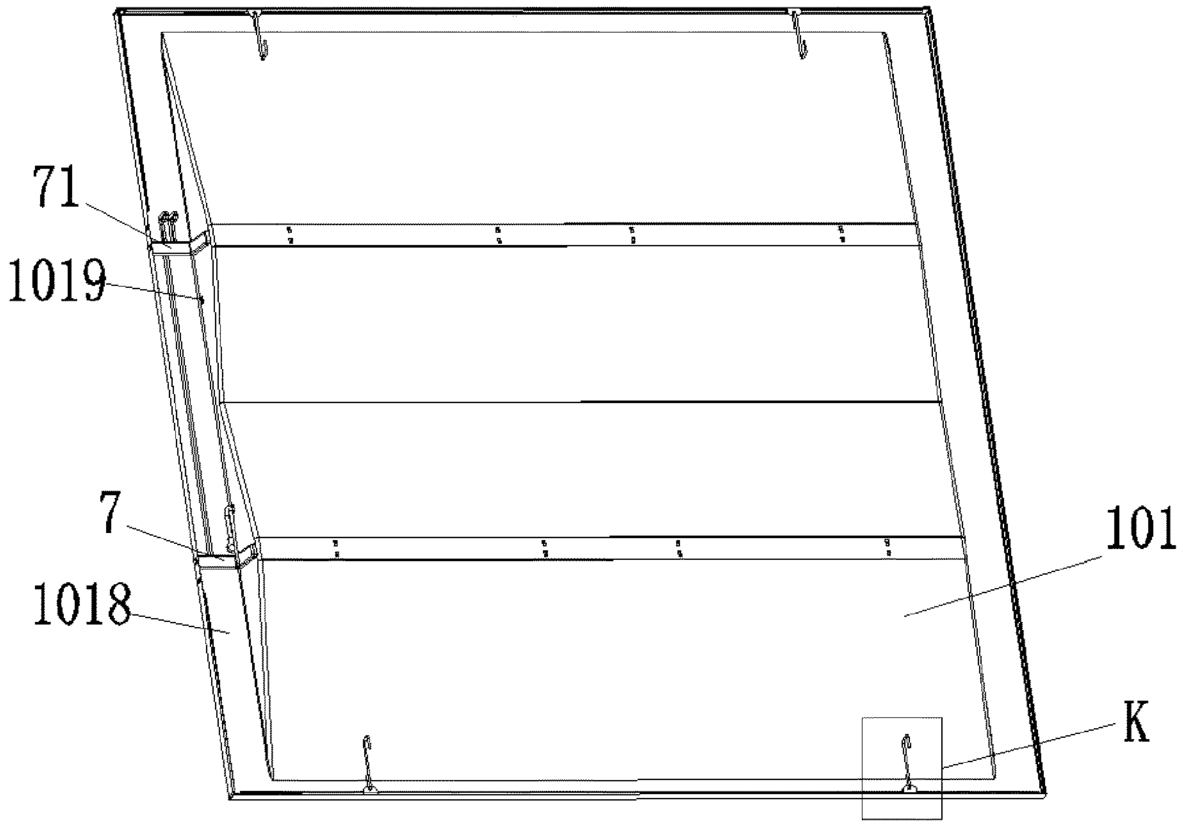
FIG. 6V is a stereoscopic schematic diagram of a power source.

Referring to FIG. 6U and FIG. 6V, in this embodiment, the power box 41 is fixed to the end surface 1018 of the back surface of the base 101, and a space is maintained between the power box 41 and the end surface 1018, thereby reducing heat conduction between the base 101 and the power box 41. In this embodiment, the power box 41 is provided with a first fixing unit 412, and the base 101 is provided with a second fixing unit 1019, and the power box 41 is fixed to the base 101 by cooperation of the first fixing unit 412 and the second fixing unit 1019. Specifically, the first fixing unit 412 may include a mounting hole and/or a buckling part, and the second fixing unit 1019 may include a buckling piece and/or mounting hole fitting with the first fixing unit 412.

In this embodiment, the base 101 includes two mounting walls 1016, and the two mounting walls 1016 are correspondingly provided with light emitting units 2. Two ends of the power box 41 in a length direction respectively exceed the two mounting walls 1016, so as to enhance structural strength of the base 101 in this direction. In this embodiment, the power box 41 occupies 40% or more of the base 101 in the length direction. Further, the power box 41 occupies 50% or more of the base 101 and less than 60% of the base 101 in the length direction. In this embodiment, the second cavity 4102 of the power box 41 completely surpasses (corresponds to) at least one mounting wall 1016 in the length direction of the power box. In other words, a projection of the mounting wall 1016 in the length direction of the power box is completely located in a space where the second cavity 4102 of the power box 41 is located. In this embodiment, bent structures are provided at the mounting wall 1016 (the bent structures are respectively provided between the mounting wall 1016 and the first wall 1014 and between the mounting wall and the second wall 1015). The bent structures have high structural strength. The second cavity 4102 is disposed corresponding to the mounting wall 1016, so that the base 101 can be prevented from being deformed at this position to cause deformation of the power box 41 at a position where the second cavity 4102 is located, thereby enhancing structural strength and improving reliability.

In this embodiment, the shielding part 7 includes a stop part 71. The stop part 71 extends to the end surface 1018 of the back surface of the base 101. The power box 41 is disposed on the stop part 71 and maintains a space with the end surface 1018 of the back surface of the base 101. The power box 41 may be provided with a positioning groove 415, and the positioning groove 415 is engaged with the stop part 71 of the shielding part 7, so as to position the power box 41.

In this embodiment, the shielding part 7 is fixed to the base 101 by buckling. Specifically, one end of the shielding part 7 is clamped into the through hole 10171, and the other end of the shielding part 7 fits with the base 101. For example, the base 101 is provided with a buckling arm for buckling a surface of the other end of the shielding part 7.

Figure 6W:
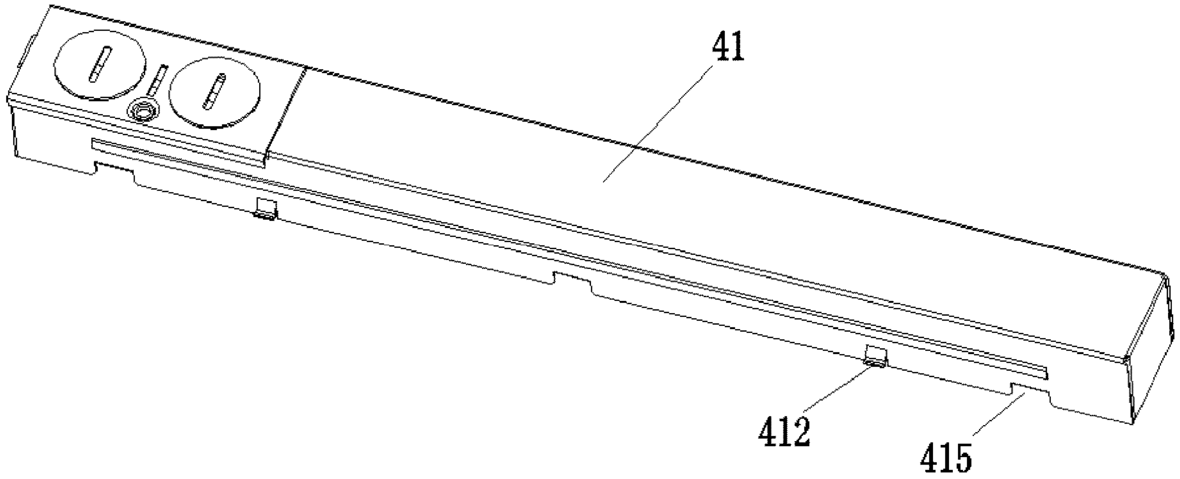
FIG. 6W is a stereoscopic schematic diagram of FIG. 6W with a wiring board removed.
Figure 6X:
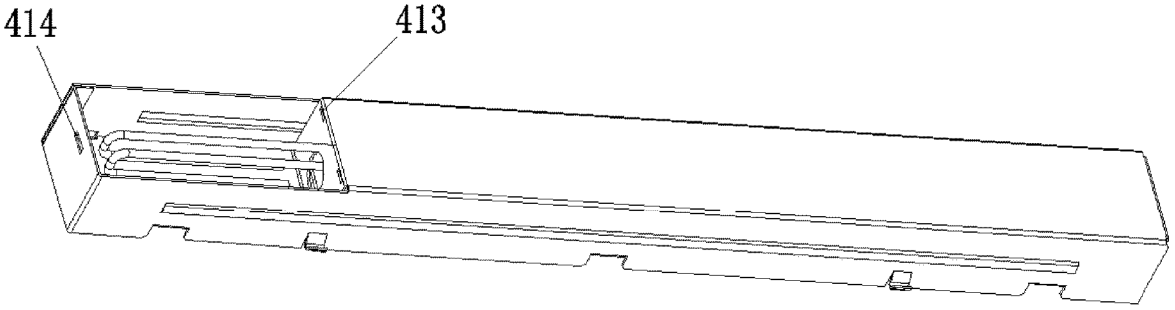
FIG. 6X is a stereoscopic schematic diagram of a wiring board.

Referring to FIG. 6W and FIG. 6X, a junction box 41 in this embodiment is provided with a first fixing hole 413 and a second fixing hole 414. One end of the wiring board 44 is provided with a fixing wall 441 clamped into the fixing hole 413, and the other opposite end of the wiring board 44 is provided with a bending wall 442. The bending wall 442 is clamped into the second fixing hole 414 from an outer side of the junction box 41 to fix the wiring board 44.

Referring to FIG. 6G, in this embodiment, a peripheral portion of the back surface of the base 101 is provided with a installation piece 8 for installation. For example, the installation piece installs the LED illumination device outside in a hanging manner.

Figure 6Y:
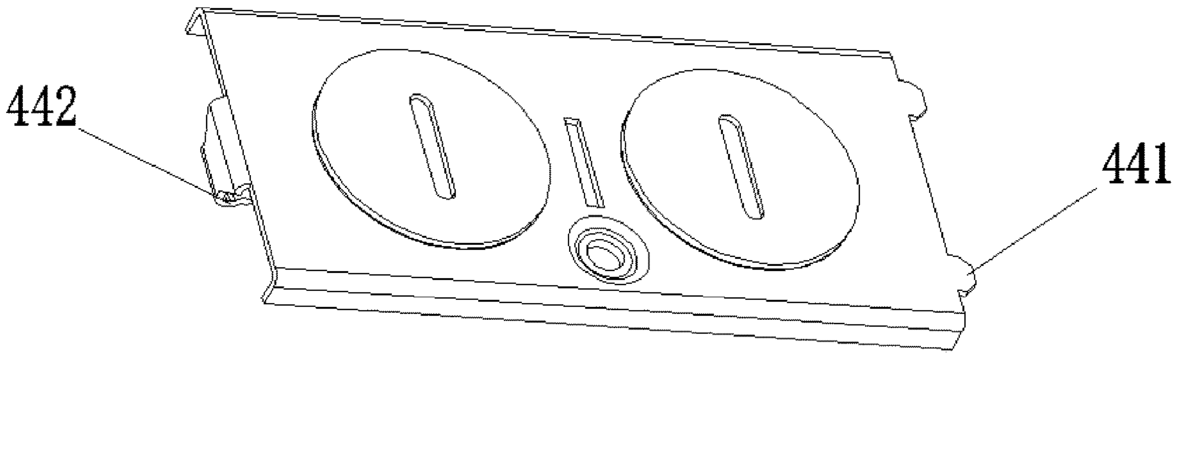
FIG. 6Y is an enlarged view of a location K in FIG. 6V.
Figure 6Z:
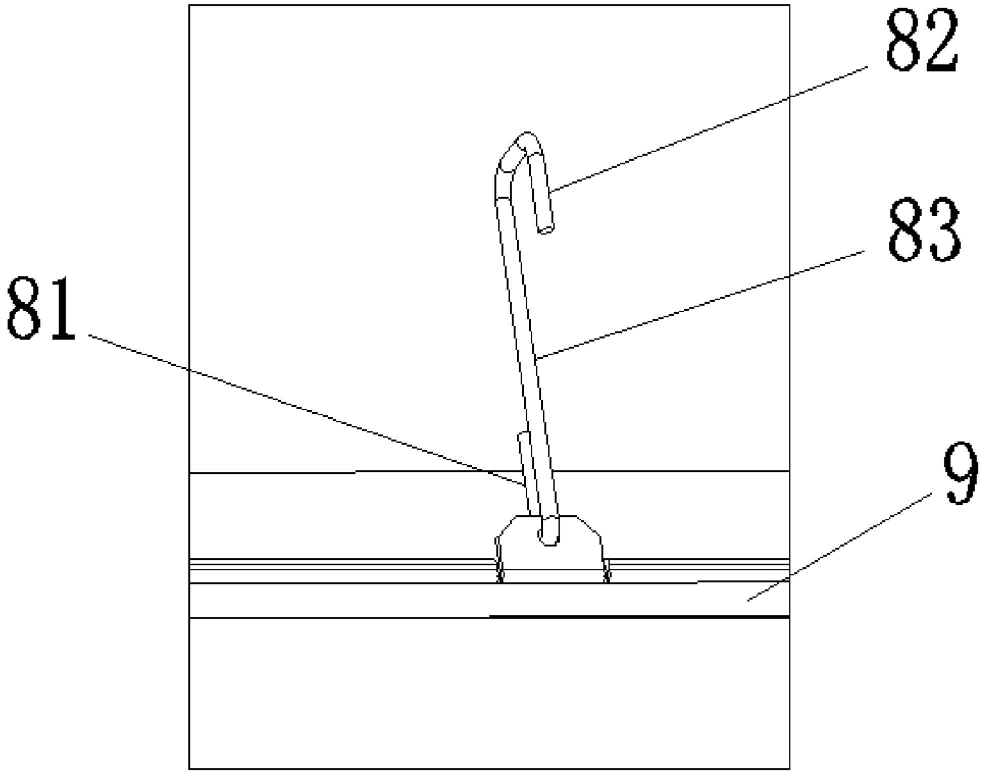
FIG. 6Q is a schematic diagram II showing fitting of a light emitting unit and an optical member.

Referring to FIG. 6Y, the installation piece 8 in this embodiment includes a first part 81, a second part 82, and a main body part 83, the first part 81 is connected to the base 101, and specifically the first part may be connected to a reinforcing structure 9 of the base 101. The first part 81 may include a hook so as to be hung on the base 101, and the first part 81 is adjustable in direction and position with respect to the base 101. The second part 82 is configured to be connected to an external structure. The second part 82 includes a hook. The second part 82 is connected to an external structure in a hanging manner. In this embodiment, the main body part 83 is bendable. During installation, the main body part 83 is bendable, so that the main body part can be conveniently connected to an external structure.

In this embodiment, a peripheral portion of the back surface of the base 101 is provided with a reinforcing structure 9. In an embodiment, the peripheral portion of the base 101 is folded to form the reinforcing structure 9. The reinforcing structure 9 may be attached to the end surface 1018 of the back surface of the base 101, or the reinforcing structure 9 may be perpendicular to the end surface 1018 of the back surface of the base 101. In an embodiment, the peripheral portion is provided with a reinforcing rib to form the reinforcing structure 9. In an embodiment, the peripheral portion is provided with a reinforcing rib to form the reinforcing structure 9.

In this embodiment, the power source 4 is completely accommodated in a space defined by a lower end surface and an upper end surface of the base 101 in the height direction. Therefore, the power source 4 will not additionally increase the height of the LED illumination device. Therefore, the height of the LED illumination device is the same as the height of the base.

In this embodiment, in order to control an overall height of the LED illumination device, a height of the power box 41 accounts for 80% or more of a total height of the LED illumination device. When the power box 41 is a standard part, or the power box 41 has an inner space in which can install parts such as the power board 45 and the electronic components 42, the higher the proportion of the height of the power box 41 to the total height of the LED illumination device, the higher the space utilization rate, and the better the control on the total height of the lamp. Further, the height of the power box 41 accounts for 90% or more of the total height of the LED illumination device. Furthermore, the height of the power box 41 accounts for 95% or more of the total height of the LED illumination device.

In this embodiment, the power box 41 is disposed between the reinforcing structure 9 and the end wall 1017 (an accommodating space is formed between the reinforcing structure 9 and the end wall 1017 to accommodate the power source 4, so that the power source 4 will not increase an extra space), and at least one side of the power box 41 is connected to the reinforcing structure 9 so as to further reinforce the reinforcing structure 9. One side of the power box 41 is connected to two end walls 1017 respectively, thereby enhancing strength of the base 101 in the length direction of the power box 41.

As shown in FIG. 7A to FIG. 7E, a seventh embodiment of the present disclosure provides an LED illumination device. A basic structure of the LED illumination device in this embodiment may be the same as that in the aforementioned sixth embodiment. In this embodiment, the LED illumination device includes a light source carrier 1, a light emitting unit 2, an optical member 3, and a power source 4. The light emitting unit 2 is fixed to the light source carrier 1, and the optical member 3 covers or at least portion of the optical member 3 covers the light emitting unit 2, so that when the light emitting unit 2 is turned on, light emitted by the light emitting unit is at least partially or completely emitted from the LED illumination device through the optical member 3. In an embodiment, when the light emitting unit 2 is turned on, at least 80% of a luminous flux emitted by the light emitting unit is directly emitted (without being reflected by the base 101 or the like) from the LED illumination device through the optical member 3. In an embodiment, when the light emitting unit 2 is turned on, at least 90% of a luminous flux emitted by the light emitting unit is directly emitted (without being reflected by the base 101 or the like) from the LED illumination device through the optical member 3. The light emitting unit 2 in this embodiment is non-detachably (irreplaceably) fixed to the light source carrier (therefore the device may be referred to as an integrated illumination device).

Referring to FIG. 7A to FIG. 7E, the light source carrier 1 in this embodiment includes a base 101 (may not include the aforementioned detachable end cover). The base 101 defines a mounting surface, and the light emitting unit 2 is directly or indirectly fixed to the mounting surface. Further, the light emitting unit 2 includes a lamp board 201 and a light emitter 202, the light emitter 202 is fixed to the lamp board 201, and the light emitter 202 may be an LED light bead. In this embodiment, the lamp board 201 is attached to the mounting surface. For example, the lamp board 201 is adhered to the mounting surface by using an adhesive, or the mounting surface is provided with a mounting structure, so that the lamp board 201 is attached to the mounting surface by means of clamping, buckling, threaded connection, magnetic suction, and the like. In this embodiment, the light emitting unit 2 forms a heat conduction path with the base 101 after the lamp board 201 is fixed to the mounting surface. In this way, heat produced when the light emitting unit 2 is turned on can be conducted to the base 101 and dissipated through the base 101.

Figure 7A:
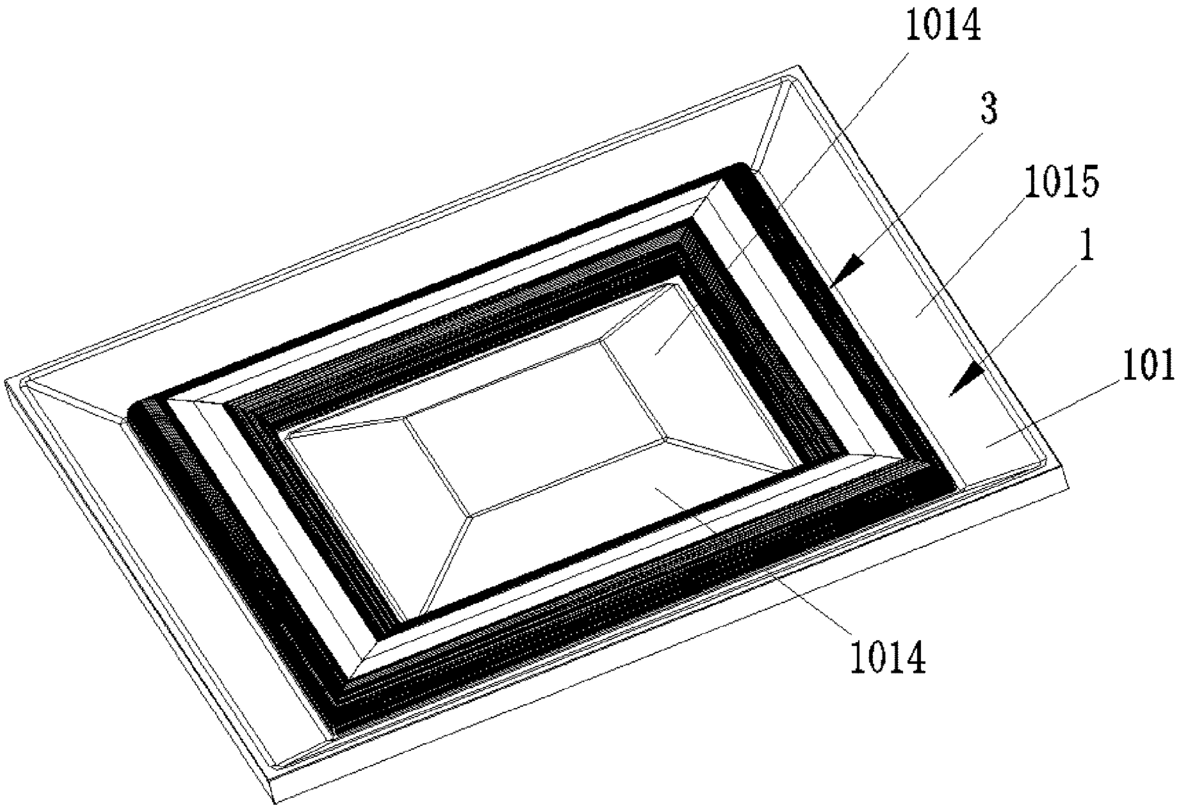
FIG. 7A is a stereoscopic schematic diagram I of an LED illumination device according to a seventh embodiment of present invention.
Figure 7B:
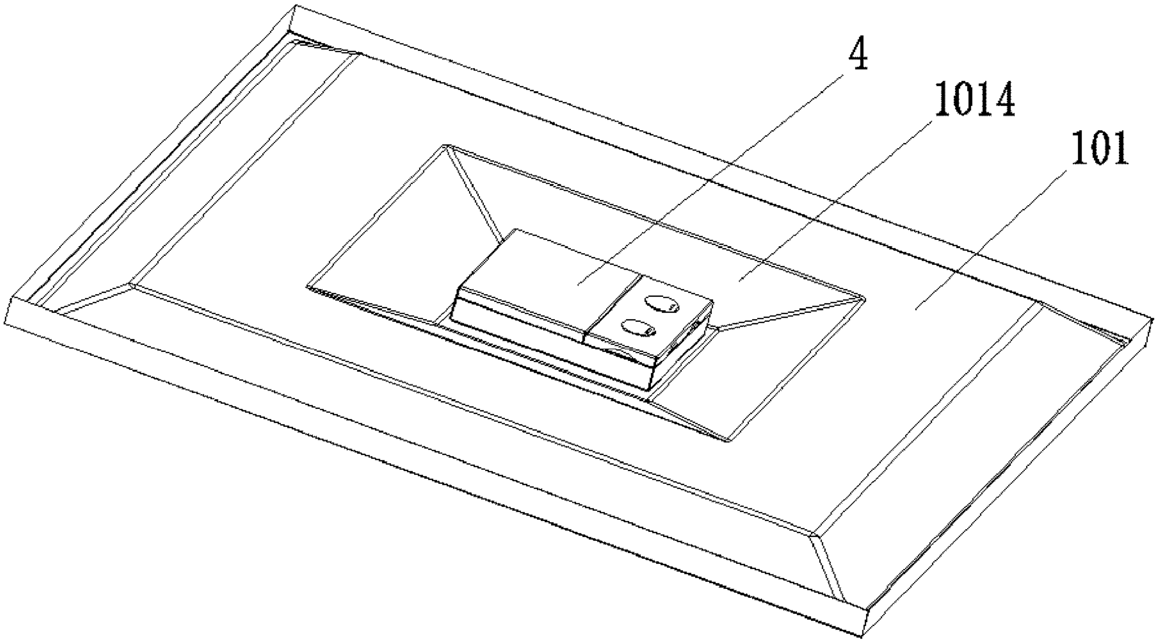
FIG. 7B is a stereoscopic schematic diagram II of the LED illumination device according to the seventh embodiment of present invention.
Figure 7C:
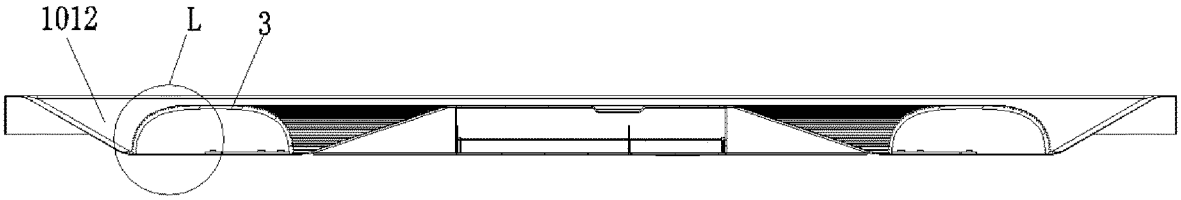
FIG. 7C is a structural schematic cross-sectional view of the LED illumination device according to the seventh embodiment of present invention.
Figure 7D:
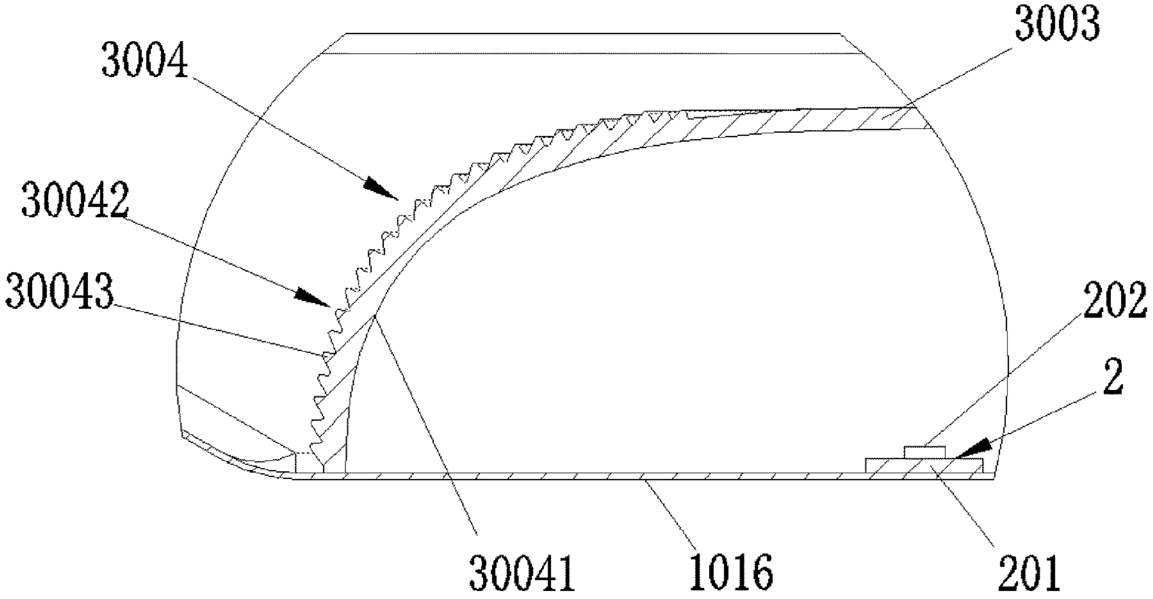
FIG. 7D is an enlarged schematic diagram of a location L in FIG. 7C.
Figure 7E:
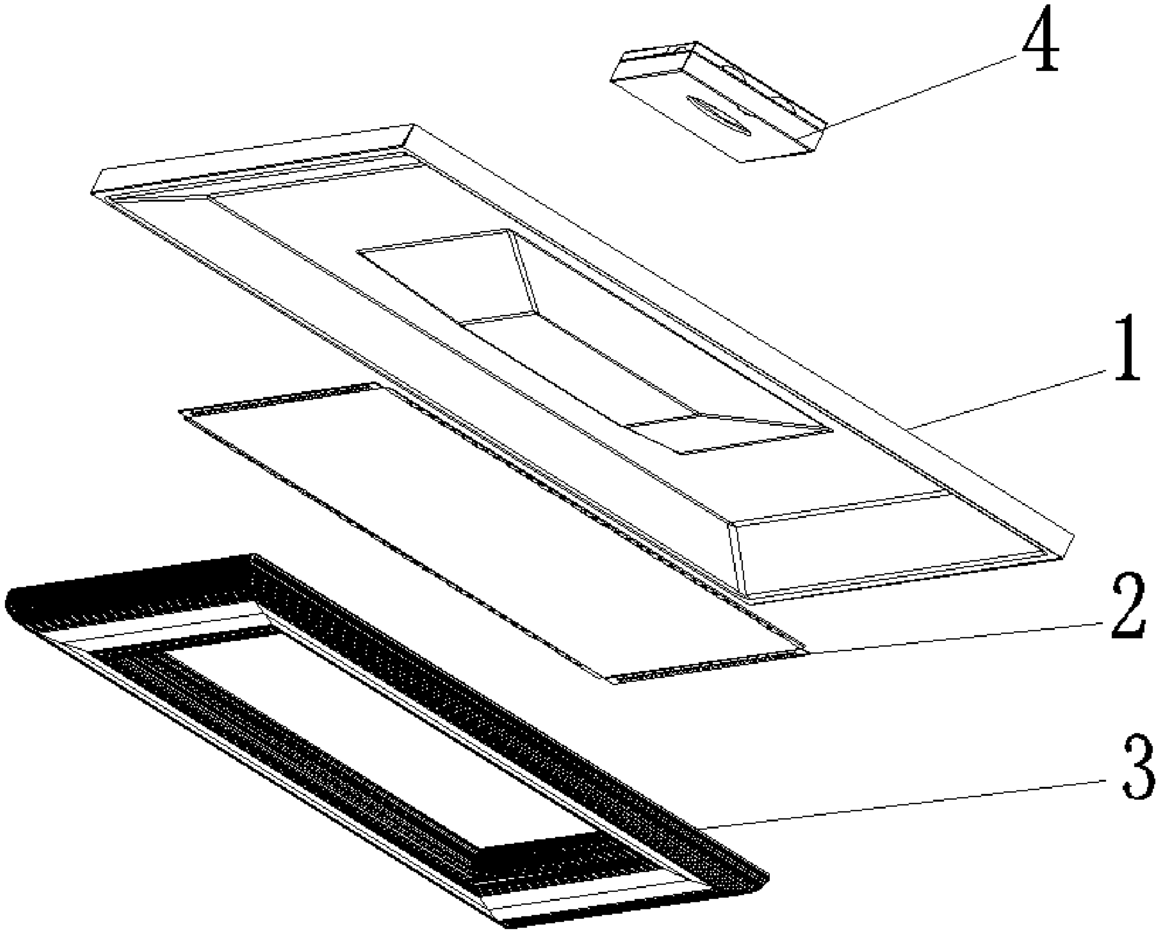
FIG. 7E is a structural schematic exploded view of the LED illumination device according to the seventh embodiment of present invention.
Figure 7F:
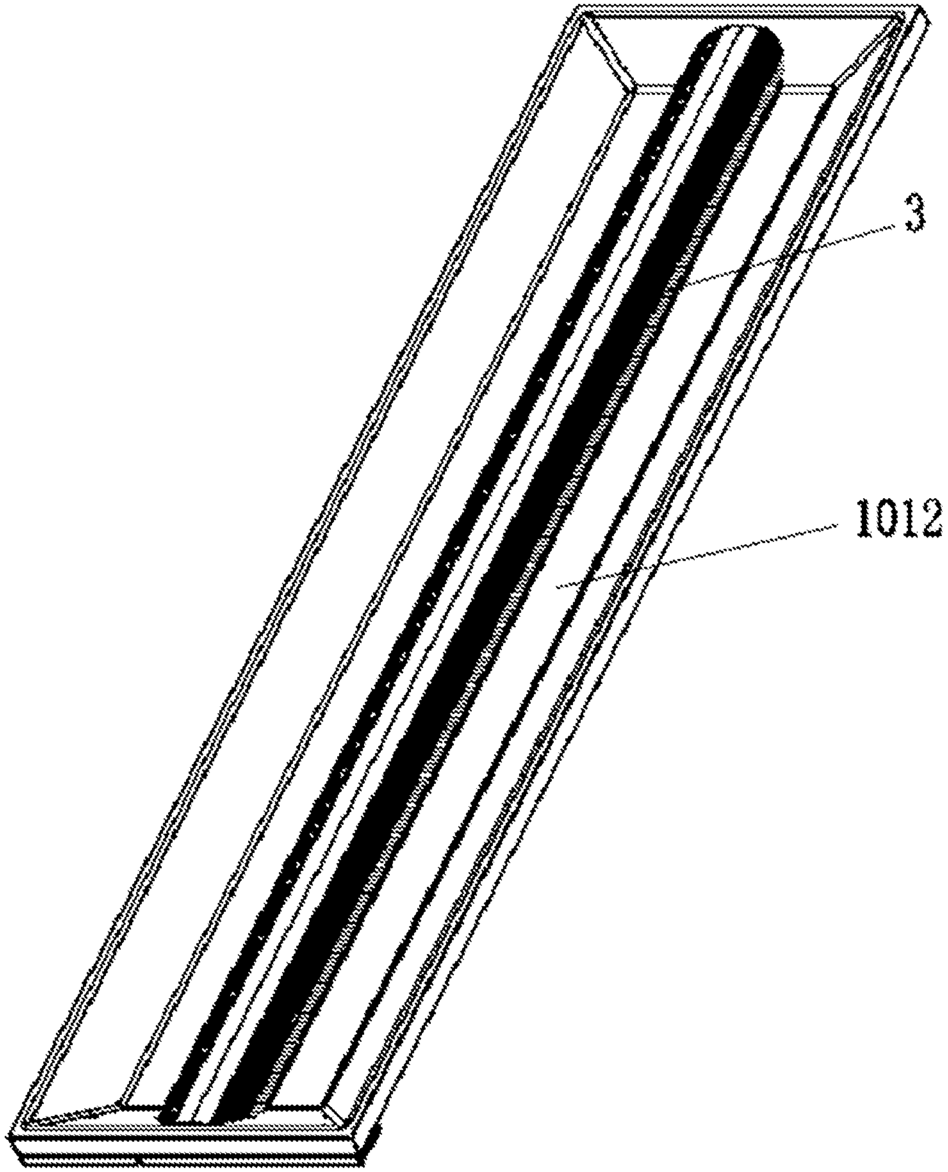
FIG. 7F is a stereoscopic schematic diagram of an LED illumination device according to an embodiment of present invention, showing that a group of accommodating spaces are provided.
Figure 7G:
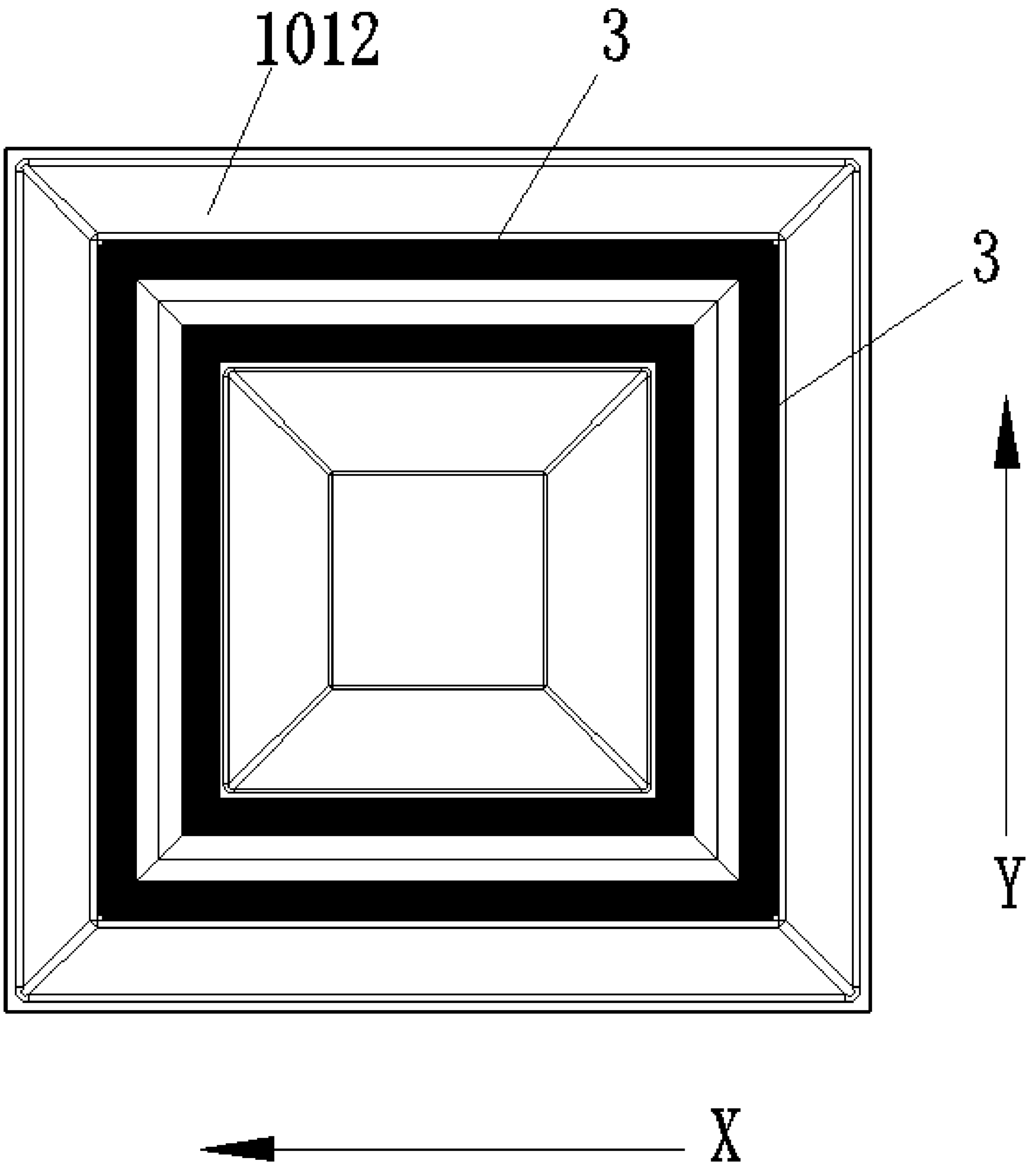
FIG. 7G is a stereoscopic schematic diagram of an LED illumination device according to an embodiment of the present invention, showing that four groups of accommodating spaces are provided.

In this embodiment, the base 101 is provided with an accommodating space 1012; the light emitting unit 2 and the optical member 3 are both disposed in the accommodating space 1012; and in addition, in a height direction of the base 101, the light emitting unit 2 and the optical member 3 are both within a space defined by the accommodating space 1012 (a range defined by the accommodating space 1012 in a height direction of the LED illumination device). In this embodiment, a plurality of accommodating spaces 1012 may be provided, and thus a plurality of light emitting units 2 and optical members 3 are provided correspondingly. As shown in FIG. 7F, in an embodiment, one accommodating space 1012 is provided. In an embodiment, two accommodating spaces 1012 are provided, and the two accommodating spaces 1012 extend along the same direction. As shown in FIG. 7G, in an embodiment, four accommodating spaces 1012 are provided, two of accommodating spaces 1012 extend along a first direction X, the other two accommodating spaces 1012 extend along a second direction Y, and the first direction X is perpendicular to or approximately perpendicular to the second direction Y. In this case, the accommodating spaces 1012 are in a ring shape. When the four optical members 3 are disposed in the accommodating spaces 1012, the four optical members 3 are arranged correspondingly in a ring shape (for example, in a "square" shape).

As shown in FIG. 7A to FIG. 7D, the base 101 in this embodiment includes a first wall 1014, a second wall 1015, and a mounting wall 1016. The lamp board 201 of the light emitting unit 2 is completely fixed to the mounting wall 1016. In an embodiment, the lamp board 201 is completely attached to the mounting wall 1016 in a width direction, that is, two sides of the lamp panel 201 in the width direction will not be attached to the first wall 1014 or the second wall 1015. In this embodiment, the first wall 1014 and the second wall 1015 may both be a plane. When the LED illumination device is installed horizontally, each of the first wall 1014 and the second wall 1015 forms an included angle with a horizontal plane. In this embodiment, the arrangement of the mounting wall 1016 may facilitate installation of the light emitting unit 2, so that the light emitter 202 may provide downward light emission after the lamp panel 201 is installed on the mounting wall 1016. In this embodiment, the attachment may be approximate attachment. That is, 30% or more of area of the back surface of the lamp board 201 is attached to the mounting wall 1016. In this embodiment, the attachment may mean that the lamp board 201 is attached to the mounting wall 1016 by using another medium (such as an adhesive). For example, 30% or more of the area of the back surface of the lamp board 201 being attached to the mounting wall 1016 by using an adhesive can mean that the lamp panel 201 is attached to the mounting wall 1016. In this embodiment, the accommodating space 1012 is formed by the first wall 1014, the second wall 1015, and the mounting wall 1016.

In this embodiment, the first wall 1014 and the second wall 1015 are disposed on two sides of the light emitting unit 2 and the optical member 3, respectively. Light generated when the light emitting unit 2 is turned on is emitted after passing through the optical member 3, and at least a part of the emitted light is emitted from the LED illumination device after being reflected from the first wall 1014 and the second wall 1015. In other words, the first wall 1014 and the second wall 1015 redirect the light so as to adjust a light output range of the LED illumination device and light distribution during light output, thereby achieving a better optical performance.

In this embodiment, a plurality of first walls 1014 are connected in sequence and form a concave cavity on the back surface of the base 101. In this embodiment, a plurality (for example, four) of first walls 1014 form four walls of the concave cavity. In addition, a base is provided to form the concave cavity with the four walls. The power source 4 is accommodated in the concave cavity. In an embodiment, at least 80% of the height of the power source 4 in the height direction is located in the concave cavity. In an embodiment, the height of the power source 4 in the height direction is completely located in the concave cavity. In this way, a space occupied by the power source 4 in the height direction of the LED illumination device can be reduced, or even the power source 4 occupies no space in the height direction of the LED illumination device (the height of the base 101 is equal to or approximately equal to the height of the LED illumination device).

The LED illumination device in this embodiment includes only one optical member 3 (one light emitting unit 2 is provided with only one optical member 3; and when a plurality of light emitting units 2 are provided, each of light emitting unit 2 is correspondingly provided with only one optical members 3). When light passes through a medium, there may be light loss. In this embodiment, only one optical member 3 is provided, therefore light loss caused by arranging the optical member can be reduced, and light output efficiency is improved. When the LED illumination device in this embodiment includes only one optical member 3, a light output rate (the light output rate refers to a ratio of a luminous flux emitted by the LED illumination device to a luminous flux generated by the light emitting unit 2) of the LED illumination device may be 90%, 92%, 95%, or more. In this embodiment, the optical member 3 is completely accommodated in the accommodating space 1012, so as not to additionally increase the height of the LED illumination device. In other words, the optical member 3 does not exceed a space defined by the base 101 in the height direction of the LED illumination device. In this embodiment, the light emitting unit 2 and the optical member 3 at least partially overlap with each other in the height direction of the LED illumination device, so as to reduce a height formed after the light emitting unit 2 and the optical member 3 are combined, and also reduce a distance between the light emitting unit 2 and the optical member 3, thereby reducing light loss within the distance. Further, the light emitting unit 2 does not exceed a range defined by the optical member 3 in the height direction of the LED illumination device.

In this embodiment, an area, covered by the optical member 3, of the front surface of the base 101 accounts for not more than 50% of a total area of a front surface of the base 101, so as to reduce a material cost of the optical member 3 as well as reduce weight of the LED illumination device. In this embodiment, the area of the front surface of the base 101 refers to a projection area perpendicular to a direction of the lamp board 201. Specifically, the area of the front surface of the base 101 is a product of a length and a width of the base 101. The area, covered by the optical member 3, of the front surface of the base 101 refers to a projection area of the optical member 3 on the base 101. Actually, the area is a product of a length and a width of the optical member. In this embodiment, the area, covered by the optical member 3, of the front surface of the base 101 accounts for more than 20% of a total area of the front surface of the base 101, so as to prevent light from being emitted from the optical member 3 with a smaller area to cause local highlight.

Referring to FIG. 7A to FIG. 7D, in this embodiment, the optical member 3 includes a first optical unit 3003 and a second optional unit 3004 in order to meet the requirements of light output uniformity (as shown in the description of the light output uniformity in the above example) and glare prevention.

In this embodiment, the first optical unit 3003 is configured with a light transmission or light diffusion function. In this embodiment, the first optical unit 3003 may be made of a transparent material so as to achieve a light transmission function. In this embodiment, the surface of the first optical unit 3003 is a flat or approximately flat surface. In this embodiment, the first optical unit 3003 may include a diffusion layer so as to achieve a light diffusion function, thereby achieving more uniform light output. In addition, the first optical unit 3003 may also achieve a light diffusion function due to its material properties, for example, the first optical unit 3003 is made of an opalescent material (such as PC). In this embodiment, the first optical unit 3003 corresponds to the front surface of the light emitting unit 2. In the height direction of the LED illumination device, when the light emitting unit 2 is projected to a surface where the first optical unit 3003 is located, the projection of the light emitting unit 2 is completely within the first optical unit 3003. In this embodiment, at least 50% of a luminous flux generated by the light emitting unit 2 in operation is directly emitted from the LED illumination device after being optically treated by the first optical unit 3003.

In this embodiment, the second optical unit 3004 is configured to redirect at least a part of the light emitting to the second optical unit 3004 from the light emitting unit 2 in operation. In this embodiment, a part of the luminous flux generated by the light emitting unit 2 is emitted to the first wall 1014 and the second wall 1015. Luminous flux emitted from the light emitting unit 2 emits to the first wall 1014 and the second wall 1015 when a second optical unit 3004 is provided is smaller than luminous flux emitted from the light emitting unit emits to the first wall 1014 and the second wall 1015 when no second optical unit 3004 is provided. Therefore, due to the arrangement of the second optical unit 3004, the luminous flux emitted to the first wall 1014 and the second wall 1015 can be reduced, thereby reducing light loss caused by reflection of the first wall 1014 and the second wall 1015. In addition, due to the arrangement of the second optical unit 3004, glare of the LED illumination device can be reduced.

In this embodiment, the second optical unit 3004 is disposed at an outer side of the first optical unit 3003, so as to reduce glare of the LED illumination device. In this embodiment, both of two sides of the first optical unit 3003 are provided with the second optical unit 3004. In this embodiment, the first optical unit 3003 and the second optical unit 3004 are formed by an integrated structure. For example, the optical member 3 is integrally formed by a plastic material by an extrusion molding process, and is provided with the first optical unit 3003 and the second optical unit 3004.

In this embodiment, the second optical unit 3004 includes an incident surface 30041 and an exit part 30042. The incident surface 30041 is configured as an approximately flat surface. In an embodiment, the incident surface 30041 is configured as a flat and straight surface. In an embodiment, the incident surface 30041 is configured as a cambered surface. In an embodiment, the incident surface 30041 is configured as a combination of a flat and straight surface and a cambered surface. In order to reduce reflection at the incident surface 30041, an optical element may be further disposed at the incident surface 30041, so as to reduce the above reflection. For example, an antireflection film may be disposed at the incident surface 30041.

In this embodiment, the exit part 30042 includes a plurality of redirecting structures 30043 for limiting a light output angle, thereby reducing glare. In this embodiment, the redirecting structure 30043 may be made of the same material as the first optical unit 3003. In addition, an index of refraction of the redirecting structure 30043 is not smaller than that of the first optical unit 3003. The redirecting structures 30043 in the same exit part 30042 are disposed in different directions.

In this embodiment, a cross section of the redirecting structure 30043 is configured as a triangular or approximately triangular structure.

Figure 8A:
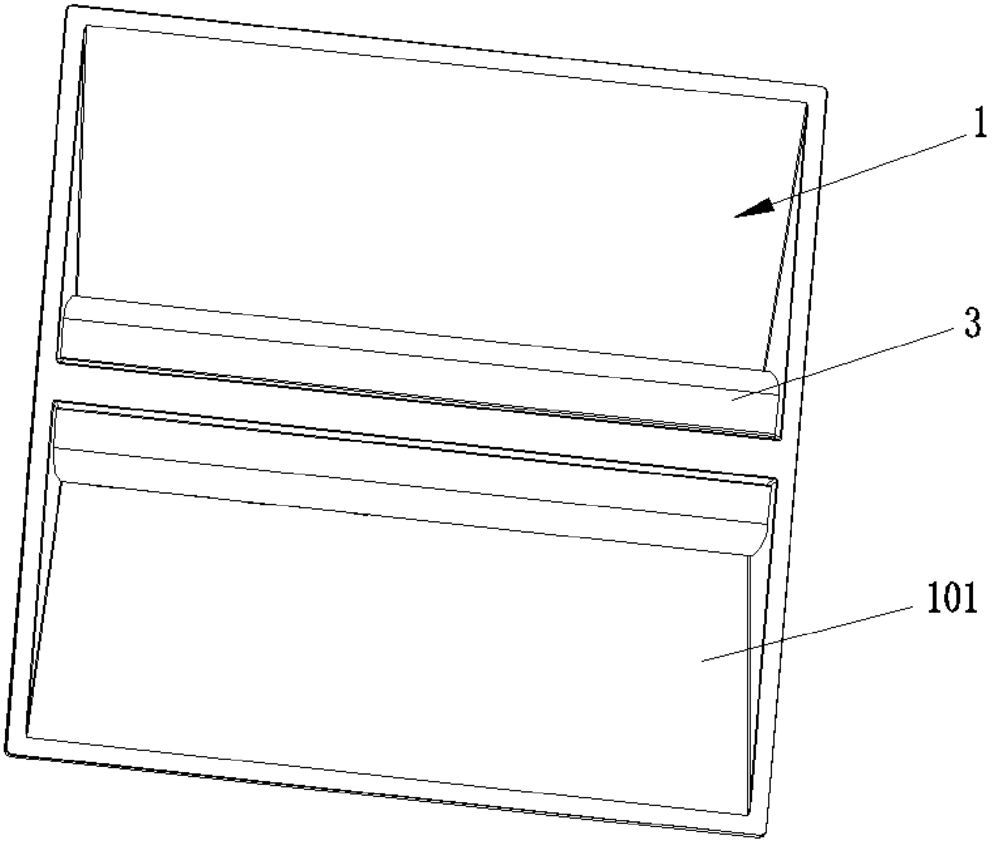
FIG. 8A is a stereoscopic schematic diagram I of an LED illumination device according to an eighth embodiment of present invention.
Figure 8B:
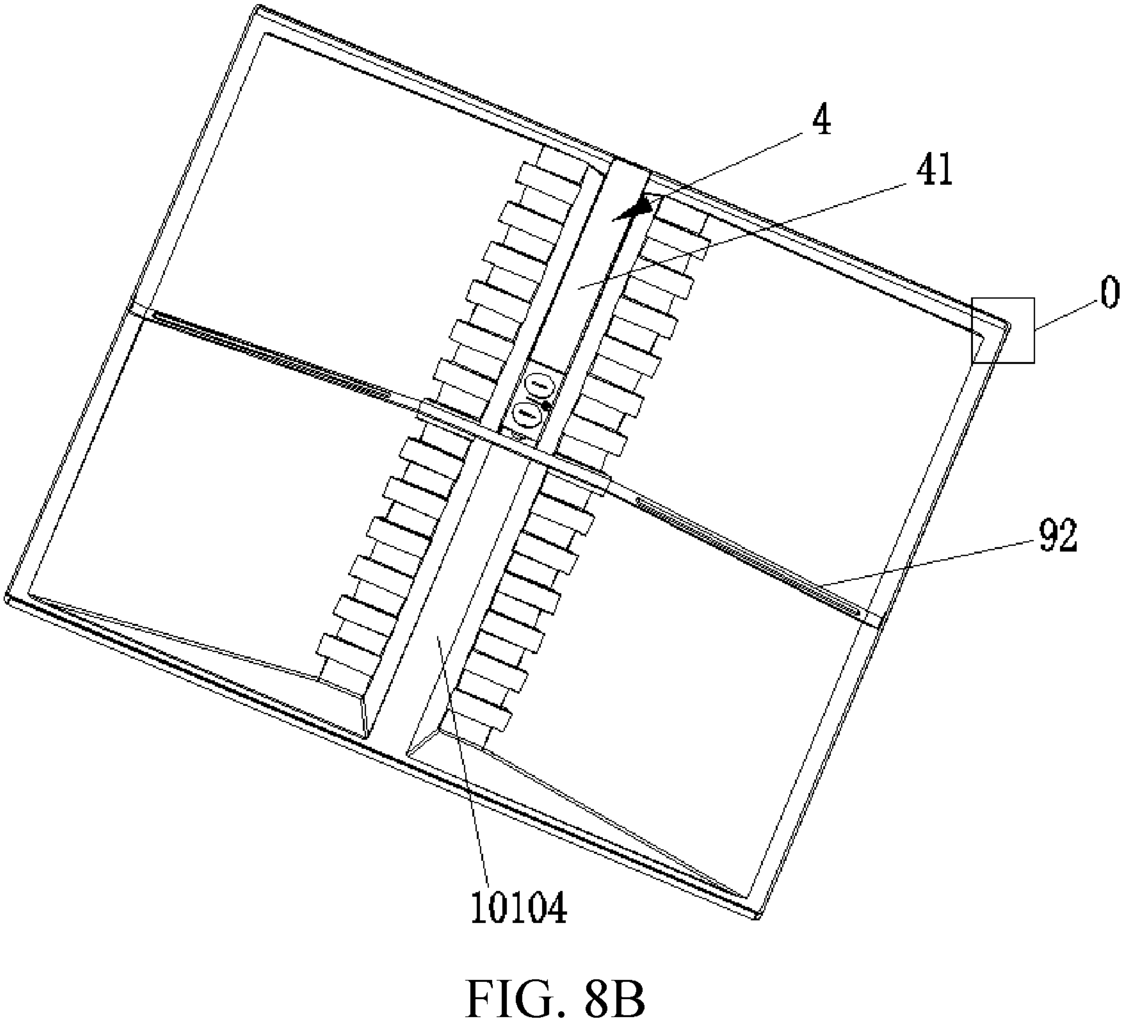
FIG. 8B is a stereoscopic schematic diagram II of the LED illumination device according to the eighth embodiment of present invention.
Figure 8C:
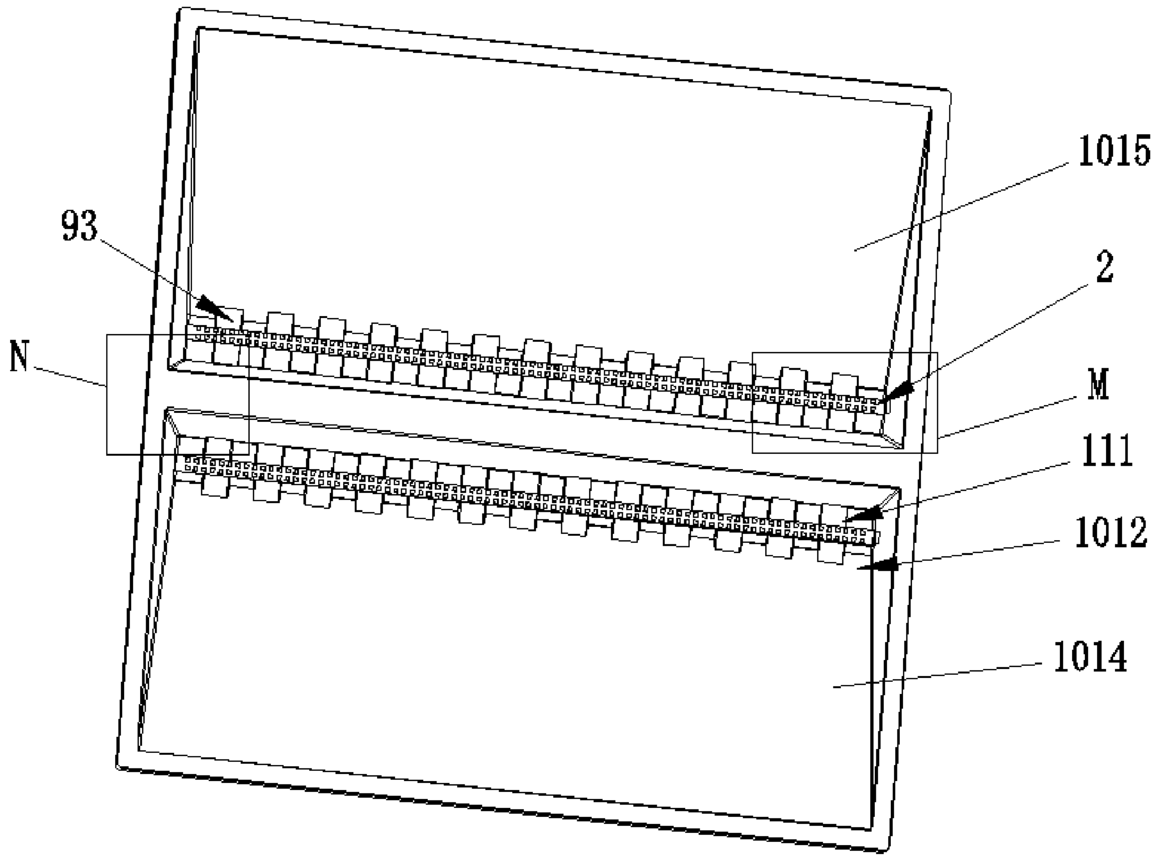
FIG. 8C is a stereoscopic schematic diagram of FIG. 8A with an optical member removed.
Figure 8D:
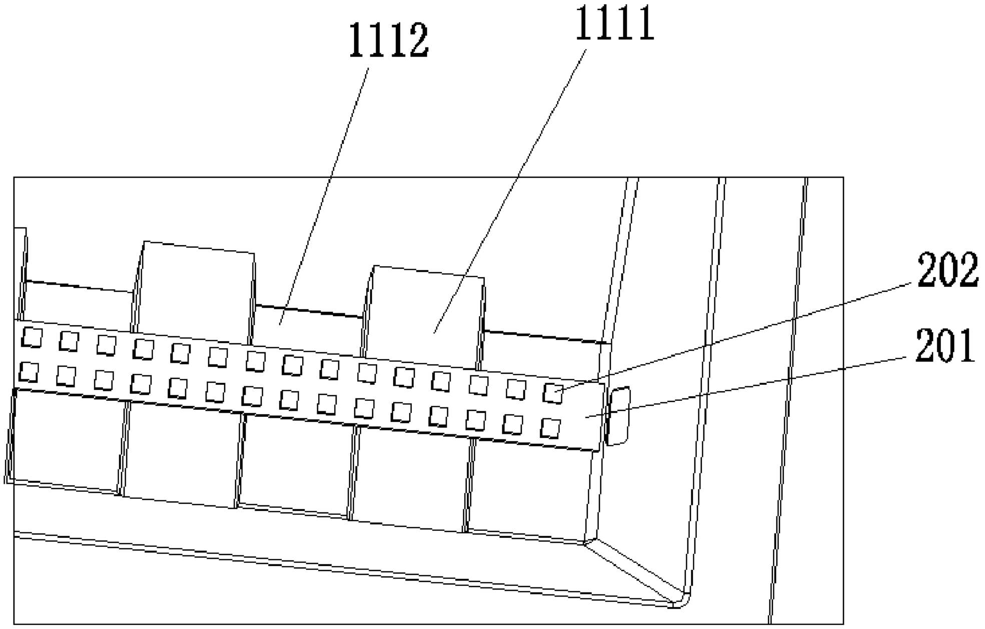
FIG. 8D is an enlarged view of a location M in FIG. 8C.
Figure 8E:
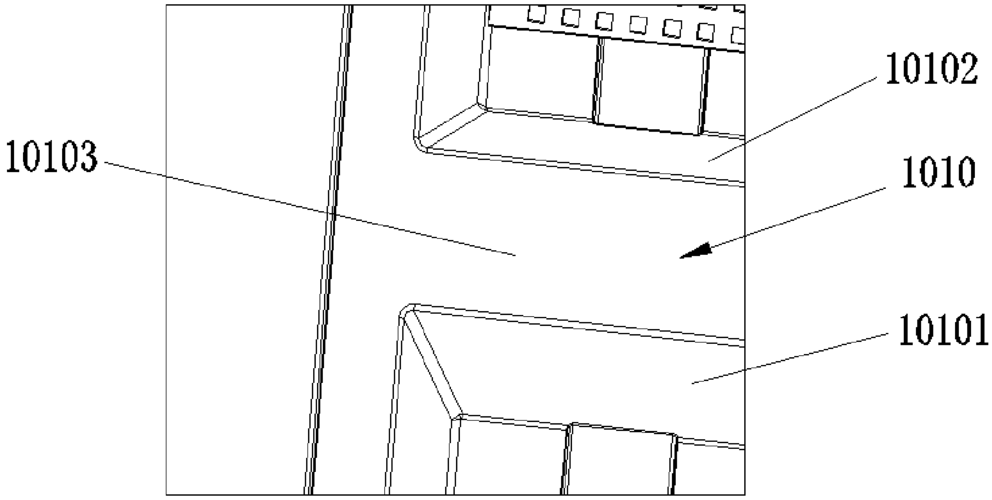
FIG. 8E is an enlarged view of a location N in FIG. 8C.
Figure 8F:
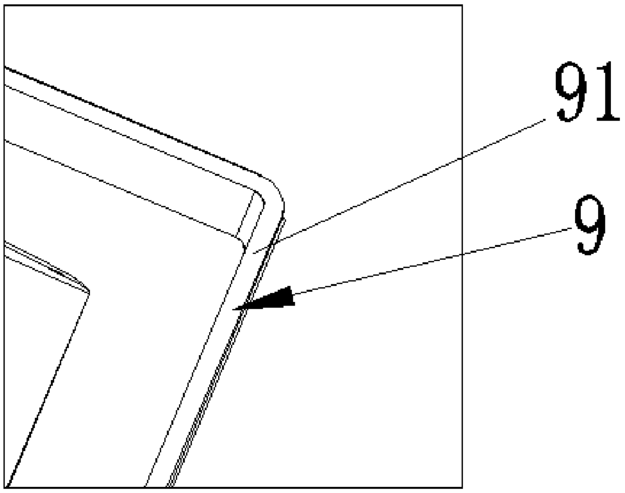
FIG. 8F is an enlarged view of a location O in FIG. 8B.
Figure 9A:
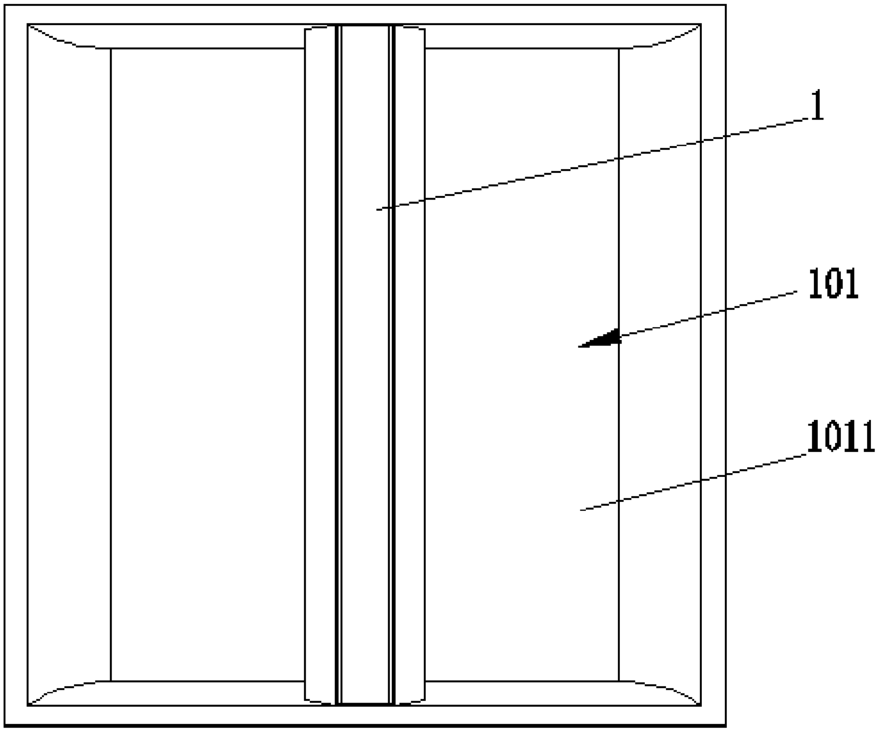
FIG. 9A is a structural schematic front view of an LED illumination device according to a ninth embodiment of present invention.
Figure 9B:
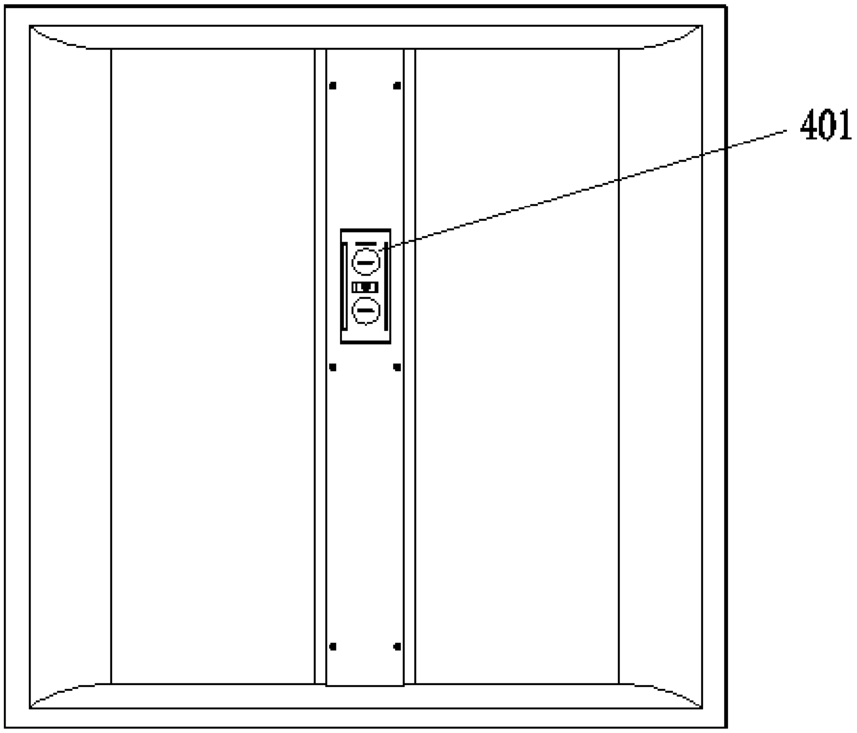
FIG. 9B is a rear view of FIG. 9A.
Figure 9C:
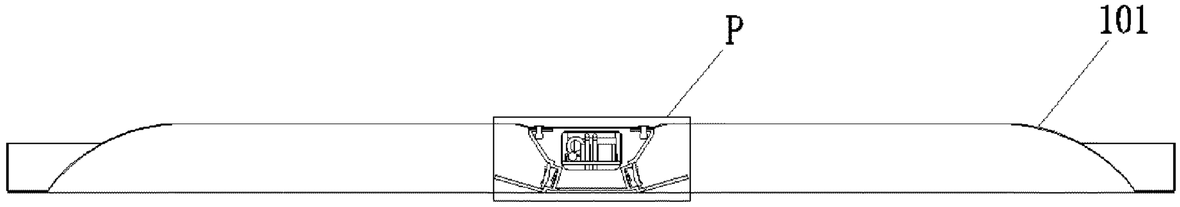
FIG. 9C is a structural schematic cross-sectional view of the LED illumination device according to the ninth embodiment of the present invention.
Figure 9D:
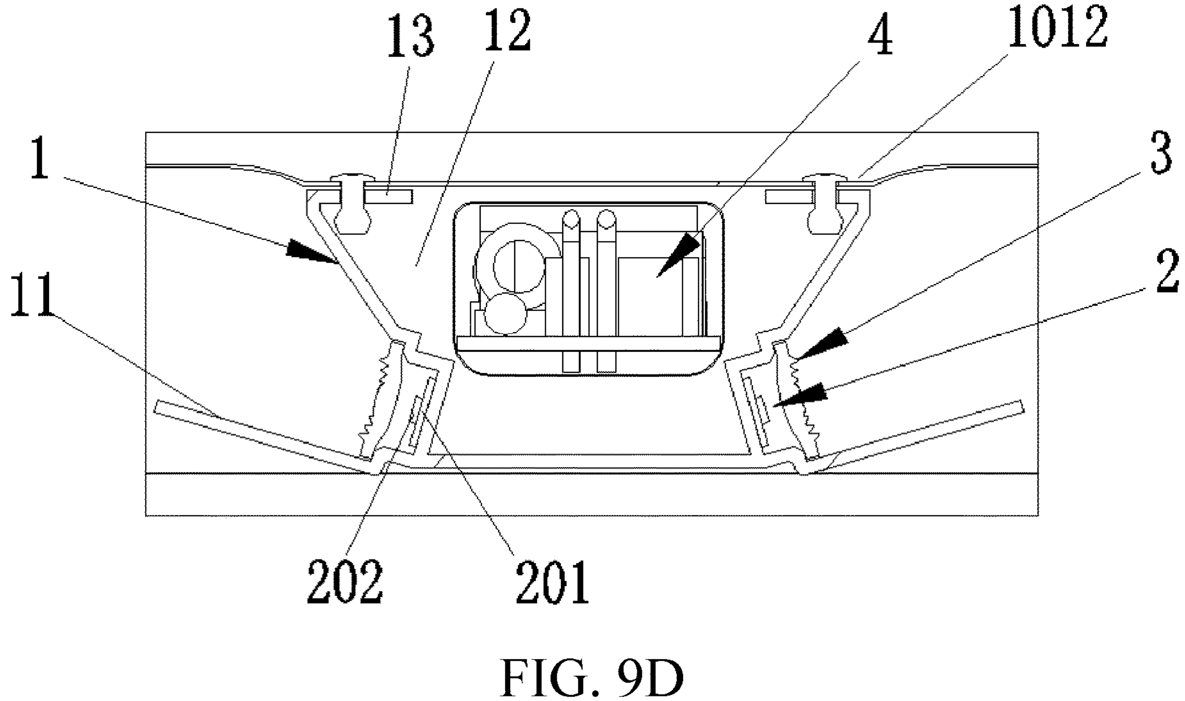
FIG. 9D is an enlarged view of a location P in FIG. 9C.

As shown in FIG. 8A to FIG. 8C, an eighth embodiment of the present disclosure provides an LED illumination device. A basic structure of the LED illumination device in this embodiment is the same as that in the above sixth embodiment. In this embodiment, the LED illumination device includes a light source carrier 1, a light emitting unit 2, an optical member 3, and a power source 4. The light emitting unit 2 is fixed to the light source carrier 1, and the optical member 3 covers or at least partial optical member 3 covers the light emitting unit 2, so that when the light emitting unit 2 is turned on, light emitted by the light emitting unit is at least partially or completely emitted from the LED illumination device through the optical member 3. In an embodiment, when the light emitting unit 2 is turned on, at least 70% of a luminous flux emitted by the light emitting unit is directly emitted (without being reflected by the base 101 or the like) from the LED illumination device through the optical member 3. In an embodiment, when the light emitting unit 2 is turned on, at least 5% of a luminous flux emitted by the light emitting unit is emitted out after being reflected by the base 101, so that the base 101 is illuminated, improving a visual effect. In this embodiment, the light emitting unit 2 is non-detachably (irreplaceably) fixed to the light source carrier 1 (therefore the device may be referred to as an integrated illumination device).

Referring to FIG. 8A to FIG. 8D, the light source carrier 1 in this embodiment includes a base 101 (not including the above detachable end cover), and the base 101 is formed by an integrated structure. The base 101 defines a mounting surface 111, and the light emitting unit 2 is directly or indirectly fixed to the mounting surface 111. Further, the light emitting unit 2 includes a lamp board 201 and a light emitter 202, the light emitter 202 is fixed to the lamp board 201, and the light emitter 202 may be an LED light bead. In this embodiment, the lamp board 201 is attached to the mounting surface 111. For example, the lamp board 201 is adhered to the mounting surface 111 by using an adhesive, or the mounting surface 111 is provided with a mounting structure for attaching the lamp board 201 to the mounting surface by means of clamping, buckling, threaded connection, magnetic suction, and the like. In this embodiment, the light emitting unit 2 forms a heat conduction path with the base 101 after the lamp panel 201 is fixed to the mounting surface 111. In this way, heat produced when the light emitting unit 2 is turned on can be conducted to the base 101 and dissipated through the base 101.

In this embodiment, the base 101 is configured as a bevel, so that the accommodating space 1012 is formed on the base 101; the light emitting unit 2 and the optical member 3 are both disposed in the accommodating space 1012; in addition, in the height direction of the base 101, the light emitting unit 2 and the optical member 3 are both within a range (a range defined by the accommodating space 1012 in a height/thickness direction of the LED illumination device) defined by the accommodating space 1012. In this embodiment, a plurality of accommodating spaces 1012 may be provided, and thus a plurality of light emitting units 2 and optical members 3 are provided correspondingly. In an embodiment, two accommodating spaces 1012 are provided, and the two accommodating spaces 1012 extend along a same direction.

As shown in FIG. 8A to FIG. 8E, the base 101 in this embodiment includes a first wall 1014 and a second wall 1015 that are inclined, and the first wall 1014 and the second wall 1015 can reflect at least a part of light generated by the light emitting unit 2 in operation. Specifically, the first wall 1014 is configured to reflect light generated by one of the plurality of light emitting units 2 in operation (approximately, the first wall 1014 reflects only the light generated by the corresponding light emitting unit 2 in operation). The second wall 1015 is configured to reflect light generated by another of the plurality of light emitting units 2 in operation (approximately, the second wall 1015 reflects only the light generated by the corresponding light emitting unit 2 in operation).

In this embodiment, a protrusion 1010 may be formed on the base 101 in a bending manner. The protrusion 1010 includes a first side surface 10101 and a second side surface 10102, and the first side surface 10101 and the first wall 1014 form one accommodating space 1012. The second side surface 10102 and the second wall 1015 form another accommodating space 1012. In this embodiment, the protrusion 1010 further includes a connection surface 10103. The first side surface 10101 is connected to the second side surface 10102 by a connecting surface 10103. After the light emitting unit 2 and the optical member 3 are disposed in the accommodating space 1012, the light emitting unit 2 and the optical member 3, on the front surface (one side provided with the light emitting unit 2) of the LED illumination device, both are within a position defined by the connecting surface 10103.

In this embodiment, the first side surface 10101 and the second side surface 10102 form a power source accommodating groove 10104 on a back surface (one side with no light emitting unit 2) of the LED illumination device, and the power source 4 is disposed in the power source accommodating groove 10104. In addition, the power source 4 does not exceed a range defined by the base 101 (a range defined by the power source accommodating groove 10104) in the height direction of the LED illumination device, so as to control the total height of a lamp. In this embodiment, in order to control an overall height of the LED illumination device, a height of the power box 4 accounts for 80% or more of a total height of the LED illumination device. When the power box 41 of the power source 4 is a standard part, or the power box 41 ensures a space for installing parts such as the power panel and the electronic element, the higher the proportion of the height of the power box 41 to the total height of the LED illumination device, the higher the space utilization rate, and the better the control on the total height of the lamp.

The LED illumination device in this embodiment may include only one optical member 3 (one light emitting unit 2 is provided with only one optical member 3; and when a plurality of light emitting units 2 are provided, each of light emitting units 2 are correspondingly provided with only one of optical members 3). Light loss is absolutely caused when light passes through a medium. However, in this embodiment, only one optical member 3 is provided, therefore light loss caused by arranging the optical member can be reduced, and light output efficiency is improved. When the LED illumination device in this embodiment includes only one optical member 3, a light output rate (the light output rate refers to a ratio of a luminous flux emitted by the LED illumination device to a luminous flux generated by the light emitting unit 2) of the LED illumination device may be 90%, 92%, 95%, or more. In this embodiment, the optical member 3 is completely accommodated in the accommodating space 1012, so as not to increase an additional height space of the LED illumination device. In other words, the optical member 3 does not exceed a space defined by the base 101 in the height direction of the LED illumination device. In this embodiment, the light emitting unit 2 and the optical member 3 at least partially overlap with each other in the height direction of the LED illumination device, so as to reduce a height formed after the light emitting unit 2 and the optical member 3 are combined, and also reduce a distance between the light emitting unit 2 and the optical member 3, thereby reducing light loss of light within the distance. Further, the light emitting unit 2 does not exceed a range defined by the optical member 3 in the height direction of the LED illumination device. In some embodiment, only one optical members 3 is provided, and the optical member 3 corresponds to one or more of light emitting units 2.

In this embodiment, an area, covered by the optical member 3, of the front surface of the base 101 accounts for not more than 50% of a total area of a front surface of the base 101, so as to reduce a material cost of the optical member 3 as well as reduce weight of the LED illumination device. In this embodiment, the area of the front surface of the base 101 refers to a projection area perpendicular to a direction of the lamp board 201. Specifically, the area of the front surface of the base 101 is a product of a length and a width of the base 101. The area, covered by the optical member 3, of the front surface of the base 101 refers to an area occupied by projection of the optical member 3 on the base 101. Actually, the area is a product of a length and a width of the optical member. In this embodiment, the area, covered by the optical member 3, of the front surface of the base 101 accounts for more than 40% of a total area of the front surface of the base 101, so as to prevent light from being emitted from the optical member 3 with a smaller area to cause local highlight.

In this embodiment, the optical member 3 may be configured with a light diffusion function so as to achieve more uniform light output. For example, the optical member 3 is a plate-like structure, and a material of the optical member has light transmission and light diffusion functions, so that the optical member 3 has a light diffusion function. For another example, the optical member 3 is a plate-like structure, and has a light transmission function. In addition, an outer side surface or an inner side surface of the optical member 3 is provided with a diffusion layer, so that the optical member 3 has a light diffusion function.

As shown in FIG. 8A to FIG. 8F, a reinforcing structure 9 may be further provided for enhancing structural strength of the LED illumination device. In this embodiment, a peripheral portion of the base 101 is bent to form a plurality of side walls (there are 4 side walls in this embodiment). The reinforcing structure 9 includes a first reinforcing member 91, and the first reinforcing member 91 is at least connected to two of side walls, so as to enhance structural strength of the base 101. Further, the first reinforcing member 91 is connected to all the side walls of the peripheral portion of the base 101. For example, the first reinforcing element 91 is an annular frame disposed at opposite inner sides of the side walls. In this way, the overall structural strength of the base 101 is enhanced, and twisting resistance is also improved. In an embodiment, a thickness of the first reinforcing member 91 is larger than a thickness of the side wall. In an embodiment, the first reinforcing member 91 is formed by an integrated structure.

The reinforcing structure 9 may further include a second reinforcing member 92, and the second reinforcing member 92 is at least partially attached to the back surface of the base 101. The second reinforcing member 92 is connected to both the first wall 1014 and the second wall 1015. Two ends of the second reinforcing member 92 may be attached to the first reinforcing member 91. The second reinforcing member 92 is a strip-shaped plate-like structure, and the surface of the second reinforcing member may be provided with a reinforcing rib.

The reinforcing structure 9 may further include a third reinforcing member 93, and the third reinforcing member 93 is formed at the mounting surface 111. Specifically, the mounting surface 111 includes a first surface 1111 and a second surface 1112, the lamp board 201 is attached to the first surface 1111, and the lamp board 201 maintains a space with the second surface 1112. From another perspective, the first surface 1111 protrudes from the second surface 1112, and such structure forms the third reinforcing member 93. The third reinforcing member 93 improves twisting resistance of the mounting surface 111, ensuring that the light emitters 202 are approximately disposed on the same plane and emit light toward a vertically downward direction of the LED illumination device (when the LED illumination device is in a normal installation state).

As shown in FIG. 9A to FIG. 9D, a ninth embodiment of present invention provides an LED illumination device. A basic structure of the LED illumination device in this embodiment may be the same as that in the aforementioned embodiment. The LED illumination device in this embodiment includes a base 101, a light emitting unit 2, an optical member 3, and a power source 4. In addition, this embodiment further includes a light source carrier 1, and the light source carrier 1 is fixed to the base 101. Specifically, in some embodiments, the light source carrier 1 may be fixed to the base 101 by using a fastener, for example, a screw and a rivet. In other embodiment, the light source carrier 1 can be directly welded, adhered or buckled to the base 101, so that the light source carrier 1 is detachably or non-detachably fixed to the base 101. The light source carrier 1 includes a connecting wall 13, and the connecting wall 13 is attached to a surface of the base 101 to increase a contact area there between. When the LED illumination device is in an operation state (turned on), heat on the light source carrier 1 can be quickly conducted to the base 101. The light source carrier 1 is connected to the base 101 by the connecting wall 13.

In this embodiment, the light emitting unit 2 is fixed to the light source carrier 1. The optical member 3 and the light emitting unit 2 are arranged correspondingly, and light generated by the light emitting unit 2 in operation at least partially or completely passes through the optical member 3, thereby redirecting the light.

In an embodiment, at least 70% of a luminous flux emitted from the optical member 3 is emitted from a lamp after being reflected once or more times. In an embodiment, at least 80% of a luminous flux emitted from the optical member 3 is emitted from a lamp after being reflected once or more times. In an embodiment, at least 90% of a luminous flux emitted from the optical member 3 is emitted from a lamp after being reflected once or more times. In this way, direct light output through the optical member 3 is reduced, thereby preventing local highlight and reducing glare.

In an embodiment, at least 30% of a luminous flux emitted from the optical member 3 is directly emitted from the LED illumination device after being reflected by a reflective surface 1011 on the base 101. In an embodiment, at least 40% of a luminous flux emitted from the optical member 3 is directly emitted from the LED illumination device after being reflected by a reflective surface 1011 on the base 101. Light is emitted from a lamp after being reflected only once, which can control light loss caused by reflection and improve light output efficiency.

In this embodiment, the light source carrier 1 has a first mounting position. The light emitting unit 2 includes a lamp board 201 and a light emitter 202, the light emitter 202 is fixed to the lamp board 201, and the light emitter 202 may be an LED light bead. In this embodiment, the lamp board 201 is attached to a surface of the light source carrier 1 at the first mounting position so as to fix the position of the light emitting unit 2. For example, the lamp board 201 is adhered to the surface of the light source carrier 1 at the first mounting position by using an adhesive, or a mounting structure is disposed on the surface of the light source carrier 1 at the first mounting position, so that the lamp board 201 is attached to the surface of the light source carrier 1 at the first mounting position by means of clamping, buckling, threaded connection, magnetic suction, and the like. In this embodiment, after the lamp board 201 is fixed to the surface of the light source carrier 1 at the first mounting position, the light emitting unit 2 forms a heat conduction path with the light source carrier 1. In this way, heat produced when the light emitting unit 2 is turned on can be conducted to the light source carrier 1 and dissipated through the light source carrier 1 (a part of heat is directly dissipated at the light source carrier 1, and the remaining heat is thermally conducted to the base 101 for dissipation). In this embodiment, the light source carrier 1 may be made of a metal material such as aluminum, so as to improve heat dissipation efficiency.

In this embodiment, the light source carrier 1 has a second mounting position. The optical member 3 is disposed at the second mounting position for fixing the optical member 3. In an embodiment, the optical member 3 is adhered to a surface of the light source carrier 1 at the second mounting position by using an adhesive. In some embodiment, a mounting structure is disposed at the second mounting position, so that the optical member 3 is attached to the surface of the light source carrier 1 at the second mounting position by means of clamping, buckling, threaded connection, magnetic suction, and the like.

In an embodiment, the optical member 3 includes a lens (Fresnel lens) to redirect light generated by the light emitting unit 2 in operation, such that more light is directly projected to a reflective surface of the base 101.

A light shielding part 11 is disposed on the light source carrier 1. At least a part of light emitted out after passing through the optical member 3 is emitted to the light shielding part 11, and is projected to the reflective surface of the base 101 after being reflected by the light shielding part 11. By arrangement of the light shielding part 11, a luminous flux directly emitted after passing through the optical member 3 can be reduced, thereby reducing glare and preventing local highlight. In a height direction of an LED lamp, when the light emitting unit 2 and/or the optical member 3 are/is projected to a plane where the light shielding part 11 is located, the projections are completely located in a range of the plane where the light shielding part 11 is located. In this way, the light emitting unit 2 and/or the optical member are prevented from being exposed, thereby improving the appearance.

In an embodiment, when the light emitting unit 2 operates, a luminous flux emitted to the light shielding part 11 is not more than 40% of a luminous flux of the optical member 3, so as to control light loss caused by secondary reflection. In this embodiment, the luminous flux emitted from the LED lamp after the luminous flux emitted from the optical member 3 is reflected once is higher than the luminous flux emitted from the LED lamp after the luminous flux is reflected twice. By controlling the luminous flux after twice reflection, light loss caused by reflection can be reduced, and light output efficiency is improved.

Two light emitting units 2 and two optical members 3 are provided, and are symmetrically or approximately symmetrically disposed on the light source carrier 1. The light source carrier 1 is formed by an integrated structure and includes an accommodating space 12, and the power source 4 is disposed in the accommodating space 12. The power source 4 does not exceed a space defined by the base 101 in the height direction of the LED illumination device, such that the power source 4 will not increase an extra height of the lamp. Similarly, the light source carrier 1 may not exceed the space defined by the base 101 in the height direction of the LED illumination device either, such that the light source carrier 1 does not increase an extra height of the lamp.

The light source carrier 1 extends along a longitudinal direction of the LED illumination device, in a strip shape. A ratio of a size of the light source carrier 1 in a width direction of the LED illumination device to a width size of the LED illumination device (that is, a width size of the base 101) is not greater than 0.2. The light source carrier 1 is a region with no light emission. Therefore, by reduction of a width of the light source carrier 1, an area of a light output region of the LED illumination device can be increased accordingly.

A surface illuminance of at least 50%, 60%, 70%, 80% or 90% of area on reflective surface 1011 (not including a part shielded by the light source carrier 1) of the base 101 is as high as 6500 lux, thereby increasing light output area of the LED illumination device. Same luminous flux of light output is emitted out through a larger light output area, such that more uniform light output is achieved.

In the width direction of the LED illumination device, a plurality of light emitting regions with a width of 50 mm are sequentially sectioned on the reflective surface 1011 of the base 101, and the adjacent light emitting regions abut against each other. A ratio of a luminous flux emitted from a surface of any light emitting region to a luminous flux emitted from a surface of an adjacent light emitting region ranges from 0.6 to 1.5. In this way, in the width direction of the LED illumination device, more uniform luminous intensity transition is achieved, and distinct illuminance difference on the base 101 is prevented.

The power source 4 includes a wiring board 401. An electronic components of the power source 4 is disposed on a front surface (one surface with the light emitting unit 2) of the base 101, while the wiring board 401 is located on a back surface of the base 101, thereby facilitating introduction of external power through the wiring board 401. The wiring board 401 is configured not to exceed a height range defined by the base 101, so that the wiring board 401 does not increase an extra height space. Specifically, the back surface of the base 101 is provided with a recess 1012, and the wiring board 401 is at least partially or completely accommodated inside the recess 1012 in the height direction of the base 101.

As shown in FIG. 10A to FIG. 10C, and FIG. 11A to FIG. 11C, a tenth embodiment of present invention provides an LED illumination device. The LED illumination device includes a lamp and a light emitting unit 2. The lamp includes a light source carrier 1. The light emitting unit 2 is fixed to the light source carrier 1. The light emitting unit 2 is detachably fixed to the light source carrier 1. In this way, the light emitting unit 2 is replaceable. Therefore, the LED illumination device may be referred to as a two-piece LED illumination device. The lamp and the light emitting unit 2 can be separately packaged, transported and sold. The light emitting unit 2 may be a T5 straight tubular lamp, or a T8 straight tubular lamp.

The light source carrier 1 in present invention includes a base 11. The base 11 extends along a first direction X, and the base 11 defines an accommodating space for accommodating the light emitting unit 2. In addition, after the light emitting unit 2 is disposed in the accommodating space, the light emitting unit 2 does not exceed a space defined by the accommodating space in a height direction of the base 11. The base 11 has a bottom 111 and side parts 112 that are disposed on two sides of the bottom, and the bottom 111 and the side parts 112 form the accommodating space of the base 11.

In present invention, the bottom 111 and the side parts 112 form an inner contour 113 or part of the inner contour of the base 11 on an inner side of the base 11 (one side close to the accommodating space), the bottom 111 and the side parts 112 form an outer contour 114 or part of the outer contour 114 of the base 11 on an outer side of the base 11, and the inner contour 113 matches with the outer contour 114. In other words, two bases 11 may overlap, and the two bases 11 at least partially overlap in the height direction of the base 11. For example, a height of the base 11 is H, and the height formed after two bases 11 overlap is smaller than 2H. Further, the height formed after the two bases 11 overlap is smaller than 1.6H. Furthermore, the height formed after the two groups of bases 11 overlap is smaller than 1.5H, 1.4H, 1.3H, 1.2H, or 1.1H. In this way, a basic condition is provided for two LED illumination devices.

The light source carrier in present invention further includes end covers 12, two end covers 12 are provided, and the two end covers are disposed at two ends in the first direction X of the base 11, respectively. The light emitting assembly 2 is detachably fixed to the end cover 12. The light emitting assembly 2 includes a lamp tube 21, a lamp board 22, a light emitter 23, lamp caps 24, and conducting pins 25 disposed on the lamp caps 24, the light emitter 23 may be an LED light bead, and the light emitter 23 is fixed to the lamp board 22. The lamp board 22 is fixed to an inner circumference of the lamp tube 21. The lamp caps 24 are fixed to two ends of the lamp tube 21. The light emitting assembly 2 is fixed to the end covers 12 through the conducting pins 25.

Figure 10A:
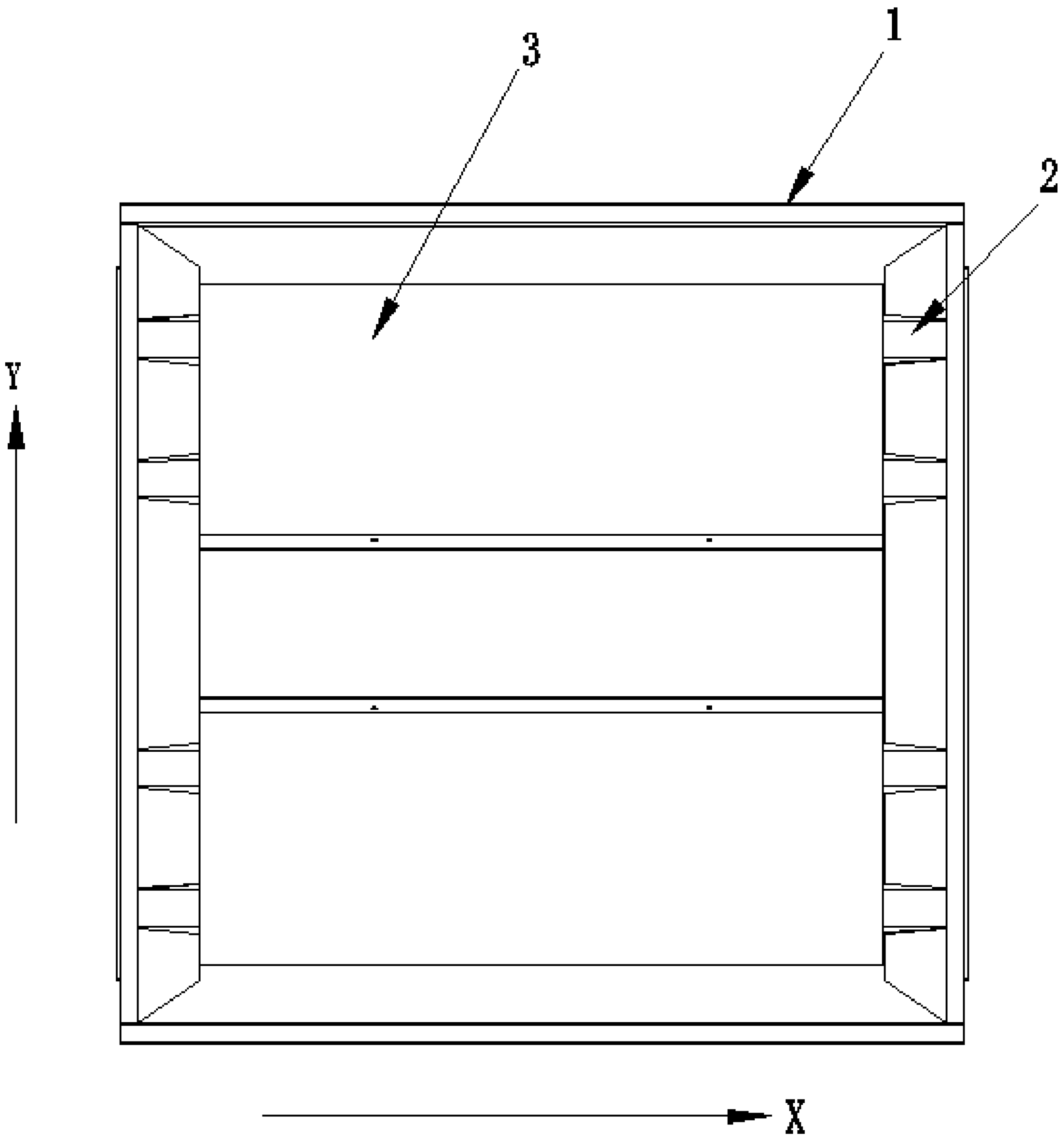
FIG. 10A is a schematic front view of an LED illumination device according to a tenth embodiment of present invention.
Figure 10B:
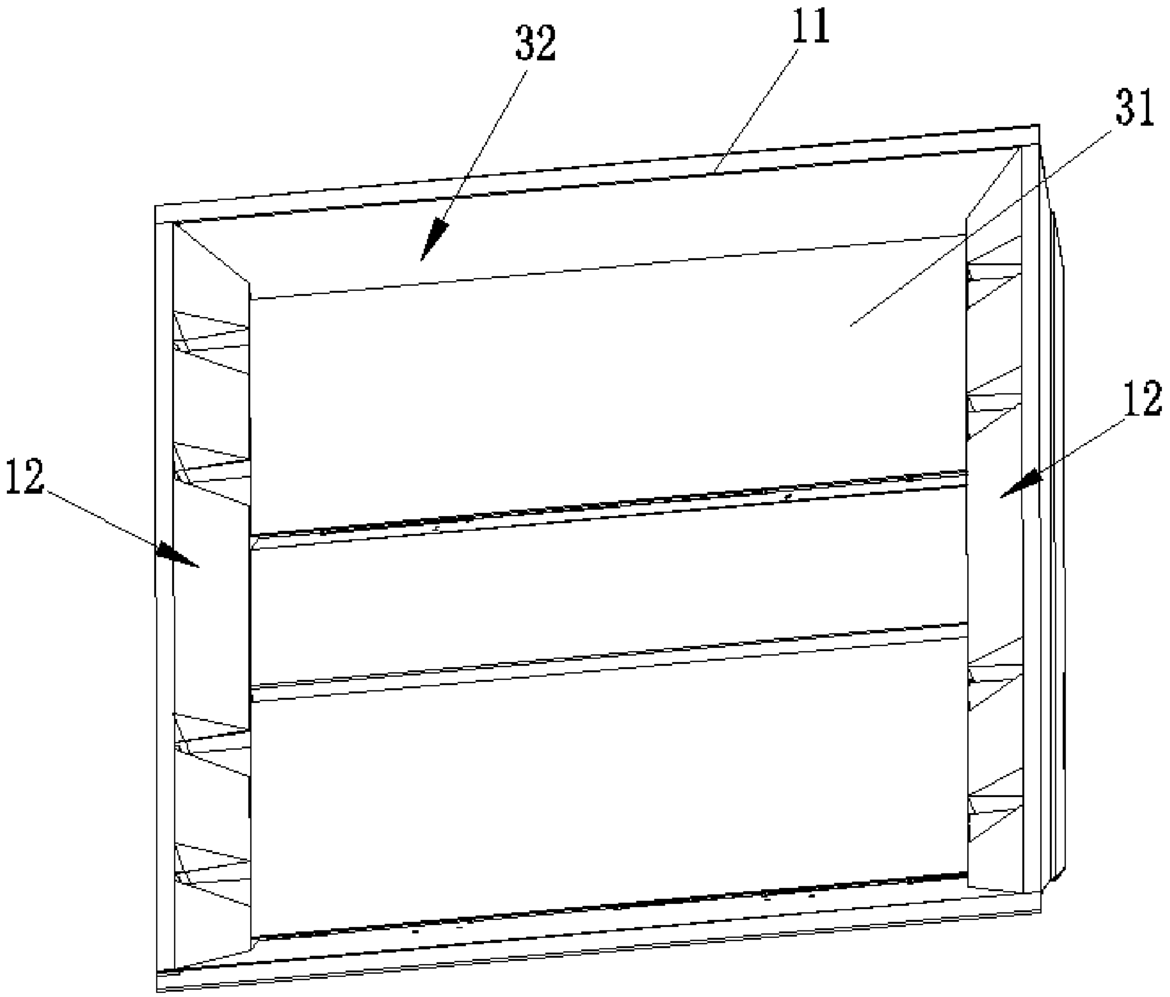
FIG. 10B is a stereoscopic schematic diagram of the LED illumination device according to the tenth embodiment of present invention.
Figure 10C:
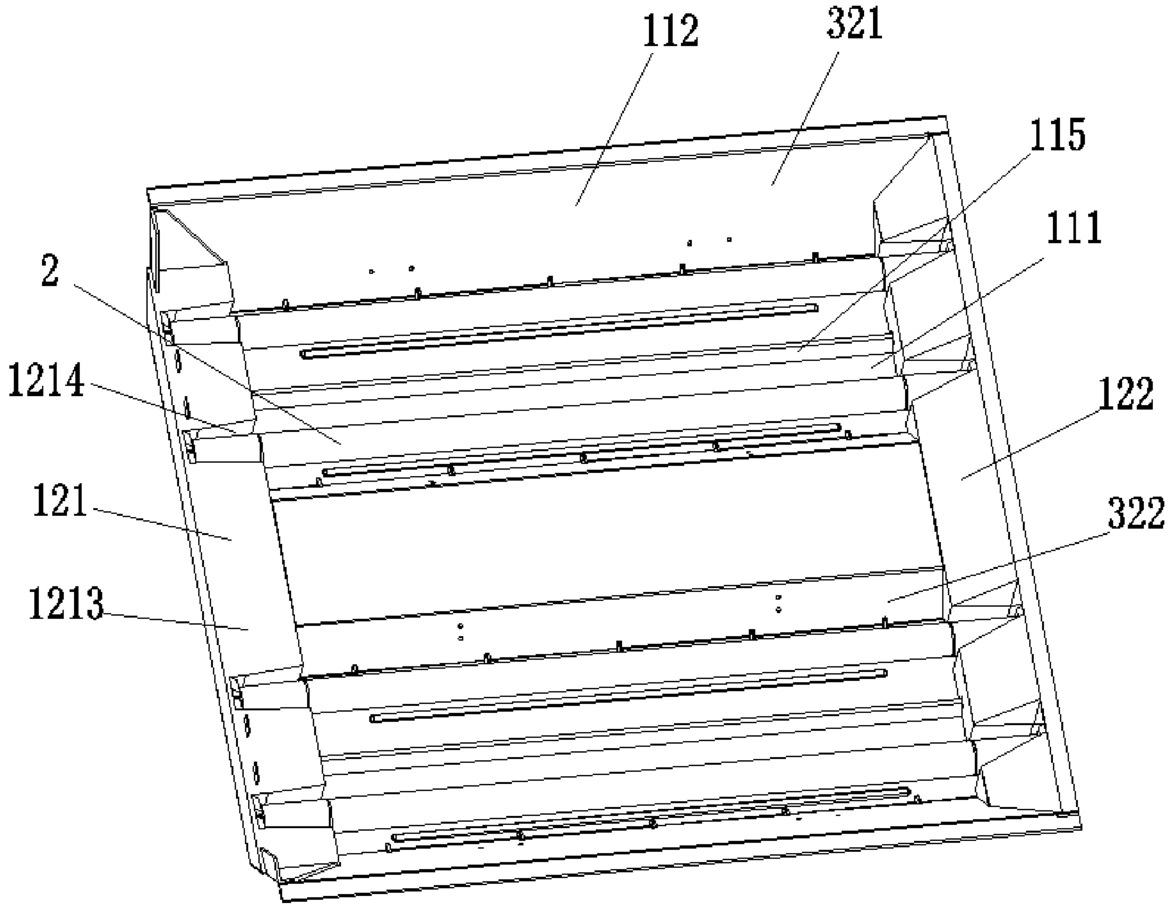
FIG. 10C is a stereoscopic schematic diagram of the LED illumination device according to the tenth embodiment of present invention with a panel removed.
Figure 10D:
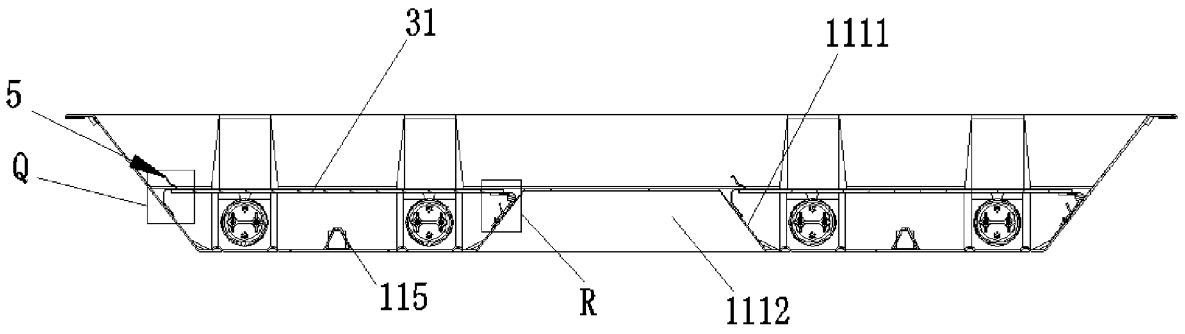
FIG. 10D is a schematic cross-sectional view of the LED illumination device according to the tenth embodiment of present invention.
Figure 10E:
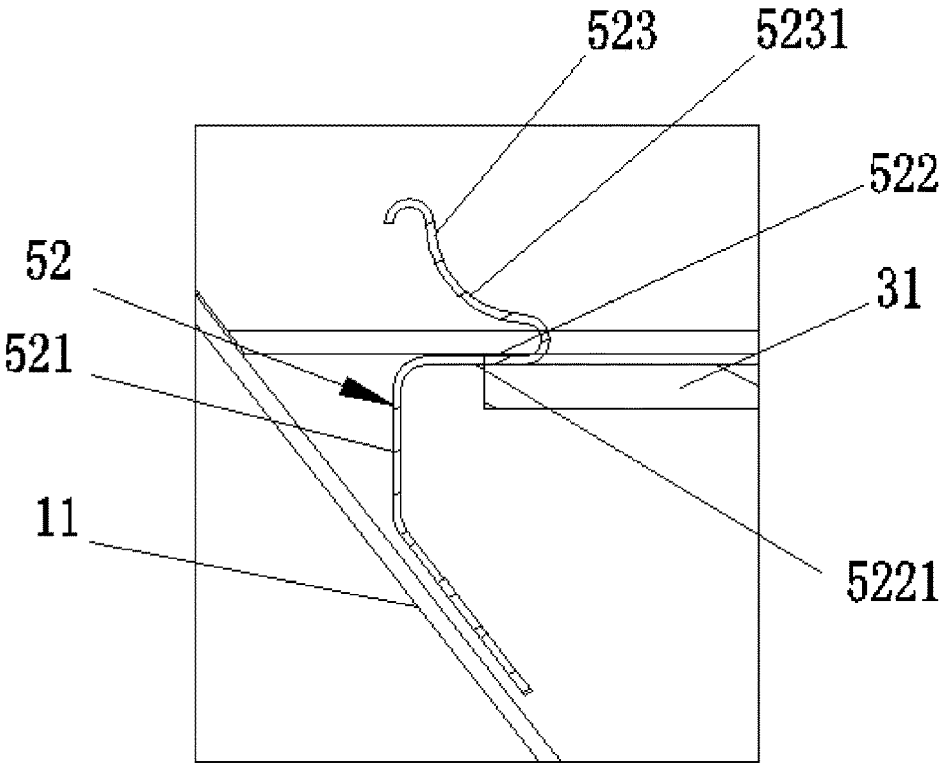
FIG. 10E is an enlarged schematic diagram of a location Q in FIG. 1D.
Figure 10F:
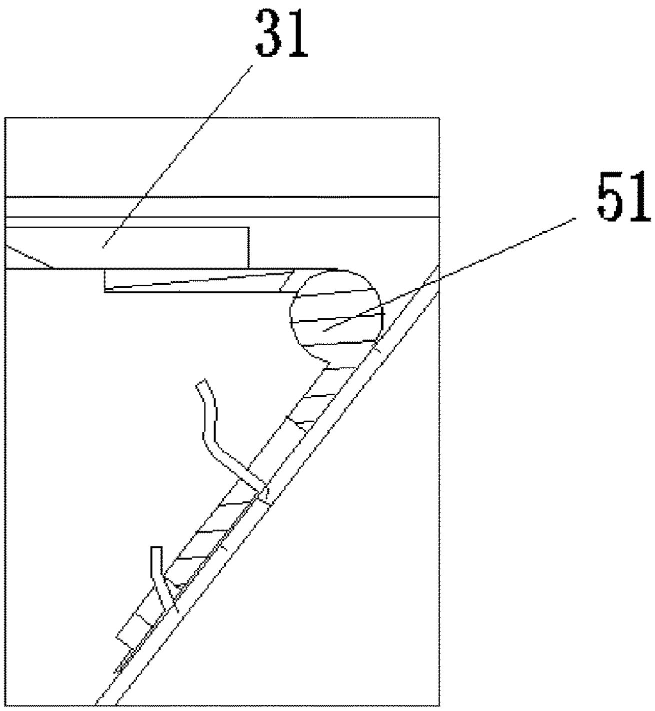
FIG. 10F is an enlarged schematic diagram of a location R in FIG. 1D.
Figure 10G:
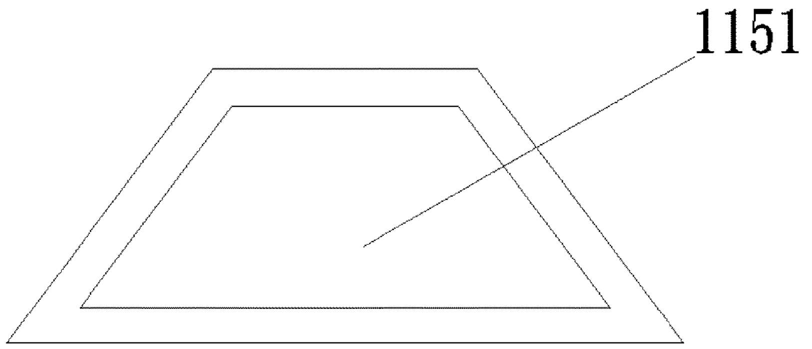
FIG. 10G is a structural schematic diagram of a wire passing part according to the tenth embodiment of present invention.
Figure 10H:
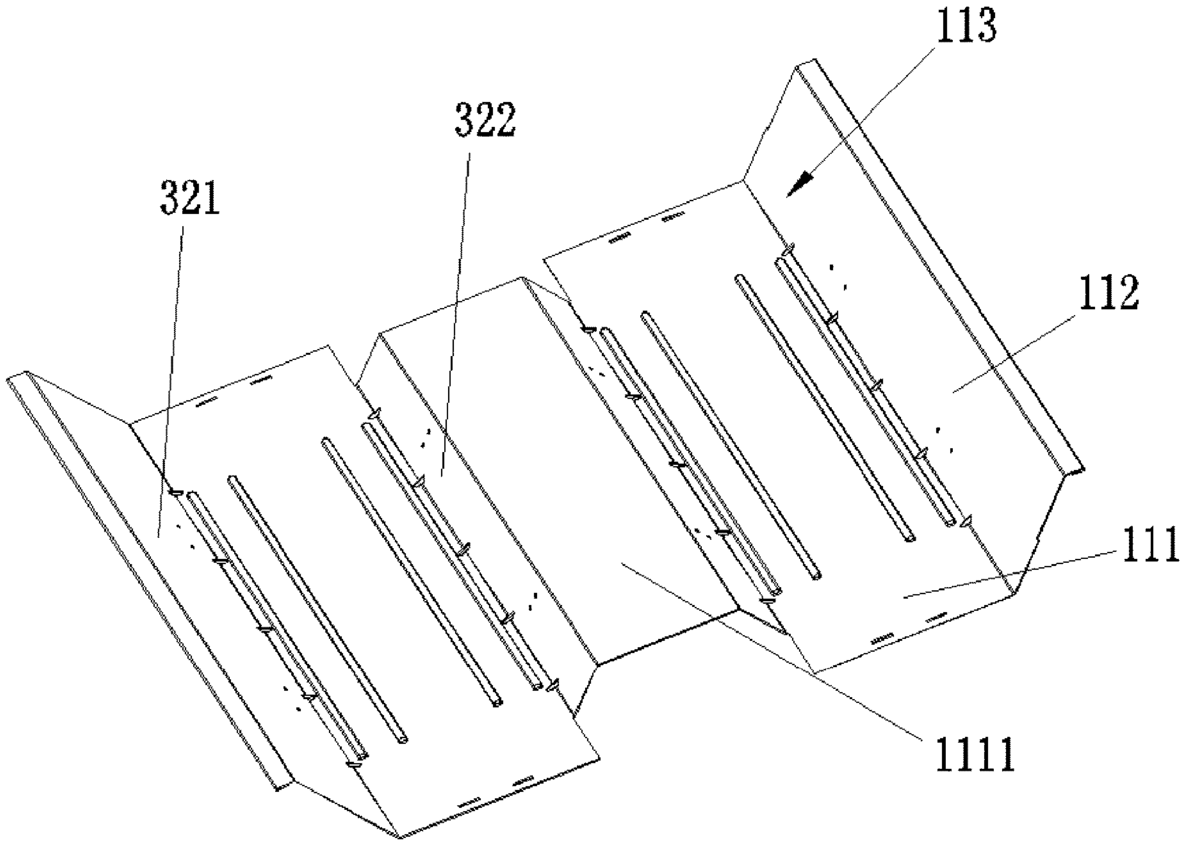
FIG. 10H is a stereoscopic structural schematic diagram I of a base of the LED illumination device according to the tenth embodiment of present invention.
Figure 10I:
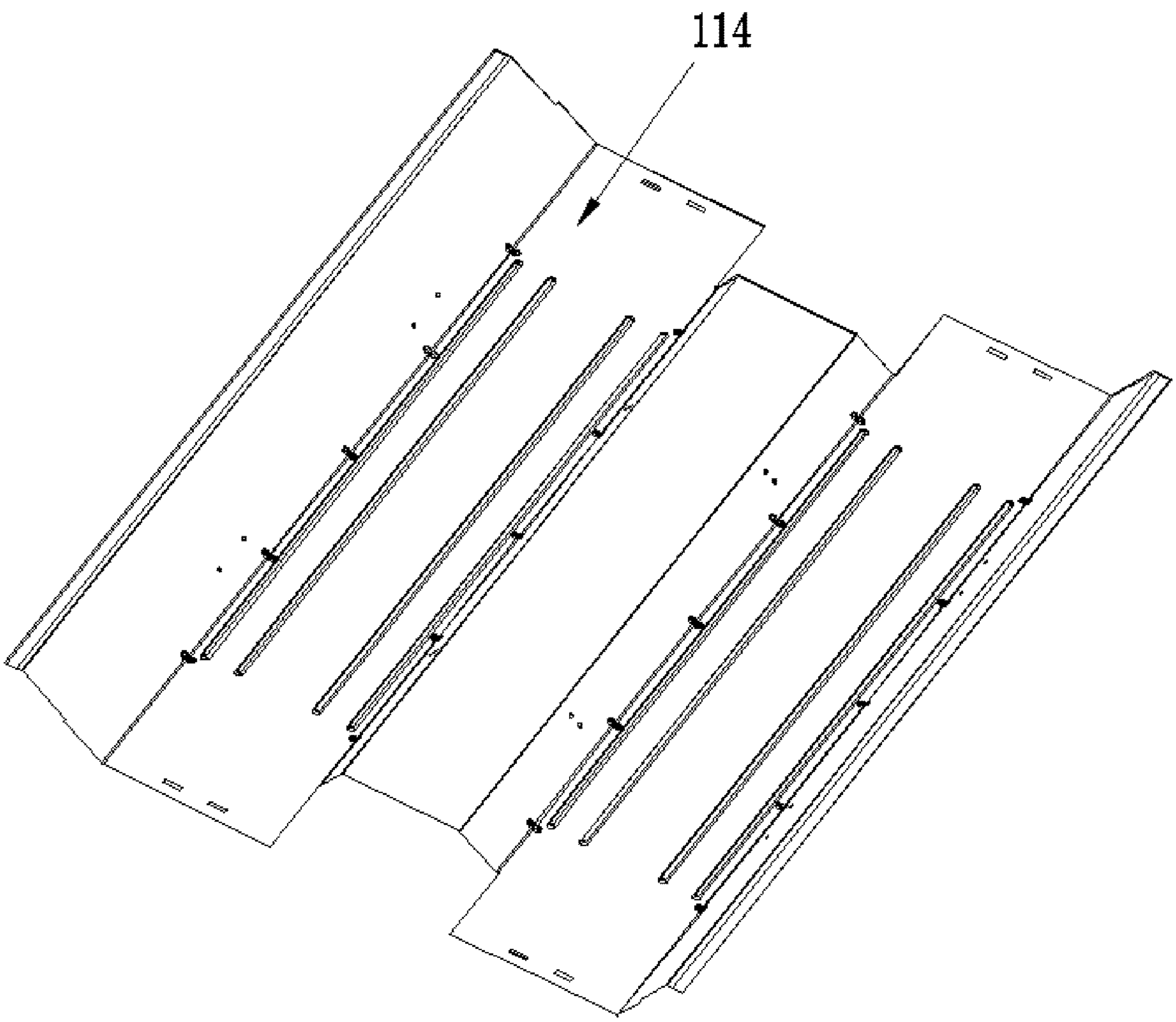
FIG. 10I is a stereoscopic structural schematic diagram II of the base of the LED illumination device according to the tenth embodiment of present invention.
Figure 10J:
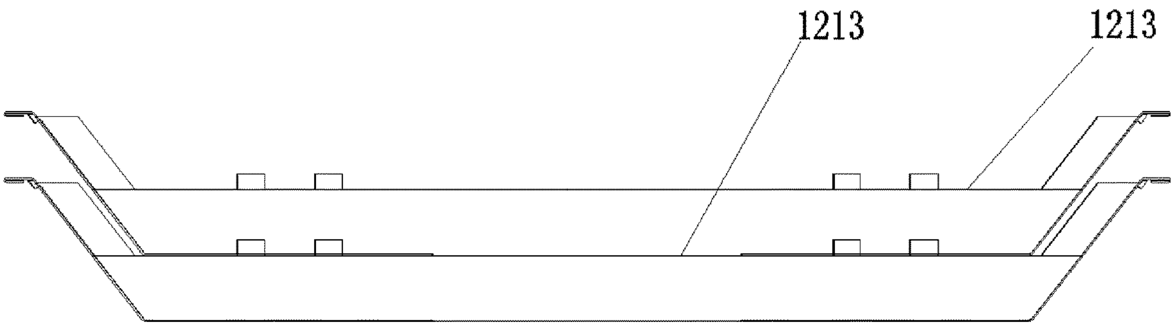
FIG. 10J is a diagram showing an overlapping state of the LED illumination device according to the tenth embodiment of present invention.
Figure 10K:
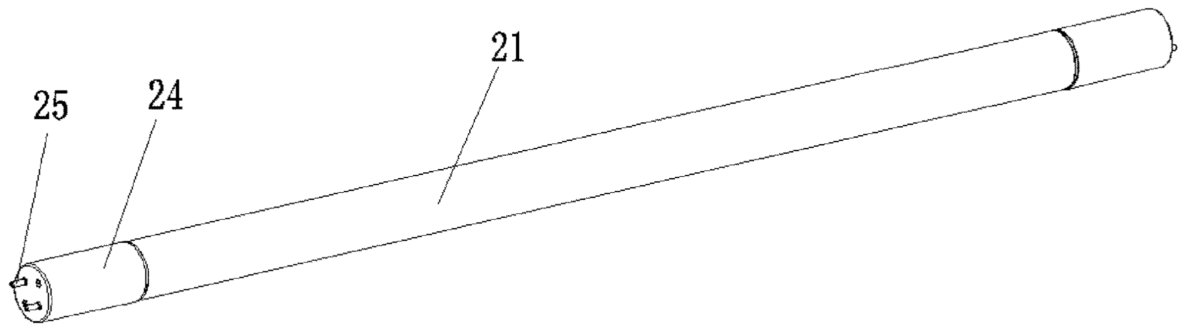
FIG. 10K is a stereoscopic schematic diagram of a light emitting unit according to the tenth embodiment of present invention.
Figure 10L:
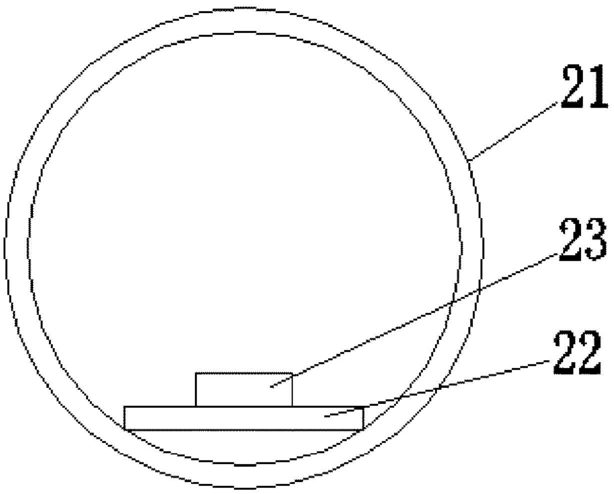
FIG. 10L is a schematic side view of the light emitting unit according to the tenth embodiment of present invention.
Figure 10M:
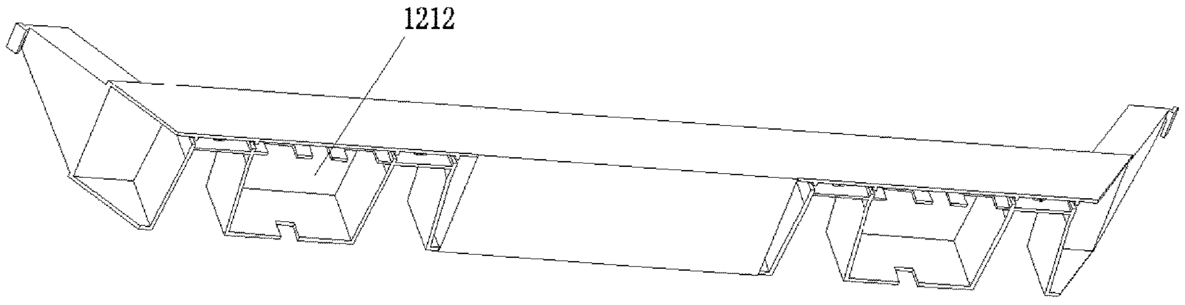
FIG. 10M is a stereoscopic schematic diagram I of a first member according to the tenth embodiment of present invention.
Figure 10N:
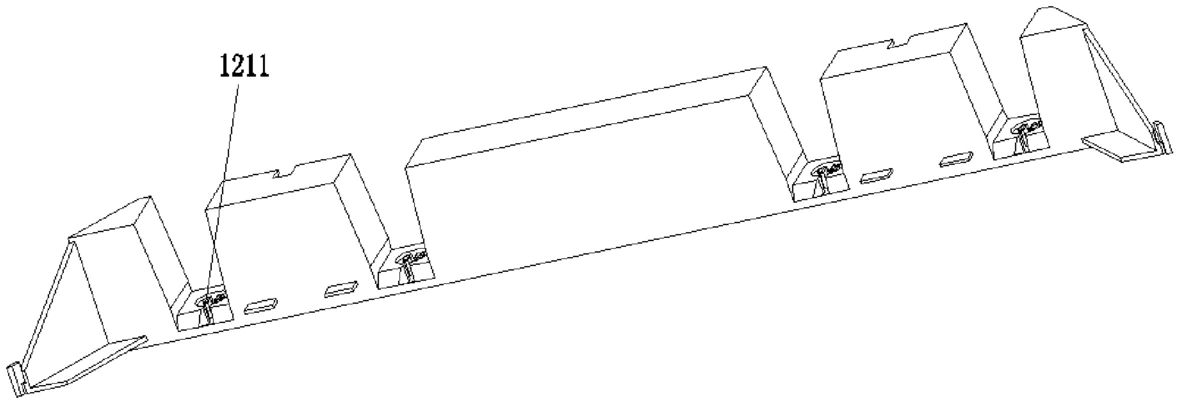
FIG. 10N is a stereoscopic schematic diagram II of the first member according to the tenth embodiment of present invention.

Referring to FIG. 10A to FIG. 10N, in an embodiment, the end cover 12 includes a first member 121, and the first member 121 is fixed to the base 11 and capable of limiting distortion of the base 11 in a second direction Y. In this embodiment, the first member 121 includes a mounting part

1211 (for example, a lamp holder). In this embodiment, the first member 121 may be fixed to the base 11 by means of clamping, buckling, insertion, or bolting.

In an embodiment, an accommodating cavity 1212 is defined inside the first member 121, and a power source 4 (not shown in any figure) may be disposed inside the accommodating cavity 1212. In this embodiment, the whole first member 121 does not exceed a space defined by the base 11 in a height direction of a lamp (or an LED illumination device). In some embodiments, if the first member 121 does not exceed a space defined by the base 11 by more than 3 mm in a height direction of a lamp (or an LED illumination device), it can be considered that the first member 121 does not exceed the space defined by the base 11 in the height direction of the lamp (or the LED illumination device). The power source 4 is disposed inside the first member 121 so that the power source 4 does not additionally increase a height of the lamp (or the LED illumination device), facilitating height control of the lamp (or the LED illumination device).

Figure 11A:
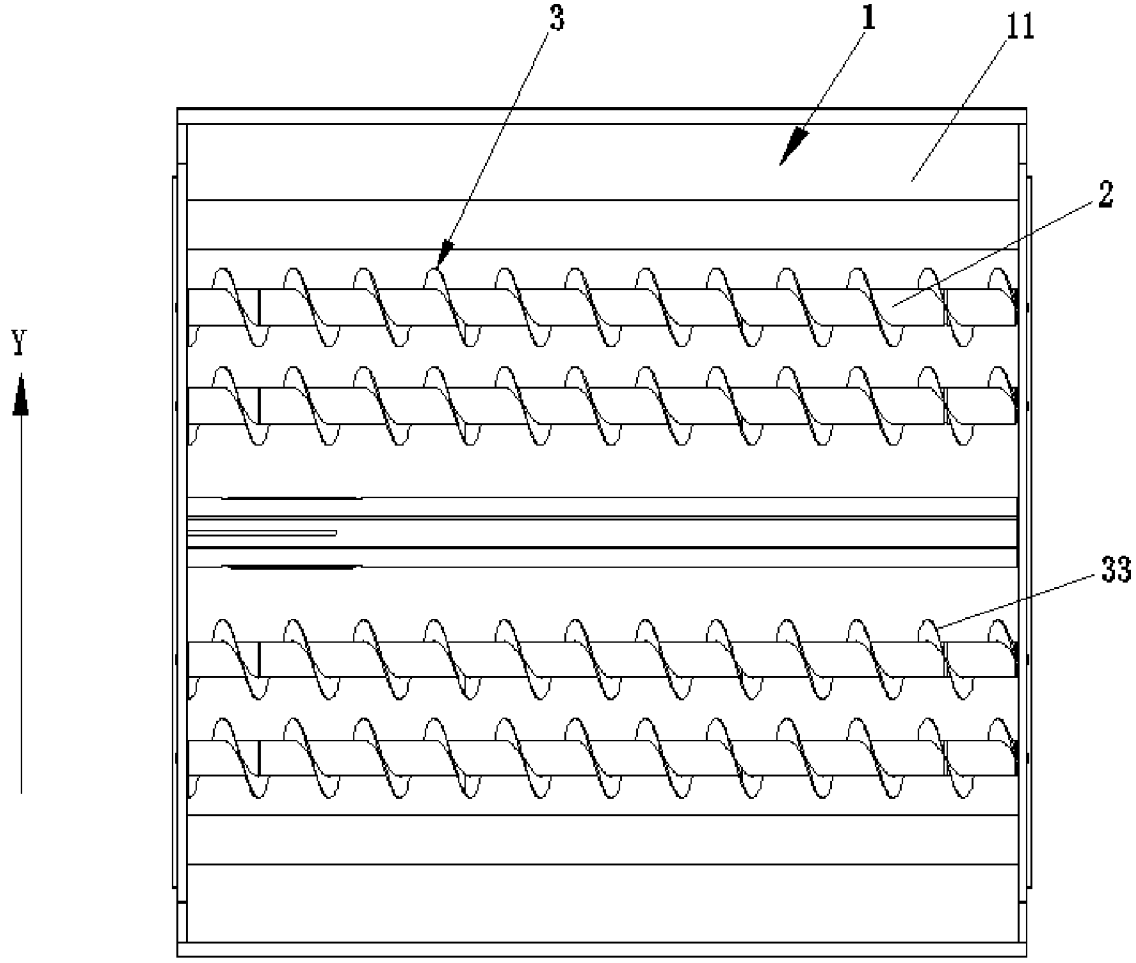
FIG. 11A is a schematic front view of an LED illumination device according to another embodiment of present invention.
Figure 11B:
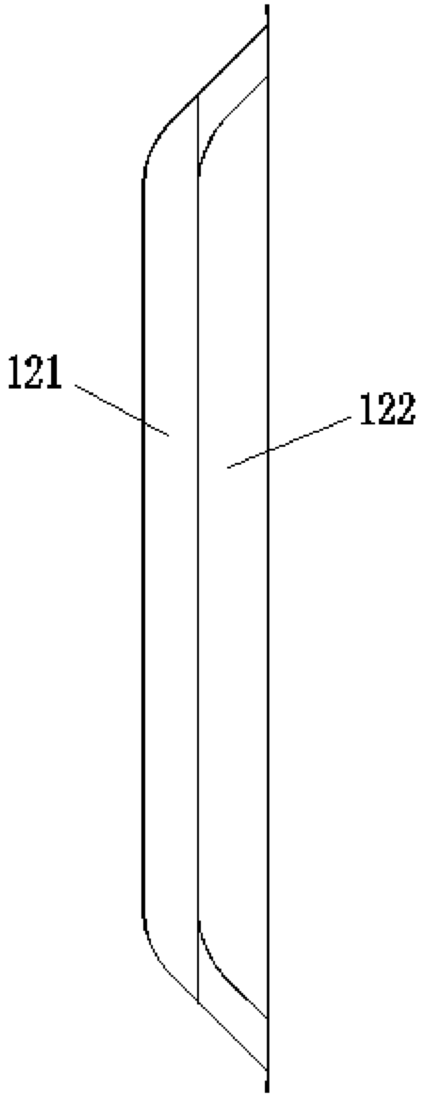
FIG. 11B is a schematic side view of the LED illumination device according to another embodiment of present invention.
Figure 11C:
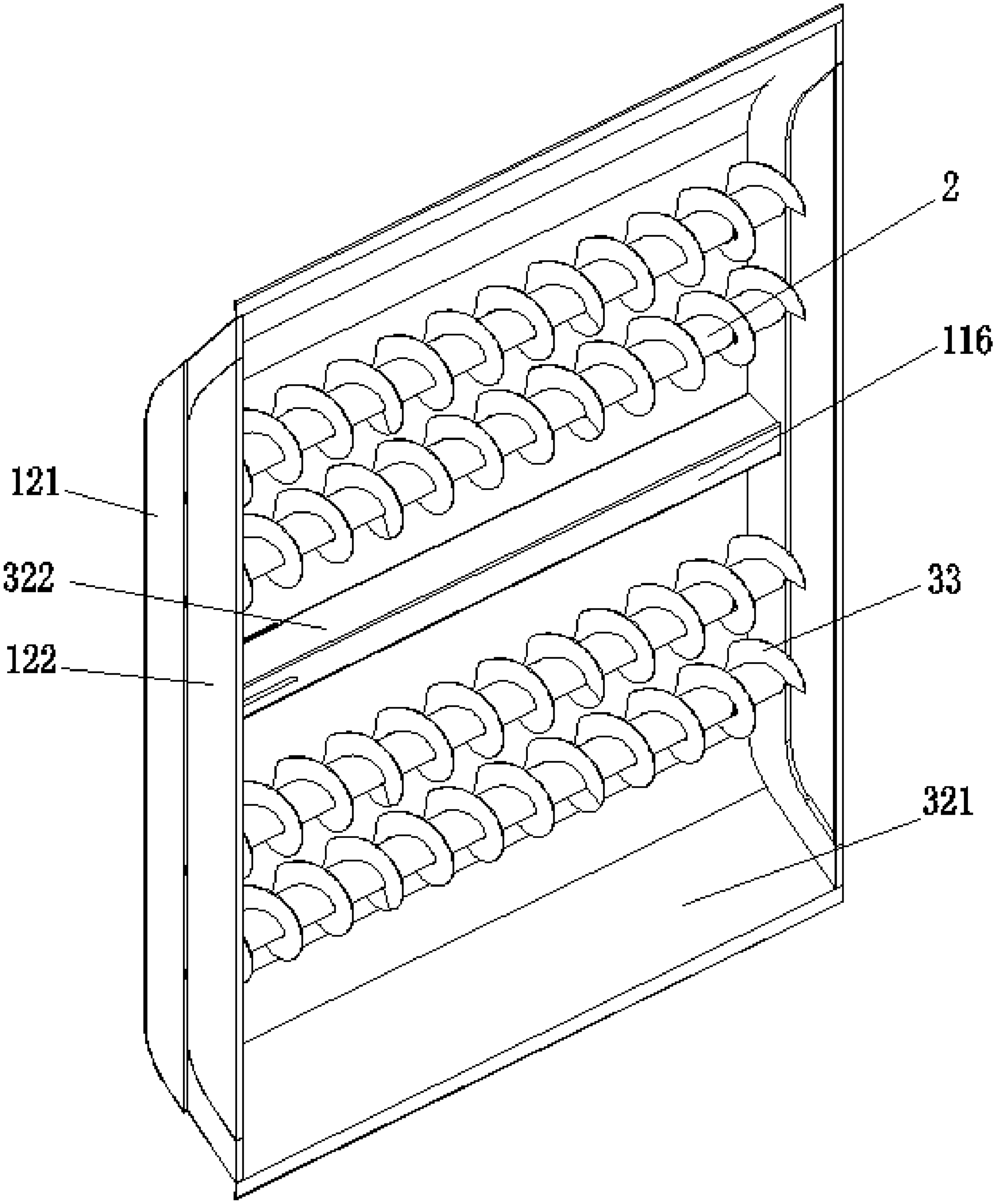
FIG. 11C is a stereoscopic schematic diagram of the LED illumination device according to another embodiment of present invention.

Referring to FIG. 11A to FIG. 11C, in another embodiment, the first member 121 may not include the above accommodating cavity 1212, and the first member 121 is only configured to install and fix the light emitting unit 2 and strengthen a structure of the base 11. In this embodiment, a bottom 111 of the base 11 is provided with a cover body 116, and an accommodating cavity is formed between the cover body 116 and the bottom 111 to accommodate a power source. In this embodiment, the cover body 116 is located inside the accommodating space of the base 11 without increasing the overall height space of the base 11. In this embodiment, wiring may be implemented inside the cover body 116. Therefore, no arrangement of a wire passing part is needed. In addition, a side wall of the cover body 116 is configured with a reflection function.

Referring to FIG. 10C to FIG. 10G, in an embodiment, the base 11 is provided with a wire passing part 115. The wire passing part 115 extends along the first direction X and is provided with a wire passing hole 1151 and a wire passing slot, and two ends of the wire passing hole 1151 or the wire passing slot correspond to accommodating cavities 1212 of first members 121 on two sides, respectively. The wire passing hole 1151 or the wire passing slot is used for wiring (for example, a wire or an FPC board), so as to connect electronic parts (such as a power source, a wiring terminal, and a wire led out of a lamp holder) inside the accommodating cavities 1212 of two first members 121. Hidden wiring can be realized by the wire passing part 115, so as to guarantee a good-looking appearance. The wire passing part 115 may be directly formed by means of bending at the bottom 111 of the base 11, and a wire passing slot is formed. Alternatively, an independent wire passing part 115 is fixed to the bottom 111 of the base 11. If the wire passing part 115 is an independent component, it can be fixed to the base 11 by means of adhesion, clamping, insertion, buckling, or bolting and the like. In other embodiments, a wire passing unit 5 may alternatively be disposed on another side, opposite to the light emitting unit 2, of the base 11. In other embodiments, when the wire is arranged along the back surface of the base 11 (arranged along the other side, opposite to the light emitting unit 2, of the base 11), the above wire passing unit may be omitted. However, when the wire is arranged along the back surface of the base 11, an overall height of the LED illumination device may be additionally increased.

Referring to FIG. 10C and FIG. 10J, the first member 121 includes an abutting surface 1213; when two lamps (or LED illumination devices) overlap, a back surface of bottom 111 of base 11 of one of the two lamps (or LED illumination devices) abut against the abutting surfaces 1213 of the other lamp (or LED illumination devices). In this embodiment, the abutting surfaces 1213 exceed the light emitting units 2 in a height direction of the light emitting units 2. Therefore, when the light emitting units 2 are installed on lamps and the lamps overlap, the abutting surfaces 1213 can protect the light emitting units 2, thereby preventing the other lamp from pressing the light emitting units 2. In this embodiment, a height of the LED illumination device is W. A height formed after two LED illumination devices overlap is smaller than 2 W, further, smaller than 1.8 W, 1.7 W, 1.6 W, or 1.5 W. Furthermore, the first member 121 is provided with a mounting part 1211, so that a height of the first member 121 needs to be ensured. Therefore, a height formed after two illumination devices overlap is larger than 1.3 W and smaller than 1.6 W.

Referring to FIG. 10C, in an embodiment, the end cover 12 further includes a second member 122. The second member 122 is detachably fixed to the first member 121 or the base 11 (when the lamps or LED illumination devices overlap, the second member 122 needs to be dismounted first). Specifically, the second member 122 is detachably fixed to the first member 121. The second member 122 is fixed to the first member 121 by means of clamping, buckling, and the like. The second member 122 is configured to be connected to a keel, to install the LED illumination device.

Referring to FIG. 10A and FIG. 10C, in an embodiment, the first member 121 is provided with a groove part 1214, and an end part of the light emitting unit 2 is located inside the groove part 1214. When the light emitting unit 2 has a standard length, the first member 121 being provided with the groove part 1214 can reduce a space of the LED illumination device occupied by the end cover 12 in the first direction X. Correspondingly, the second member 122 is provided with an open groove corresponding to the groove part 1214.

Referring to FIG. 11A to FIG. 11C, in another embodiment, the first member 121 does not include the above accommodating cavity 1212, and the first member 121 is only configured to install and fix the light emitting unit 2 and strengthen a structure of the base 11. The first member 121 has a small size itself in the first direction X, and therefore may be provided with no groove part 1214. Correspondingly, there is no need to form an open groove on the second member 122.

Referring to FIG. 10A and FIG. 11A, the LED illumination device in present invention may further includes an optical unit 3, and the optical unit 3 may be configured with a reflection, refraction, and/or scattering function, so as can provide any appropriate combination of reflection, refraction, and/or scattering. In addition, the optical unit 3 may also be configured to increase an outputted luminous flux.

Referring to FIG. 10A to FIG. 10C, in an embodiment, the optical unit 3 includes a panel 31. The panel 31 is disposed on the base 11, and the panel 31 does not exceed a range defined by the first member 121 in a height direction of the base 11. Further, the panel 31 does not exceed the abutting surface 1213 of the first member 121 in the height direction of the base 11. When the panel 31 is installed on a lamp and the lamps overlap, the abutting surface 1213 can protect the panel 31, thereby preventing another lamp from pressing the panel 31.

The panel 31 can be in open state or closed state. When the panel is in open state, the light emitting unit 2 is exposed outside. In this case, the light emitting unit 2 can be dismounted. When the panel is in closed state, the panel covers the light emitting unit 2 and provides optical treatment for light emitted from the light emitting unit 2. In this embodiment, the panel 31 may be configured with a light diffusion function to achieve more uniform light output, thereby improving light output efficiency and reducing glare.

Referring to FIG. 10A to FIG. 10F, the panel 31 is disposed on the base 11 through a connection unit 5. Specifically, the connection unit 5 includes a hinge 51 and a fixing unit 52. The panel 31 is rotationally connected to the base 11 with respect to the base 11 by using the hinge 51. The fixing unit 52 includes an elastic arm 521 and a buckling part 522, and the elastic arm 521 realizes a position change of the buckling part 522 by elastic deformation of the elastic arm, thereby fixing or releasing the panel.

The buckling part 522 is provided with a support part 5221. When the panel 31 is in closed state, an edge of one side of the panel is supported on the support part 5221. In this embodiment, the fixing unit 52 further includes an actuating part 523. When the panel is in closed state, the actuating part 523 is located on an outer side of the panel 31, and can control the fixing unit 52 to release the panel 31. In this embodiment, the fixing unit 52 is integrally formed by an elastic sheet.

The actuating part 523 includes a transition part 5231. When the panel 31 is switched from open state to closed state, a force is applied to the panel 31, the panel 31 is pushed to the transition part 5231. When a force is further applied, the panel 31 forces the fixing unit 52 to have elastic deformation, and finally reaches a closing position through the buckling part 522. In this process, the actuating part 523 is not operated, so as to make the operation simpler.

Referring to FIG. 10A to FIG. 10C, and FIG. 11A to FIG. 11C, the optical unit 3 in present invention may further include a reflection part 32, and the reflection part 32 is disposed on one side or two sides of the light emitting unit 2 in a second direction Y of the LED illumination device. The reflection part 32 includes a first reflection part 321. In an embodiment, the first reflection part 321 is formed on an inner surface of a side part 112 of the base 11. The reflection part 32 may further include a second reflection part 322. In an embodiment, the second reflection part 322 is formed at a bottom 111 of the base 11. Specifically, the bottom of the base 11 is bent to form a bent part 1111, and the second reflection part 322 is formed on the bent part 1111. An accommodating groove 1112 is formed in one side of the bent part 1111. Components such as the power source 4, the wiring terminal, or the wire may be disposed in the accommodating groove 1112, such that these components will not increase additional height space of the LED illumination device. In other embodiments, the second reflection part 322 may be formed on a wire passing part 115. Referring to FIG. 11A to FIG. 11C, in another embodiment, the second reflection part 322 is formed on a cover body 116.

Referring to FIG. 11A to FIG. 11C, in still another embodiment, the optical unit 3 may include an optical member 33, and the optical member 33 is disposed on the light emitting unit 2 and shields light, thereby reducing a glare rating of the LED illumination device.

Specifically, the optical member 33 is a helical sheet and is helically wound on an outer circumference of a lamp tube 21 of the light emitting unit 2. The surface of the optical member 33 is configured with a reflection function. Two ends of the optical member 33 may be connected to the end covers 12 on the two sides, respectively.

The optical member 33 is made of a flexible material, such that the helical sheet is stretchable or foldable. Therefore, the optical member 33 can be folded when not used, so as to reduce a space occupied for storage. During installation of the light emitting unit 2, the optical member 33 sleeves the light emitting unit 2. When the light emitting unit 2 is installed on a lamp, two ends of the optical member 33 are fixed to the end covers 12 on the two sides, respectively.

Figure 12A:
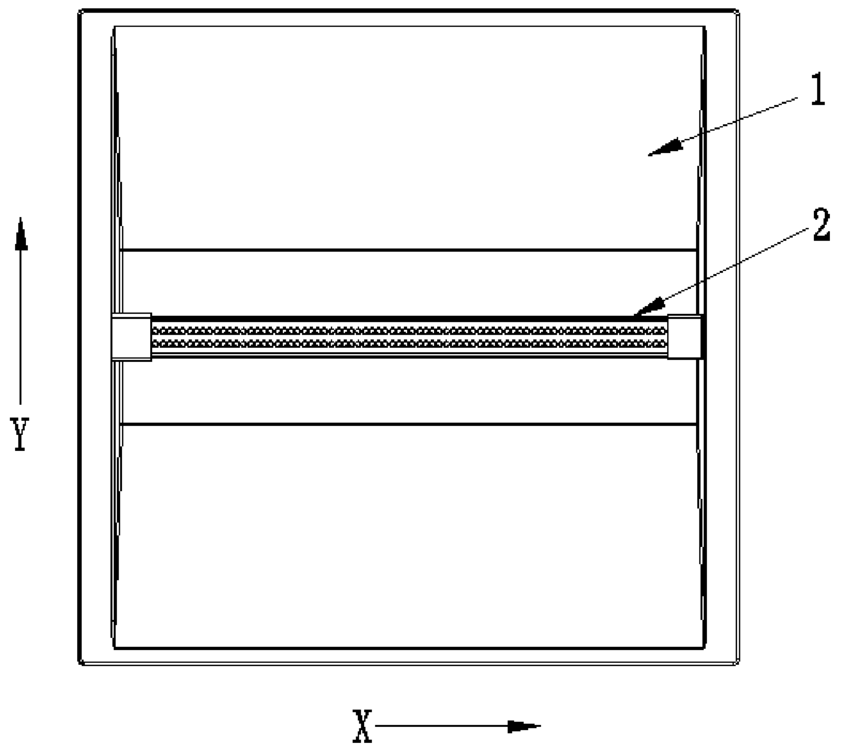
FIG. 12A is a schematic front view of an LED lamp according to an eleventh example of the present disclosure.
Figure 12B:
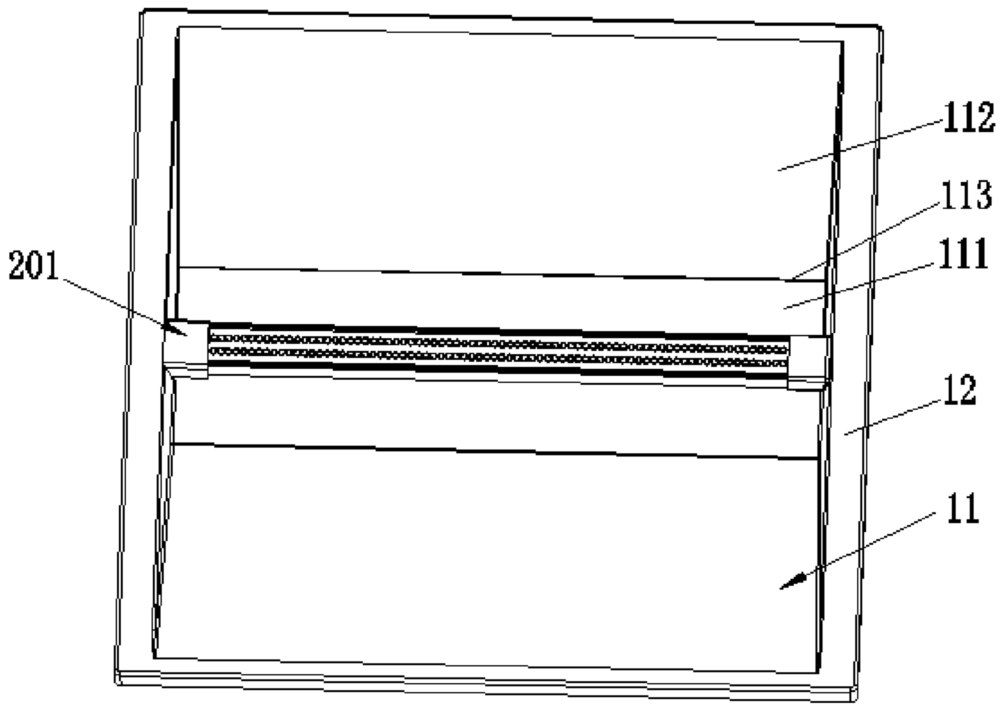
FIG. 12B is a stereoscopic schematic diagram I of the LED lamp according to the eleventh embodiment of present invention.
Figure 12C:
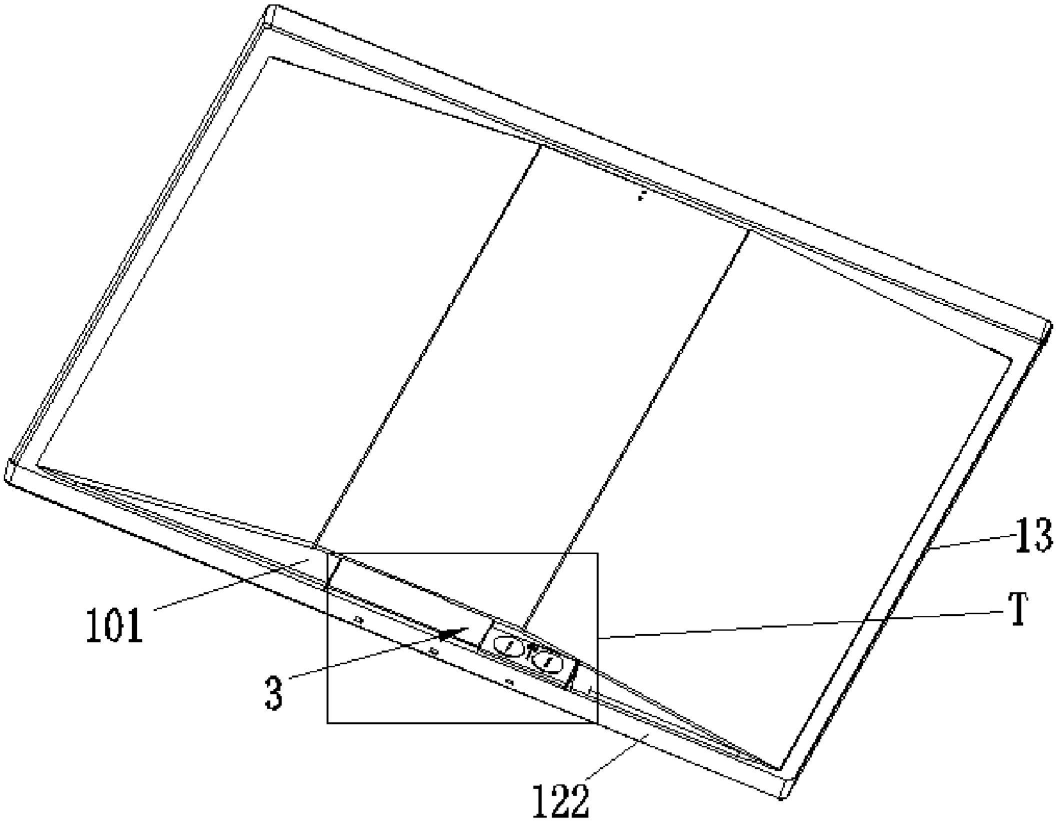
FIG. 12C is a stereoscopic schematic diagram II of the LED lamp according to the eleventh embodiment of present invention.
Figure 12D:
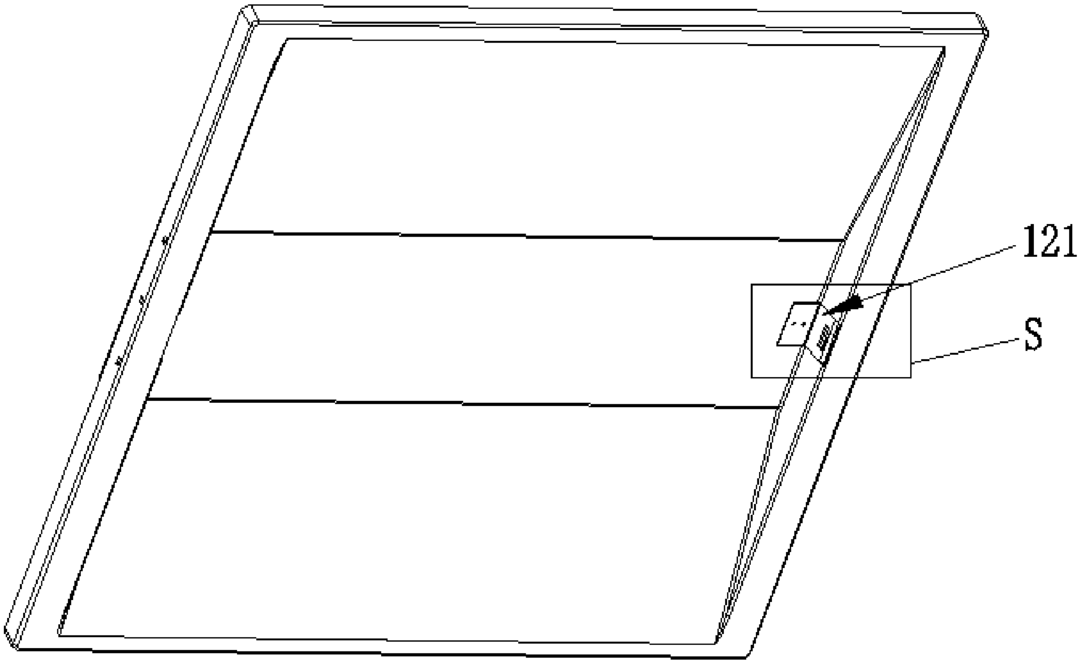
FIG. 12D is a stereoscopic structural schematic diagram I of an LED lamp with a photoelectric module removed.
Figure 12E:
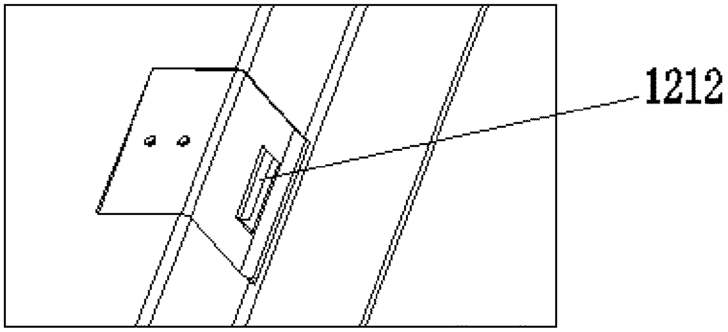
FIG. 12E is an enlarged view of a location S in FIG. 12C.
Figure 12F:
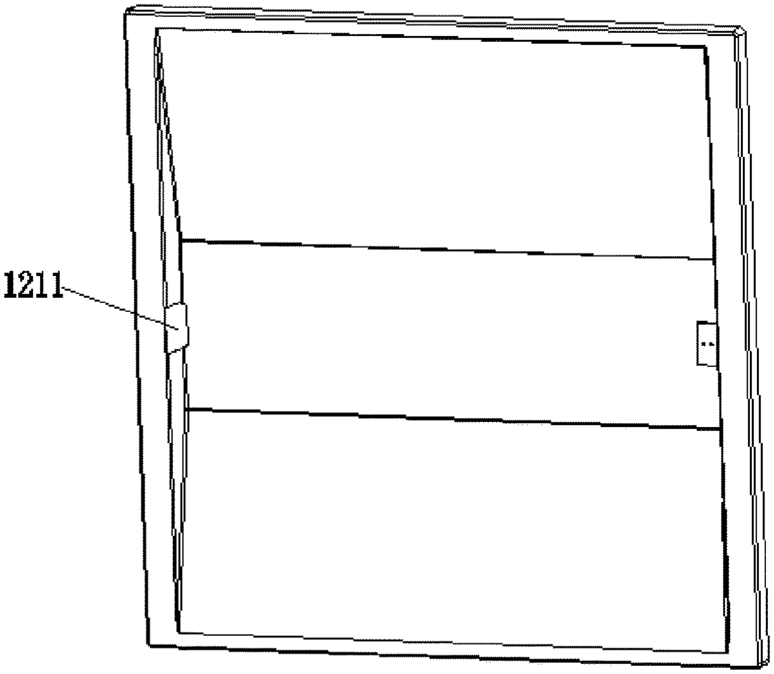
FIG. 12F is a stereoscopic structural schematic diagram II of an LED lamp with a photoelectric module removed.
Figure 12G:
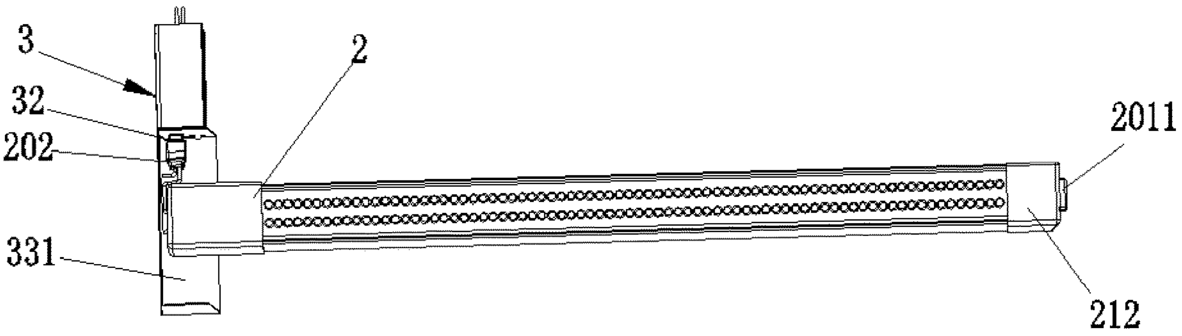
FIG. 12G is a stereoscopic structural schematic diagram showing fitting of a photoelectric module and a wiring unit.
Figure 12H:
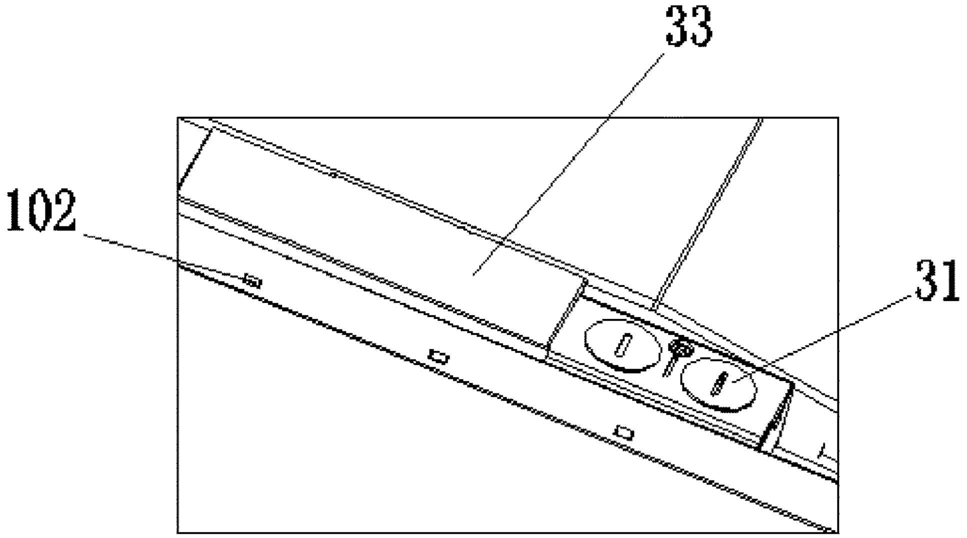
FIG. 12H is an enlarged view of a location Tin FIG. 12C.
Figure 12I:
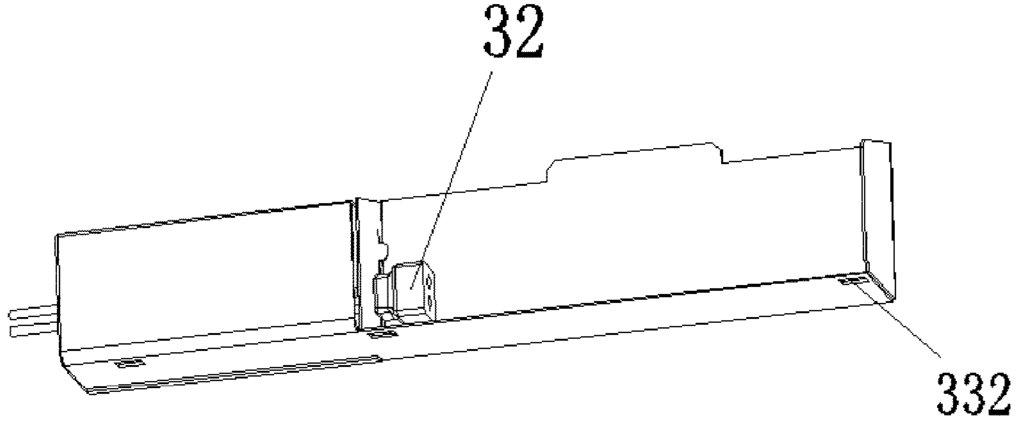
FIG. 12I is a stereoscopic structural schematic diagram of a wiring unit.
Figure 12J:
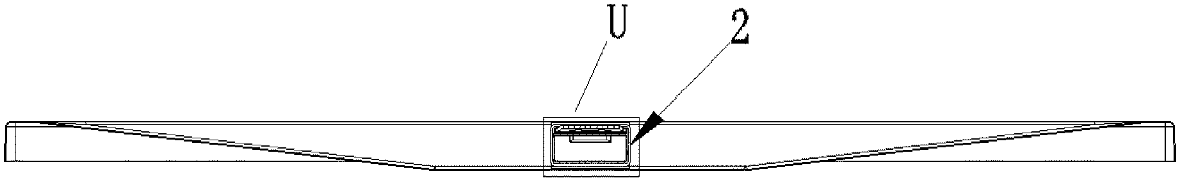
FIG. 12J is a structural schematic cross-sectional view of an LED lamp according to an embodiment of present invention.
Figure 12K:
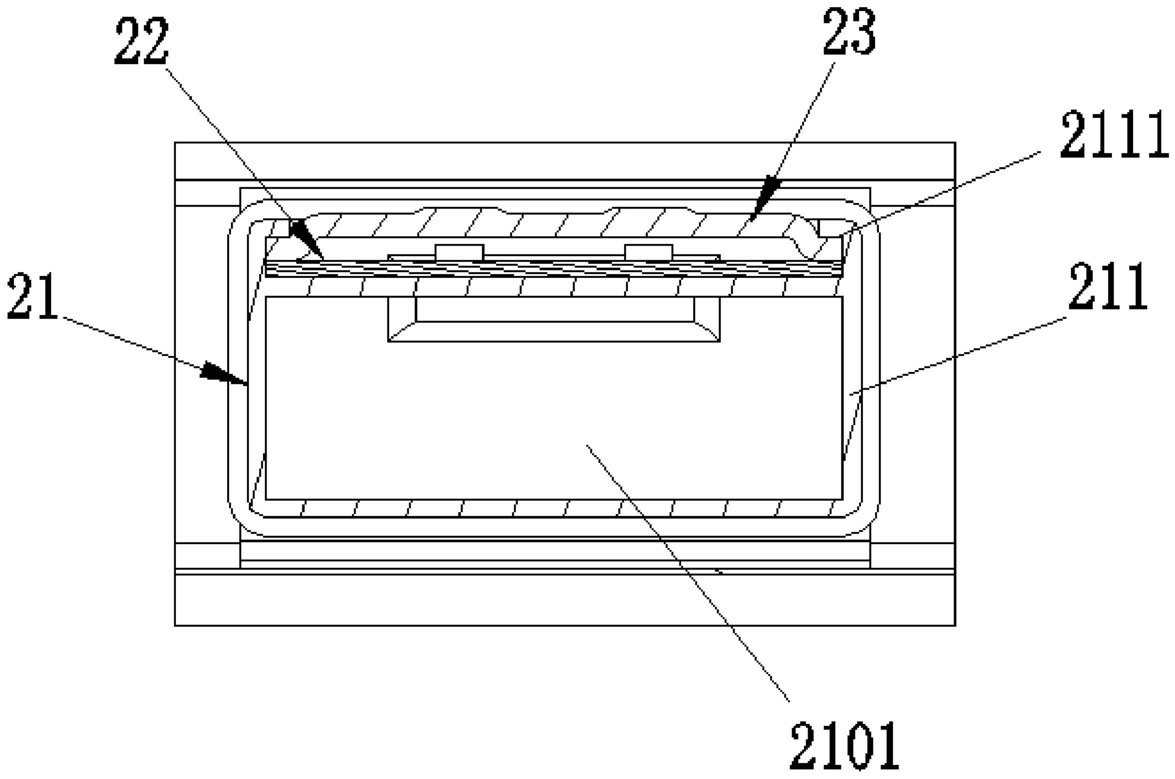
FIG. 12K is an enlarged view of a location U in FIG. 12J.
Figure 12L:
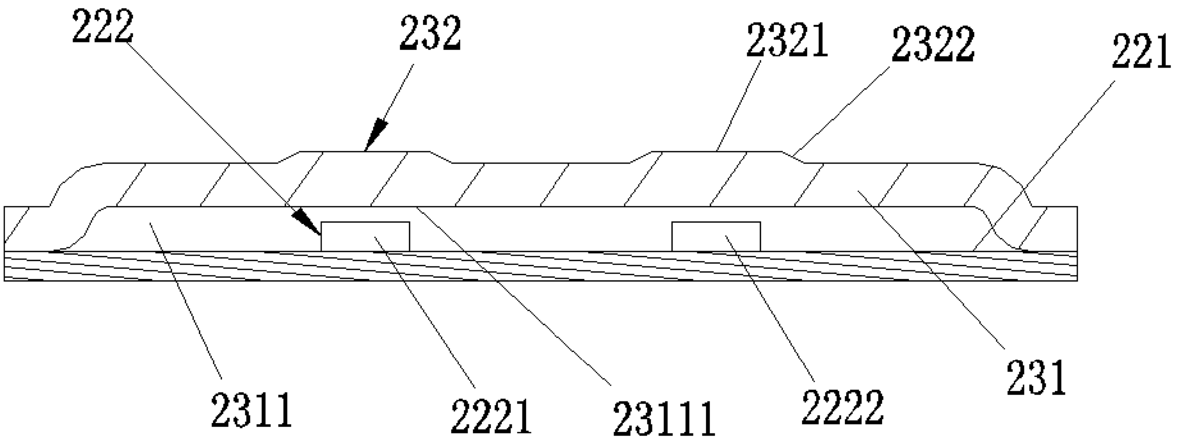
FIG. 12L is a schematic diagram showing fitting of a light emitting unit and an optical member.

As shown in FIG. 12A to FIG. 12C, an eleventh embodiment of present invention provides an LED lamp, and the LED lamp is a linear lamp. For example, the LED lamp may be a suspended linear illumination lamp. The LED lamp includes a bearing unit 1, a photoelectric module 2, and a wiring unit 3. The photoelectric module 2 is replaceably (detachably) connected to the bearing unit 1, such that the photoelectric module 2 of the LED lamp can be replaced. If the photoelectric module 2 is damaged, the photoelectric module 2 can be replaced. Compared with replacement of a whole lamp, the replacement of the photoelectric module can reduce a replacement cost. The wiring unit 3 is fixed to the bearing unit 1 so as to be connected to an external power source or a mains supply.

In this embodiment, the bearing unit 1 has a front surface and a back surface, one side where the photoelectric module 2 is disposed is defined as the front surface, the other side is defined as the back surface, and the wiring unit 3 is disposed at the back surface of the bearing unit 1. In this embodiment, the photoelectric module 2 does not exceed a range defined by the bearing unit 1 in a thickness direction of the LED lamp. In other words, the photoelectric module will not increase an extra thickness size.

In this embodiment, the bearing unit 1 includes a main body part 11 and an end part 12, the photoelectric module 2 extends along a length direction (the first direction X) of the main body part 11, and two ends of the photoelectric module 2 are structurally connected through the end cover 12. In this embodiment, the main body part 11 may be configured with a heat dissipation function, an optical function, or the like, or may provide a structural strength, a mounting space, or the like.

Specifically, the main body part 11 in this embodiment is provided with a mounting surface 111. The mounting surface 111 is a plane or an approximate plane. The photoelectric module 2 may be installed on or fixed to the mounting surface 111, or the photoelectric module 2 is at least partially attached to the mounting surface 111. The main body part 11 is provided with a wing part 112 on one side or two sides of the mounting surface 111 in a second direction Y. The wing part 112 is connected to the mounting surface 111 by a bending part 113. By the bending part 113, the wing part 112 and the mounting surface 111 extend on different surfaces, so as to improve the structural strength. In this case, the bending part 113 acts as a reinforcing rib. The wing part 112 may be configured as a plane. In this way, the wing part 112 and the mounting surface 11 may form an included angle, and the included angle is from 160 degrees to 175 degrees.

As shown in FIG. 12A to FIG. 12G, in this embodiment, the end cover 12 and the main body part 11 form an integrated structure. For example, a metal sheet is machined to directly form a structure of the end part 12 and the main body part 11. In other words, the bearing unit 1 is made of a metal material, so as to provide desirable structural strength and heat dissipation performance. The end cover 12 is provided with a first positioning unit 121, and an end part of the photoelectric module 2 is provided with a second positioning unit 201 matching with the first positioning unit 121. By matching of the first positioning unit 121 and the second positioning unit 201, the photoelectric module 2 cam be detachably installed.

In this embodiment, the first positioning unit 121 includes a hole 1211 and an inserting hole 1212. The second positioning unit 201 includes a buckling part 2011. One end of the photoelectric module 2 is directly clamped into the hole 1211, and the buckling part 2011 at the other end (one end provided with the second positioning unit 201) is directly buckled into the inserting hole 1212 for fixation. In other embodiment, the first positioning unit 121 and the second positioning unit 201 may achieve their functions by adopting other structures in the prior art, such as a buckling structure, a threaded connection structure, and a bolt structure.

As shown in FIG. 12A to FIG. 12C, in this embodiment, a peripheral portion of the end cover 12 is bent toward the back surface of the bearing unit 1 to form a first reinforcing member 122. A peripheral portion of the main body part 11 is bent toward the back surface of the bearing unit 1 to form a second reinforcing member 13. The first reinforcing member 122 is connected to the second reinforcing member 13, such that the first reinforcing member 122 and the second reinforcing member 13 integrally form a ring-shaped structure, thereby enhancing the structural strength.

In this embodiment, an accommodating space 101 is formed between the first reinforcing member 122 of the end cover 12 and the main body part 1 in order to install a wiring unit 3.

As shown in FIG. 12A to FIG. 12J, in this embodiment, at least one end of the photoelectric module 2 enters the accommodating space 101 and is electrically connected to the wiring unit 3. In this embodiment, the wiring unit 3 includes a wiring part 31, a first wiring terminal 32 and a junction box 33, the wiring part 31 is disposed on the junction box 33, the junction box 33 is fixed to the bearing unit 1, and the first wiring terminal 32 is disposed inside the junction box 33. A second wiring terminal 202 is disposed at one end of the photoelectric module 2. When the first wiring terminal 32 and the second wiring terminal 202 are in abutting joint, the photoelectric module 2 and the wiring unit 3 are electrically connected. One end, located inside the accommodating space 101, of the photoelectric module 2 is shielded by the junction box 33, such that the photoelectric module 2 is not exposed. Specifically, the junction box 33 includes an accommodating cavity 331. The accommodating cavity 333 is open facing one side of an end part of the photoelectric module 2, such that the end part of the photoelectric module 2 enters the accommodating cavity 333. The above first wiring terminal 32 and second wiring terminal 202 are both disposed in the accommodating cavity 331.

The junction box 33 may be fixed to the bearing unit 1 by means of adhesion, clamping, buckling, bolting, and the like. In this embodiment, the junction box 33 is provided with a plurality of buckling holes 332, while the bearing unit 1 is provided with a plurality of buckling parts 102 matching with the buckling holes 332 so as to realize buckling. The buckling parts 102 are integrally formed on the first reinforcing member 122.

As shown in FIG. 12G, and FIG. 12J to FIG. 12L, the photoelectric module 2 in this embodiment includes a support unit 21, a light emitting unit 22, an optical member 23 and a power source module, and the support unit 21 includes a support base 211 and end covers 212 that are disposed on two ends of the support base 211. A mounting cavity 2101 may be formed in the support unit 21 and is configured to accommodate the power source module. The mounting cavity 2101 can be formed in the end cover 212 or in the support base 211, or formed by the end cover 212 and the support base 211 together. The second positioning unit 201 in this example is formed on the end cover 212.

The light emitting unit 22 in this embodiment includes a substrate 221 and a light emitter 222, the light emitter 222 is fixed to the substrate 221, and the light emitter 222 may be an LED light bead. The substrate 221 is attached to a surface of the support base 211. For example, the substrate 221 is adhered to the surface of the support base 211 by using an adhesive, or the surface of the support base 211 is provided with a mounting structure, so that the substrate 221 is attached to the surface of the support base 211 by means of clamping, buckling, threaded connection, magnetic suction, and the like.

In this embodiment, the light emitter 222 is provided with a first light emitter 2221 and a second light emitter 2222, and the first light emitter 2221 and the second light emitter 2222 may be configured to emit light with different wavelengths, so as to provide a basis for dimming and color matching of an LED lamp. For example, after being turned on, the first light emitter 2221 emits light with a main wavelength from 435 nm to 470 nm. After being turned on, the second light emitter 2222 emits light with a main wavelength from 590 nm to 640 nm.

In this embodiment, the optical member 23 covers the light emitting unit 22, and the optical member 23 is fixed to the support unit 21. In this embodiment, the optical member 23, approximately, covers only the substrate 221 without additionally covering an area of the bearing unit 1. For example, an area, covered by the optical member 23, of the front surface of the bearing unit 1 accounts for not more than 20% of a total area of the front surface of the bearing unit 1. In this embodiment, the area of the front surface of the bearing unit 1 refers to a projection area perpendicular to a direction of the substrate 221. Specifically, the area of the front surface of the bearing unit 1 is a product of a length and a width of the bearing unit 1. The area, covered by the optical member 23, of the front surface of the bearing unit 1 refers to an area occupied by projection of the optical member 23 on the bearing unit 1. Actually, the area is a product of a length and a width of the optical member 23. In this embodiment, the optical member 23 covers the substrate 221 and does not cover too much area of the front surface of the bearing unit 1, and a ratio of a width of the optical member 23 to a width of the substrate 221 is set to be 1 to 2. Further, the ratio of the width of the optical member 23 to the width of the substrate 221 is set to be 1 to 1.3.

In this embodiment, the optical member 23 includes a first light distribution unit 231 and a second light distribution unit 232. In this embodiment, the first light distribution unit 231 is configured in a strip shape and provided with an accommodating groove 2311 along a length direction of the first light distribution unit 231, and at least a part in a height direction of the light emitting unit 22 is located in the accommodating groove 2311. The second light distribution unit 232 is disposed on a surface of the first light distribution unit 231, and the second light distribution unit 232 and the accommodating groove 2311 are respectively located on two opposite sides of the first light distribution unit 231 in a height direction of the optical member 23. The light emitter 222 of the light emitting unit 22 and the second light distribution unit 232 are arranged correspondingly. Specifically, the light emitters 222 (the first light emitter 2221 and the second light emitter 2222) and the second light distribution unit 3002 are arranged in one-to-one correspondence.

Further, the light emitter 222 of the light emitting unit 22 is completely accommodated in the accommodating groove 2311. In this embodiment, a distance from a surface of the light emitter 22 to a bottom surface of the accommodating groove 2311 (a surface where the accommodating groove 2311 corresponds to the light emitter 222) is A (A is equal to or greater than 0), a distance from the surface of the light emitter 222 to the second light distribution unit 3002 is B, and a relationship of A and B satisfies the following condition: a ratio of A to B is greater than 0.05 and less than 0.25. Further, the relationship of A and B satisfies the following condition: the ratio of A to B is greater than 0.1 and less than 0.2. When A and B satisfy the above relationship, light emitted by the light emitter 222 can be controlled to mostly or completely correspond to the second light distribution unit 232. In other words, without considering reflection of light generated by the light emitter 222 on an interface, the light generated by the light emitter 222 will be completely projected to the second light distribution unit 232, and is subjected to optical treatment by the second light distribution unit 232.

In this embodiment, the support base 211 is provided with a clamping slot 2111. The substrates 221 of the optical member 23 and the light emitting unit 22 are both clamped into the clamping slot 2111 to be fixed.

In this embodiment, at least 70% of a luminous flux generated by the light emitter 222 is directly emitted from the LED lamp through the second light distribution unit 232. The remaining luminous flux is emitted from the first light distribution unit 231. Further, at least 80% of the luminous flux generated by the light emitter 222 is directly emitted from the LED lamp through the second light distribution unit 232. Furthermore, at least 90% of the luminous flux generated by the light emitter 222 is directly emitted from the LED lamp through the second light distribution unit 232.

In this embodiment, the bottom surface of the accommodating groove 2311 is provided with a light input part 23111. At least a part of light generated by the light emitter 222 (for example, at least 80% of the luminous flux generated by the light emitter 222, or at least 90% of the luminous flux generated by the light emitter 222) enters the optical member 23 via the light input part 23111 and enters the second light distribution unit 232. In an embodiment, without considering reflection at the light input part 23111, the luminous flux generated by the light emitter 222 completely enters the light input part 23111. In other words, a light output area of the light emitter 222 totally corresponds to the inside of the light input part 23111, thereby improving a light output efficiency (light output efficiency and light output shape). In this embodiment, the second light distribution part 232 includes a first light output part 2321 and a second light output part 2322. An illuminance ratio of a surface of the first light output part 231 to a surface of the second light output part 232 is greater than 0.3, 0.4, 0.5, 0.6, 0.7, 0.8 or 0.9, and less than 2, 1.9, 1.8, 1.7, 1.6 or 1.5, thereby achieving more uniform light output in a light output region of the LED lamp. In this embodiment, the first light output part 2321 includes a plane or an approximate plane. The second light output part 2322 includes a conical surface or an approximately conical surface. The second light output part 2322 is disposed around the first light output part 2321.

The second light output part 2322 in this embodiment has a contour line, and the contour line revolves 360 degrees along a central axis of the second light distribution part 232 to form an outer contour of the second light output part 2322. In this embodiment, an absolute value of a slope of the contour line of the outer contour of the conical surface of the second light output part 2322 ranges from 0.3 to 0.6. Further, the absolute value of the slope of the outer contour of the conical surface of the second light output part 2322 ranges from 0.4 to 0.5. The second light output part 2322 has a function of adjusting the light shape. When the absolute value of the slope of the contour line of the outer contour of the conical surface of the second light output part 2322 is within the above interval, a better light output efficiency (a light output angle and light output shape) can be achieved. In this embodiment, the slope of the contour line of the outer contour of the conical surface of the second light output part 2322 is calculated based on an arrangement shown in FIG. 12L. That is, the optical member 23 is located above the light emitting unit 22.

According to the LED lamp in this embodiment, in a light output path, at least 80%, 85%, or 90% of a luminous flux generated by the light emitter 222 in operation is directly emitted from the LED lamp through the second light distribution unit 232 (this part of light is not reflected by the bearing unit 1 after passing through the second light distribution unit 232, thereby reducing possible light loss during reflection), so that light output efficiency can be improved. In this embodiment, a part (less than 20%, 15%, or 10% of a total luminous flux) of the light generated by the light emitter 222 is emitted to the bearing unit 1 through the first light distribution unit 231, and is directly emitted from the LED lamp by reflection of the bearing unit 1, without being outputted by using a light transmitting plate or a diffusion plate and the like in the prior art. Generally, for the light emitted from the LED lamp in this embodiment, the light emitted out by reflection of the bearing unit 1 is less than the light emitted from the second light distribution unit 232. By reducing the light outputted by reflection, light loss can be reduced, and light output efficiency is improved. In this embodiment, light outputted by reflection of the bearing unit 1 may be controlled to be 10% or less of a total luminous flux of the outputted light, while 90% or more of the outputted light is directly outputted without reflection, thereby reducing light loss caused by reflection.

In other embodiment, the second light distribution unit 232 may be a spherical structure or a polygonal prism structure.

Figure 12M:
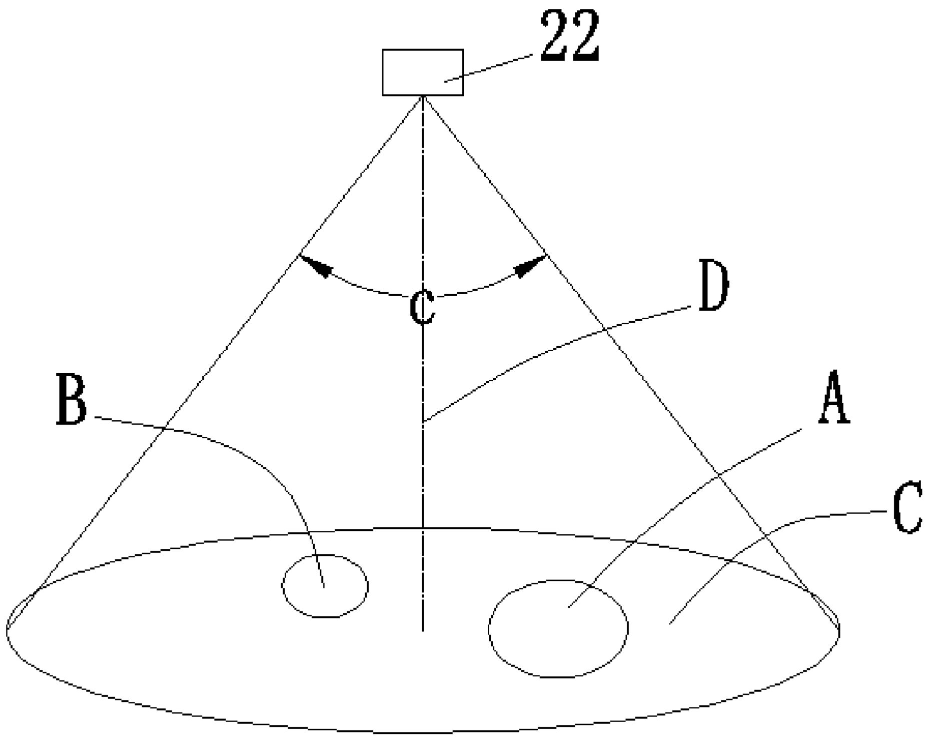
FIG. 12M is a schematic diagram I showing light output of a light emitting unit of an LED lamp.

As shown in FIG. 12M, in this embodiment, in order to control the light output uniformity of the LED lamp, a ratio of an illuminance of the light emitted from the LED lamp when the light emitting unit 22 is turned on within a range of a first area A to an average illuminance within a range of a second area B is greater than 0.3, 0.4, 0.5, 0.6, 0.7, 0.8 or 0.9, and less than 2. Preferably, the ratio of the illuminance within the range of a first area A to the average illuminance within the range of a second area B is greater than 0.5 and less than 1.5. The first area A and the second area B are located on a same plane. In addition, the first area A and the second area B are both located in a third area C (the third area C, the first area A and the second area B are located on a same plane), while a light beam angle c corresponding to the third area C is 90 degrees, 80 degrees, 60 degrees, or 50 degrees. In this embodiment, the light beam angle c may be smaller than the light emission angle of the LED lamp. In this embodiment, the light output uniformity is measured based on an illuminance difference within a range of 50 degrees of the light beam angle. Therefore, a light beam angle corresponding to the third area C is 50 degrees. In addition, the first area A and the second area B may be any area in the third area C. It should be noted that the light beam angle mentioned here does not mean an included angle formed by boundary lines of a lighting area. In this embodiment, a location of a center or circle center of the third area C corresponds to the LED lamp. That is, when the LED lamp is projected to the third area C along an optical axis D, projection of the LED lamp is located or approximately located in the center or circle center of the third area C. In this embodiment, the plane where the first area A and the second area B are located is perpendicular to or approximately perpendicular to the optical axis D.

Figure 12N:
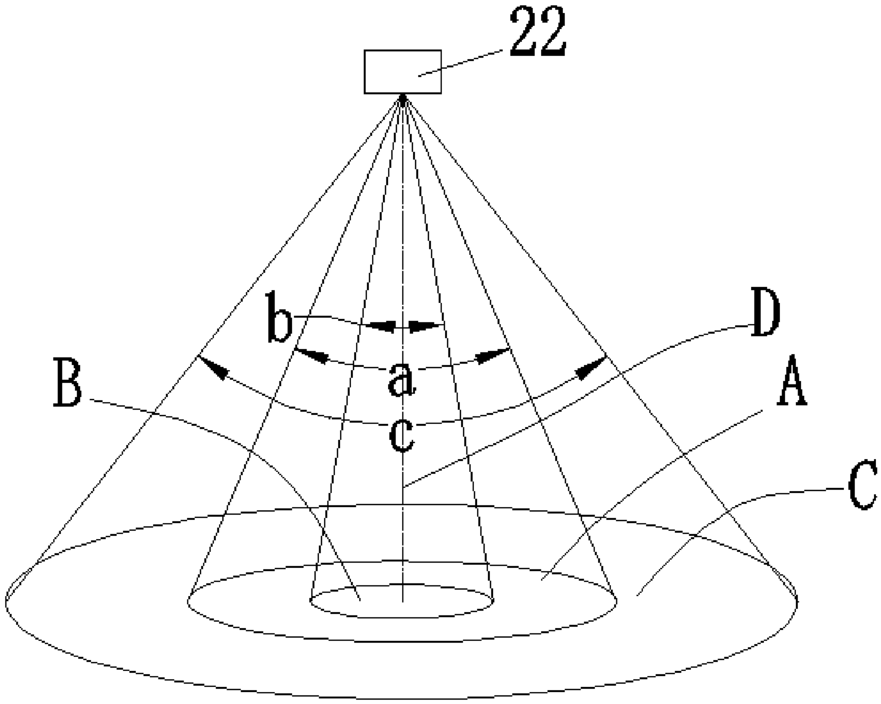
FIG. 12N is a schematic diagram II showing light output of a light emitting unit of an LED lamp.

As shown in FIG. 12N, in this embodiment, in order to control the light output uniformity of the LED lamp, a ratio of an illuminance of the light emitted from the LED lamp when the light emitting unit 22 is turned on within a range of a first area A to an average illuminance within a range of a second area B is greater than 0.3, 0.4, 0.5, 0.6, 0.7, 0.8 or 0.9, and less than 2. Preferably, the ratio of the illuminance within the range of a first area A to the average illuminance within the range of a second area B is greater than 0.5 and less than 1.5. The first area A and the second area B are located on a same plane, and are concentrically or approximately concentrically disposed (assuming that all the areas are circular or approximately circular, with their centers or circle centers being located at same positions). In addition, the first area A and the second area B are both located on a third area C (the third area C, the first area A and the second area B are located on a same plane), while a light beam angle c corresponding to the third area C is 90 degrees, 80 degrees, 60 degrees, or 50 degrees. In this embodiment, the light beam angle may be smaller than the light emission angle of the LED lamp. In this embodiment, the light output uniformity is measured based on an illuminance difference within a range of 50 degrees of the light beam angle. Therefore, a light beam angle c corresponding to the third area C is 50 degrees. In addition, the first area A, the second area B and the third area C are concentrically or approximately concentrically disposed.

Moreover, a light beam angle a corresponding to the first area A and a light beam angle b corresponding to the second area B are both smaller than the light beam angle c corresponding to the third area C. It should be noted that the light beam angles mentioned here do not mean included angles formed by boundary lines of related ranges. In this embodiment, a location of a center or circle center of the third area C corresponds to the LED lamp. That is, when the LED lamp is projected to the third area C along an optical axis D, projection of the LED lamp is located or approximately located in the center or circle center of the third area C. In this embodiment, the plane where the first area A and the second area B are located is perpendicular to or approximately perpendicular to the optical axis D.

In this embodiment, a thickness of the LED lamp is not more than 30 mm. In other words, in a case that the thickness of the whole lamp is less than 30 mm, the LED lamp can achieve the above light output uniformity by a design of the optical member 23. Further, the thickness of the LED lamp may be controlled to be not more than 26 mm and to satisfy the above optical effect such as the light output uniformity.

It will be understood that the above descriptions are for an illustration rather than for limitation. By reading the above descriptions, many implementations and applications other than the embodiments provided are apparent for persons skilled in the art. Therefore, the scope of this teaching should not be determined according to the above descriptions, but determined according to the full scope of the appended claims and equivalents of these claims. For the purpose of comprehensiveness, all articles and references including the disclosure of patent applications and announcements are incorporated herein by reference. The omission of any aspect of the subject matter disclosed herein in the above claims is not intended to discard the subject matter, nor should it be considered that the utility model author did not consider the subject matter as a part of the disclosed subject matter of the utility model.

What is claimed is:

1. An LED illumination device, comprising:

a light source carrier, the light source carrier comprising a base, an accommodating space being formed on the base;

a light emitting unit, the light emitting unit comprising a light emitter and a lamp board, the lamp board being fixed to the light source carrier; and an optical member, the optical member covering the light emitting unit or at least a portion of the optical member covering the light emitting unit, wherein the light emitting unit and the optical member disposed in the accommodating space, the light emitting unit and the optical member being within a range defined by the accommodating space;

the light emitting unit provided with the optical member and an area of a front surface of the base covered by the optical members is not greater than 10% of a total area of the front surface of the base; and the optical member comprises a first light distribution unit and a second light distribution unit, at least 70% of a luminous flux generated by the light emitter in operation is directly emitted from the LED illumination device through the second light distribution unit, a portion of the luminous flux generated by the light emitter in operation is emitted through the first light distribution unit, and at least a portion of the light emitted through the first light distribution unit is emitted to a surface of the base.

2. The LED illumination device according to claim 1, wherein the first light distribution unit is configured in a strip shape and provided with an accommodating groove along a longitudinal direction, and at least a part of the light emitting unit in a height direction is located inside the accommodating groove.

3. The LED illumination device according to claim 2, wherein the second light distribution unit is disposed on a surface of the first light distribution unit, the second light distribution unit and the accommodating groove are respectively located on two opposite sides of the first light distribution unit in a height direction of the optical member, and the light emitter and the second light distribution unit are arranged in one-to-one correspondence.

4. The LED illumination device according to claim 3, wherein the second light distribution unit comprises a first light output part and a second light output part, the first light output part comprises a plane, the second light output part comprises a conical surface, and the second light output part is disposed around the first light output part.

5. The LED illumination device according to claim 4, wherein when the light emitter is turned on, an illuminance ratio of a surface of the first light output part to a surface of the second light output part is greater than 0.3 and less than 2.

6. The LED illumination device according to claim 4, wherein a ratio of a surface area of the second light output part to a surface area of the first light output part is greater than 0.7 and less than 1.8.

7. The LED illumination device according to claim 4, wherein the second light output part has a contour line, the contour line revolves 360 degrees along a central axis of the second light distribution part to form an outer contour of the second light output part, and an absolute value of a slope of the contour line of the outer contour of a conical surface of the second light output part ranges from 0.3 to 0.8.

8. The LED illumination device according to claim 4, wherein the second light output part has a contour line, the contour line revolves 360 degrees along a central axis of the second light distribution part to form an outer contour of the second light output part, and an absolute value of a slope of the contour line of the outer contour of the conical surface of the second light output part ranges from 0.25 to 0.6.

9. The LED illumination device according to claim 4, wherein when the light emitting unit is turned on, a ratio of an illuminance of light emitted from the LED illumination device within a range of a first area to an average illuminance within a range of a second area is greater than 0.3 and less than 2, and the first area and the second area are located on a same plane; the first area and the second area are located in a third area; and a light beam angle corresponding to the third area is smaller than a light emission angle of the LED illumination device.

10. The LED illumination device according to claim 9, wherein when the light emitting unit is turned on, the ratio of the illuminance of the light emitted from the LED illumination device within the range of the first area to the average illuminance within the range of the second area is greater than 0.5 and less than 1.5, and the first area and the second area are located on a same plane; the first area and the second area are located in the third area; and the light beam angle corresponding to the third area is smaller than the light emission angle of the LED illumination device.

11. The LED illumination device according to claim 10, where in each of the first area and the second area are any area in the third area.

12. The LED illumination device according to 10, wherein the first area and the second area are concentrically disposed.

13. The LED illumination device according to claim 1, further comprising a power source, wherein the power source is disposed on the base, and the power source is within a range defined by the base in a height direction of the LED illumination device.

14. The LED illumination device according to claim 13, wherein the power source comprises a power box, an electronic component, a power board, and an electric isolation tube, the electronic component is disposed on the power board, the power box is fixed to the base, the electronic component and the power board are completely or at least partially disposed in the electric isolation tube, and the electric isolation tube is disposed in the power box.

15. The LED illumination device according to claim 14, wherein the power box has an opening, the electric isolation tube is installed in the power box through the opening, and a side of the power box with the opening corresponds to an end surface of the base for sealing the power box.

16. The LED illumination device according to claim 14, wherein the electronic component is disposed between the power board and the end surface of a back surface of the base, so that a space is maintained between the power board and the end surface of the back surface of the base.

17. The LED illumination device according to claim 16, wherein the base comprises two mounting walls, and the two lamp boards are fixed to the two mounting walls, respectively.

18. The LED illumination device according to claim 17, wherein two ends of the power box in a length direction exceed the two mounting walls, respectively.

19. The LED illumination device according to claim 16, wherein the power box comprises a first cavity and a second cavity, the electric isolation tube is disposed in the first cavity, a wiring board is disposed in the second cavity, and the second cavity of the power box completely surpasses at least one mounting wall in a length direction of the power box.

20. The LED illumination device according to claim 13, wherein a height of the power box accounts for 80% or more of a total height of the LED illumination device.

* * * * *